(12) United States Patent
Nakajima

(10) Patent No.: US 6,701,011 B1
(45) Date of Patent: Mar. 2, 2004

(54) IMAGE PROCESSING APPARATUS AND IMAGE PROCESSING METHOD AND STORAGE MEDIUM

(75) Inventor: Nobuyuki Nakajima, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/009,251

(22) Filed: Jan. 20, 1998

(30) Foreign Application Priority Data

| Jan. 20, 1997 | (JP) | 9-007560 |
| Jul. 14, 1997 | (JP) | 9-188214 |
| Dec. 26, 1997 | (JP) | 9-359803 |

(51) Int. Cl.$^7$ .......................... G06K 9/00; G06F 15/00; G09G 5/02
(52) U.S. Cl. ......................... 382/167; 358/1.1; 345/589
(58) Field of Search .............................. 382/167, 254, 382/162, 173, 205, 305; 345/156, 418, 427, 589, 590, 591, 593, 594, 596, 604; 358/1.1, 3.06, 3.1, 3.13, 518

(56) References Cited

U.S. PATENT DOCUMENTS

| 5,506,946 A | * | 4/1996 | Bar et al. ................... 395/131 |
| 5,508,718 A | * | 4/1996 | Haikin ....................... 345/150 |
| 5,546,528 A | * | 8/1996 | Johnston ..................... 395/159 |
| 5,717,838 A | * | 2/1998 | LeClair ...................... 395/109 |
| 5,739,809 A | * | 4/1998 | McLaughlin et al. ........ 345/150 |
| 5,751,286 A | * | 5/1998 | Barber et al. ............... 345/348 |
| 5,915,075 A | * | 6/1999 | Kadowaki ................... 395/109 |
| 5,949,427 A | * | 9/1999 | Nishikawa et al. ......... 345/431 |

* cited by examiner

Primary Examiner—Bhavesh M. Mehta
Assistant Examiner—Kanji Patel
(74) Attorney, Agent, or Firm—Fitzpatrick, Cella, Harper & Scinto

(57) ABSTRACT

An image processing method that allows a user to easily make image processing settings. An image processing parameter is set in response to a user inputting an instruction to process an image in accordance with the image processing parameter. An image is processed using a plurality of different image processing parameters and resulting images are output in an array. The relationship between the plurality of different image processing parameters is displayed using graphics.

34 Claims, 38 Drawing Sheets

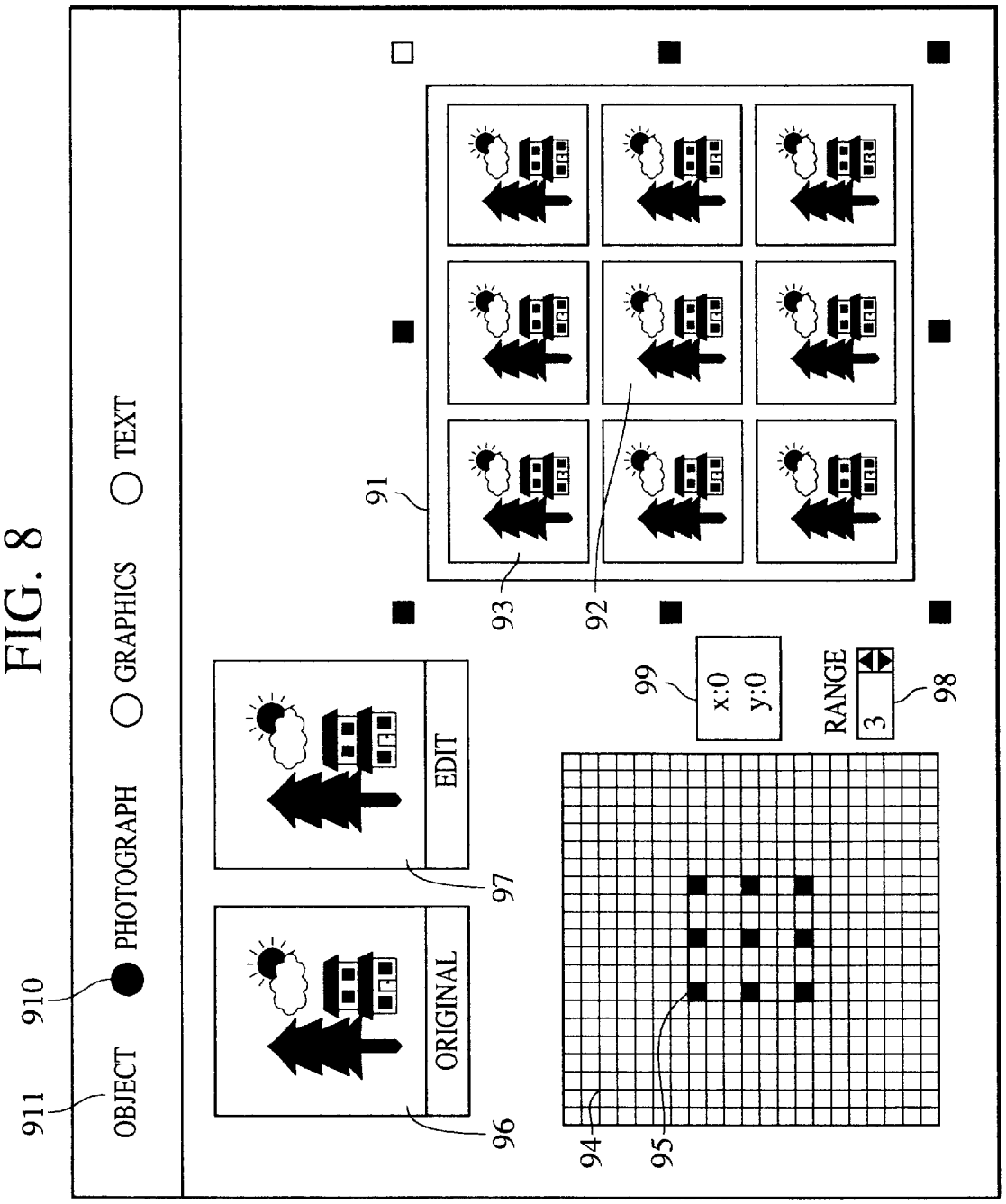

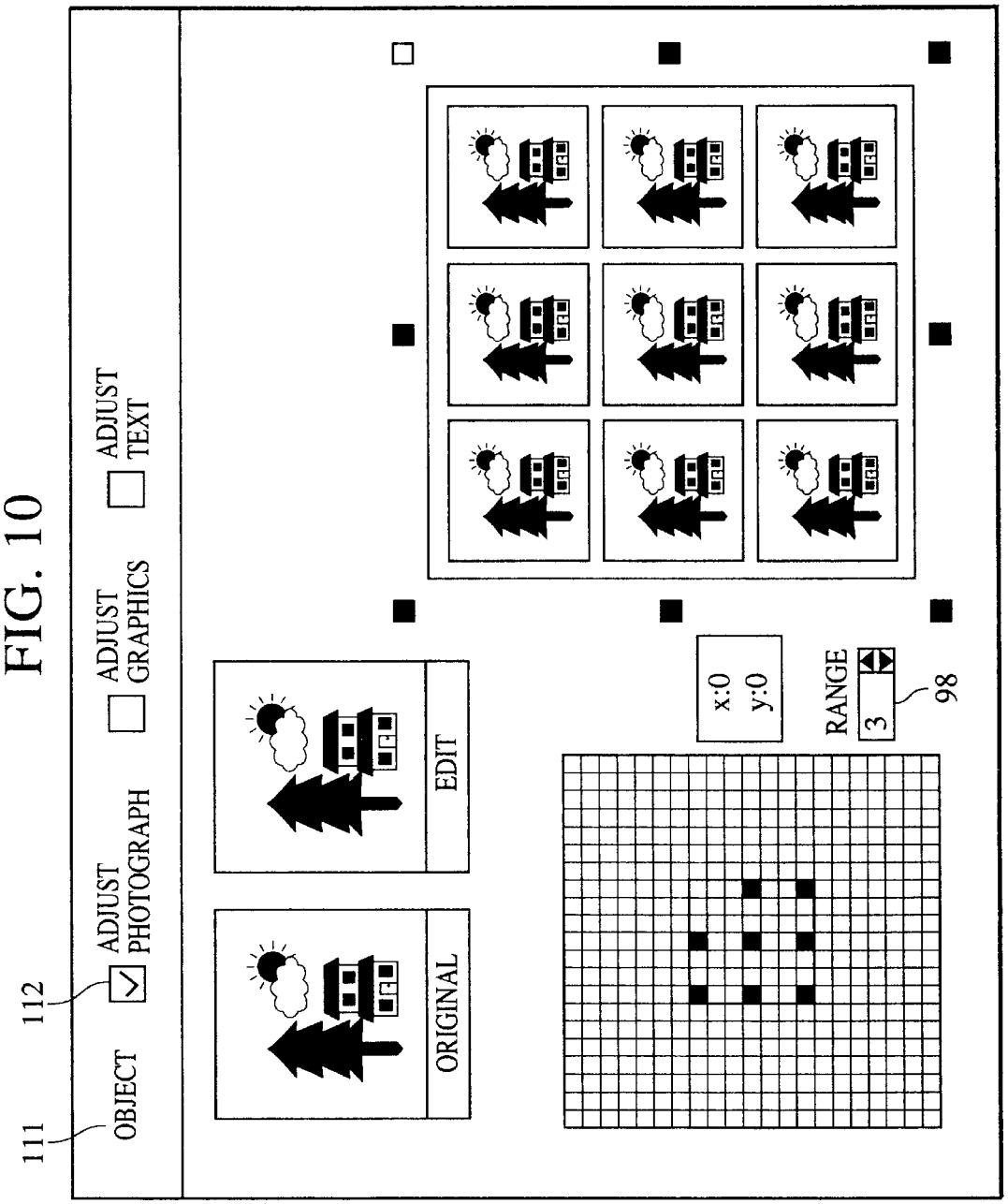

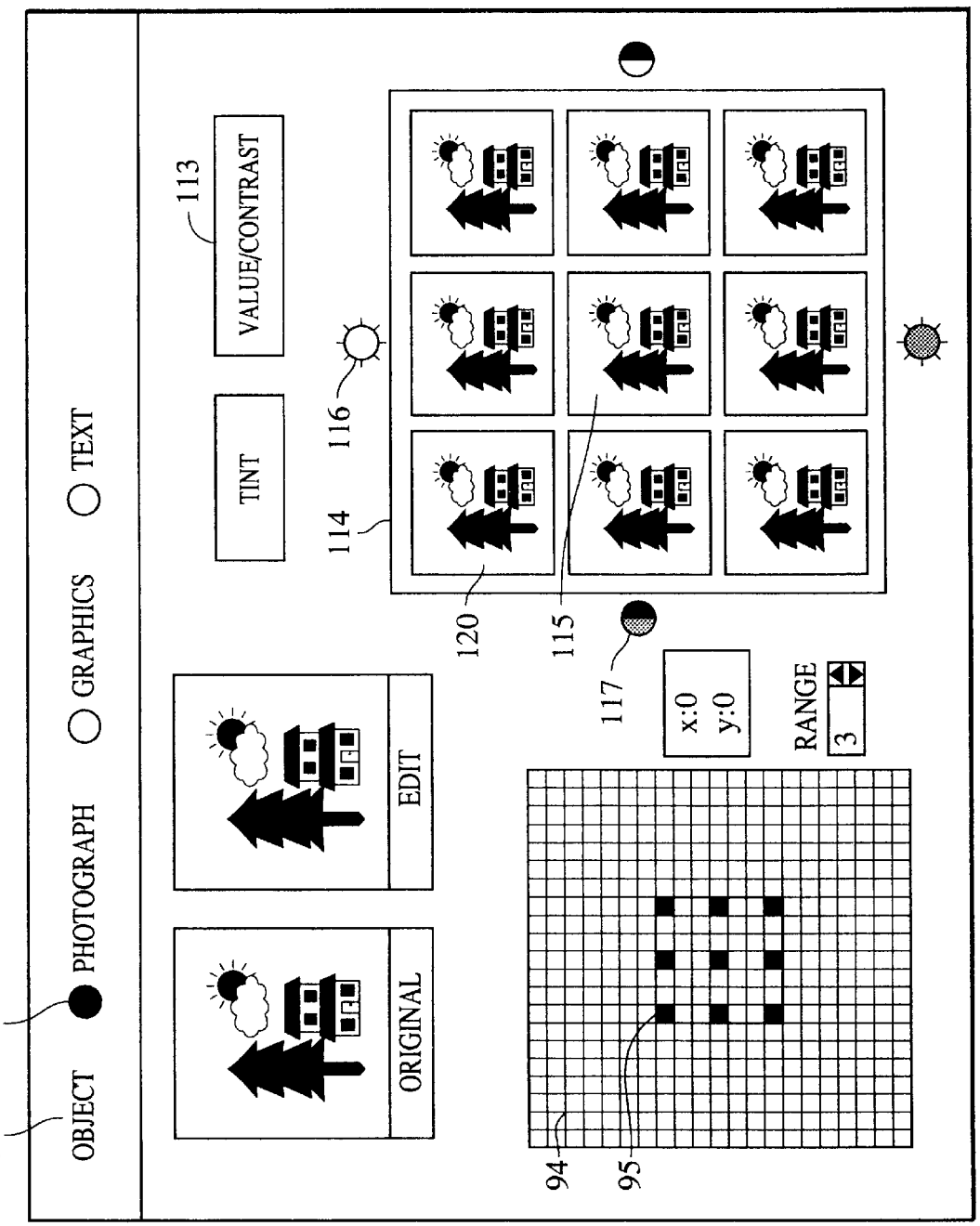

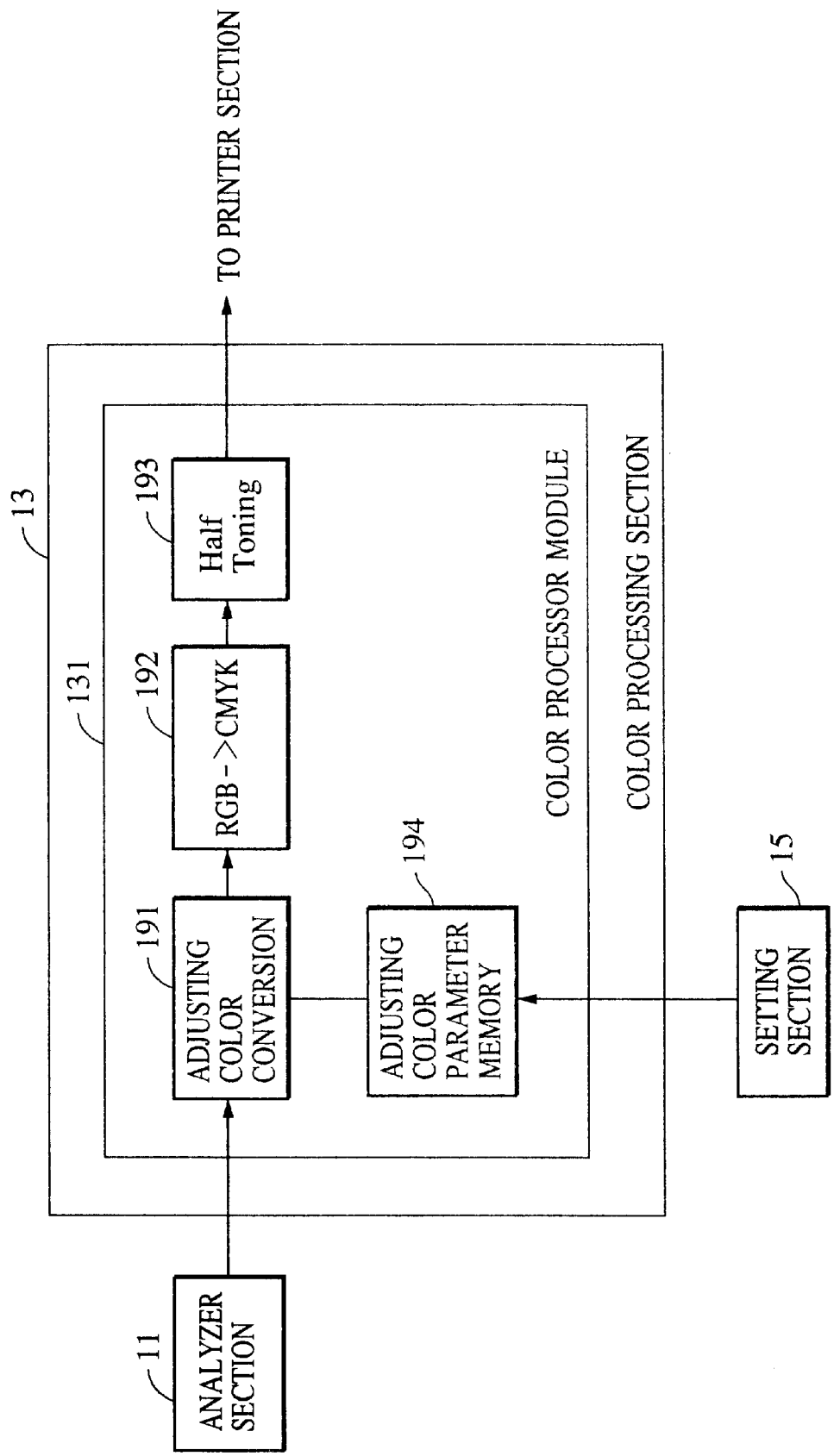

IMAGE PROCESSING APPARATUS AND IMAGE PROCESSING METHOD AND STORAGE MEDIUM

BACKGROUND OF THE INVENTION

1. Field of the Invention

The present invention relates to an image processing apparatus, an image processing method and a storage medium.

2. Description of the Related Art

In conventional image processing apparatuses such as a printer which forms an image in response to color image input data, a color signal in RGB values for a monitor is color-processed and converted into an output color signal, namely CMYK signal for the printer.

The color printer reproduces the CMYK signal obtained through the signal conversion by mixing inks according to CMYK signal in a subtractive process.

Conventional image processing is now discussed in which multi-level RGB data as image data is converted into two-level or binary CMYK an output image to a printer.

FIG. 35 is a block diagram showing the flow of image processing in a conventional image processor 13. Image data, out of input data analyzed by an analyzer section 11, is sent to the image processor 13. A color processor module 131 constitutes the image processor 13 as shown. In the color processor module 131, an adjusting color converter 191 performs color processing as will be described later. RGB to CMYK conversion is then performed in a converter 192. This process converts an RGB multi-level signal into a CMYK multi-level signal and includes known process steps such as color matching, luminance and density conversion, and masking.

More particularly, through the above process, the luminance signal for RGB is converted into a density signal for CMYK which is a printer signal.

The CMYK multi-level signal is then converted into a half-tone signal suitable for printing by a halftone converter 193. In this embodiment, a binary signal is processed. Alternatively, multi-level signals such as of si four-level, eight-level, and 256-level may be processed. The signal processed through the halftone converter 193 is sent to a printer section for printing.

The color of the image printed is sometimes different from the one desired. Among other things, one factor causing this is attributed to the fact that the condition of the printer section at the time of the design of color processing parameters in the RGB to CMYK converter 192 ages with time or varies with environmental conditions. Even if the color of the image is as set, it may not agree with the personal preference of a user. The following color adjustment means is conventionally provided in case the user is not satisfied.

Color adjustment is conventionally performed in the process step of conversion from RGB multi-level data to RGB multi-level data in the adjusting color converter 191 as shown in FIG. 35. A setting section 15 sets an adjusting color, which is then stored in an adjusting color parameter memory 194. The adjusting color converter 191 performs color conversion using the adjusting color parameter. The operation of the conventional setting section 15 is now discussed referring to FIG. 34.

As shown in FIG. 34, color adjustment is made at a RGB signal level. A color adjustment screen 181 is presented on a display device such as a monitor. A slide bar 182 is used to adjust the color RED. The user moves a button 183 along the slide bar leftward or rightward using a pointing device such as a mouse. At its initial setting, the button 183 is at a default position 184 with no adjustment made. As shown in FIG. 34, as the button 183 is moved leftward, the RED component is set at a lower level, and as the button 183 is moved rightward, the RED component is set at a higher level. Also available are a GREEN slide bar 185, a GREEN button 186, a BLUE slide bar 187, and a BLUE button 188.

In response to the input RGB multi-level signal, the setting section 15 sets a color adjusting value on a per color basis of RGB using a level ranging from low to high. The color adjusting value is then stored in the adjusting color parameter memory 194. The adjusting color converter 191 performs color conversion using the adjusting color parameter. When a RED multi-level signal is set to low in the process, for example, a linear conversion table for making the RED component lower according to the setting is created and used. The detailed operation of this process is not discussed here. The operation of the conventional color adjustment in which the image processor 13 receives the image data and makes color adjustment to form output data for the printer section has been discussed referring to FIGS. 34 and 35.

The above technique has the following disadvantages. As already described, the printed image has a color different from the one desired because of aging, change of environmental conditions and user preference. Available in such a case is color adjustment means in which a RGB multi-level signal as an input signal is subjected to level adjustment using slide bars on a per color basis at a stage prior to the conversion from RGB to CMYK.

Not only ordinary users without basic knowledge of chromatics but also users with such knowledge have difficulty obtaining a desired color by adjusting RGB input signals separately in the above color adjustment means, and the users are forced to adjust color on a trial and error basis.

After adjusting RGB signals to achieve a desired color referring to print results, printing is performed, and RGB signals are adjusted, and printing is performed again. This process is repeated. Since color adjustment is performed in terms of intensity balance in this adjustment, both tint and value are concurrently adjusted. Even if color adjustment almost reaches its perfect setting, a slight degree of change made in any of the RGB colors destroys tint and value.

SUMMARY OF THE INVENTION

Accordingly, it is an object of the present invention to help the user to easily make image processing settings.

It is another object of the present invention to allow the user to easily make image processing settings by letting the user visually recognize an image processing result through a plurality of image processing parameters and the relationship between the plurality of image processing parameters.

To achieve this object, the image processing method sets an image processing parameter in response to a user instruction to perform image processing in accordance with the image processing parameter, wherein an image is processed by image processing means using a plurality of different image processing parameters, the resulting images are output in an array, the relationship between the plurality of different image processing parameters is output using graphics, and a user instruction about the setting of the image processing parameters is input.

It is yet another object of the present invention to allow the user to easily and efficiently make image processing setting to obtain a desired final image.

To achieve this object, the image processing method having a first mode in which a display device displays on a display screen an image that is processed according to a plurality of image processing parameters and a second mode in which an image forming device forms on a recording material an image that is processed according to a plurality of image processing parameters, comprises the steps of setting the image processing parameter corresponding to an image, designated by a user instruction, out of a plurality of images displayed and formed in the first and second modes respectively, and processing an input image using the set image processing parameter.

Still other objects of the present invention, and the features thereof, will become fully apparent from the following description of the embodiments which is to be taken in conjunction with the attached drawings.

BRIEF DESCRIPTION OF THE DRAWINGS

FIG. 8 shows a thumbnail image in the setting section according to the present invention;

FIG. 10 shows an object to be adjusted in the setting section according to the present invention;

FIG. 21 shows value/contrast of the thumbnail image in the setting section;

FIG. 35 shows the flow of color processing in the conventional art.

DESCRIPTION OF THE PREFERRED EMBODIMENTS

Figure 1:
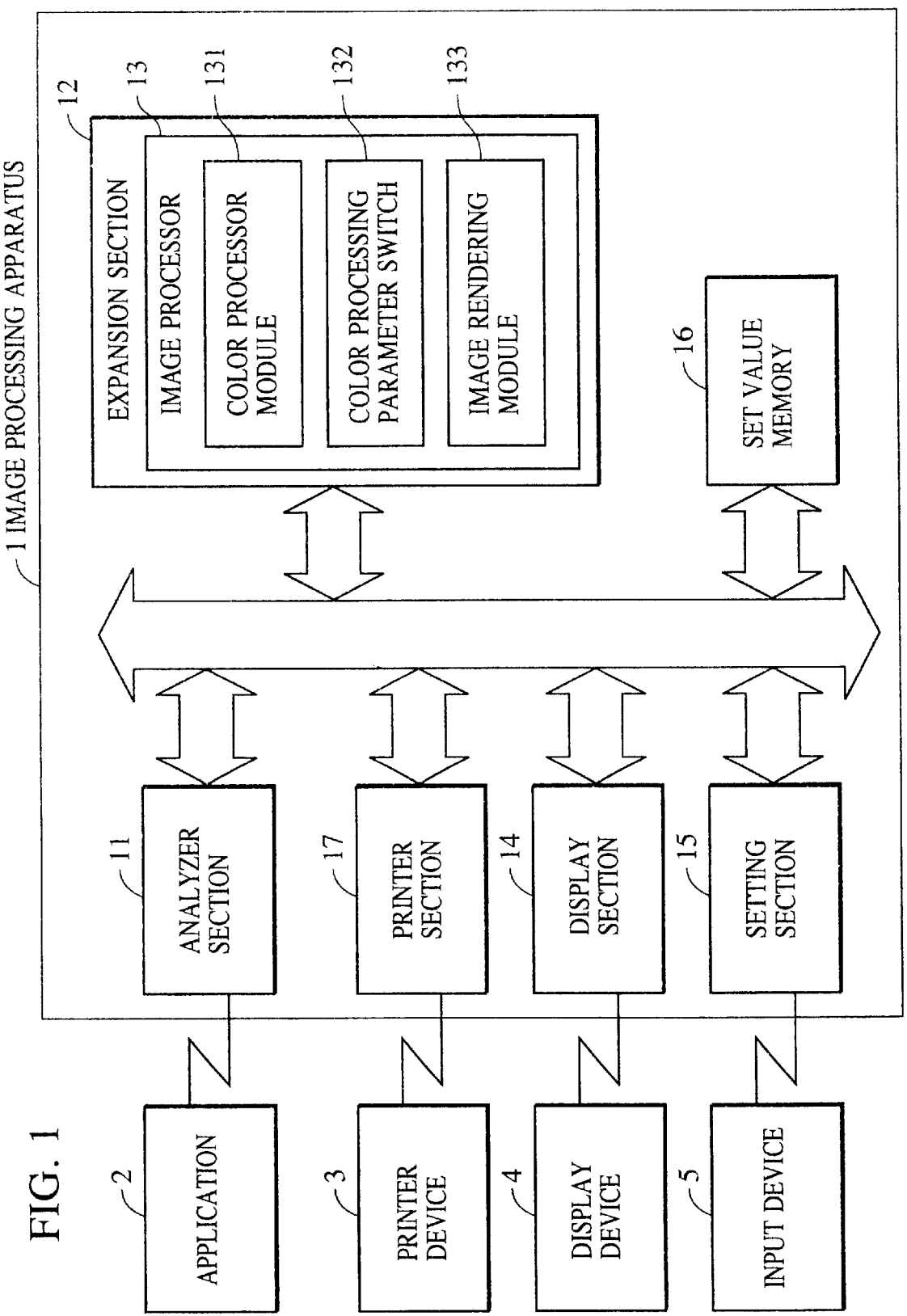
FIG. 1 is a block diagram showing the image processing apparatus of the present invention.

Referring now to the drawings, a first embodiment of the present invention is now discussed.

Although the embodiments will be discussed in connection with a color printer, they are also applicable to a monochrome printer.

Although a binary process is used in each of the following embodiments, the present invention may be applied to a multi-level printer using a four-level or eight-level process.

First embodiment

The image processing apparatus of the present invention includes analyzing means for analyzing image data such as data in an output control command format and image data transmitted from an application, expanding means for expanding the image data into data for output based on the analysis result by the analyzing means, image processing means for image-processing the image data when the image data is expanded by the expanding means, color processing means constituting the image processing means, for color-processing the image data, color processing parameter switch means for switching color processing parameters the color processing means uses according to the setting in setting means, image rendering means constituting the image processing means, for expanding, reducing and copying an image according to the settings in the setting means, the setting means for allowing a user of the image processing apparatus to make setting for image processing through an external device depending on the purpose of use of the image processing apparatus, set value memory means for storing a value set through the setting means, display means for outputting the image data expanded by the expanding means to an external display device, and printer means for outputting the image data expanded by the expanding means to an external printer device.

When the expanding means expands the image data into data for display based on the analysis result provided by the analyzing means which analyzes the image data provided by the application, the image rendering means reduces the image data, reproduces an image of the reduced data, and expands the reproduced image while the color processing parameter switch means switches color processing parameters, and the display means causes the external display device to display the image.

When the user makes color adjustment through the setting means while monitoring a display screen, the user selects one image on the display screen. In response to an operation by the user, the image data is expanded while the color processing parameter switch means switches the color processing parameters. The display means causes the external display to display the resulting image.

When the plurality of images displayed are printed, the image data is expanded by the expanding means using the color processing parameter after the images are rendered as image data for printing through the image rendering means, and the printer means outputs the expanded data to the external printer device.

To obtain a final printout, the original image data is expanded by the expanding means according to the color processing parameter the setting means finally sets, and the printer means outputs the expanded data to the external printer device.

In this embodiment, a reduced version of the original image is reproduced, color processing is performed on it using different parameters, and resulting images are presented on the display screen so that color adjustment is selectively made. A plurality of reduced images with a plurality of color processes applied thereto are presented on the display screen and then printed. Depending on the images on the display screen and the images on the printout result, one is selected out of the plurality of adjusting color parameters to perform color adjustment to the original image. The user intuitively learns color adjustment to obtain a desired color to the user's own preference. The user can easily select the desired color and efficiently makes image processing settings that serves the purpose of use.

This embodiment of the present invention is now discussed in detail.

FIG. 1 is a block diagram showing one embodiment of the image processing apparatus of the present invention.

Referring to FIG. 1, there are shown an image processing apparatus 1, an application 2 for allowing the user to draw and edit image data, a printer device 3 for forming a print image based on the output data from the image processing apparatus 1, a display device 4 for forming a display image based on the output data from the image processing apparatus 1, and an input device 5 at which a variety of settings are made from outside.

An analyzer section 11 analyzes the image data transmitted from the application 2. The analysis by the analyzer section 11 includes a process for converting data in the image description format unique to the application into image data to be processed in the image processing apparatus 1. An expansion section 12 constitutes expanding means which performs a variety of processes in accordance with the analysis by the analyzer section 11 for conversion to the output data an output section to be described later outputs. In the expansion section 12, an image processor 13 processes the image data. In the image processor 13, a color processor module 131 constitutes color processing means which performs color processing. In the image processor 13, color processing parameter switch 132 switches color processing parameters when the color processor module 131 processes color. In the image processor 13, an image rendering module 133 makes renderings to the image data from the analyzer section 11, including scale contraction, scale expansion, and copying.

A display section 14 performs a process required for causing an external display device to display image data rendered and a diversity of setting screens. A setting section 15 performs a process which allows the user of the image processing apparatus to make settings using an input device such as a mouse or keyboard according to the user's intention. In this embodiment, the display section 14 and setting section 15 help the user make settings by presenting graphically an adjustment screen and an output mode setting screen on a monitor. The setting operation will be detailed later. A set value memory 16 stores values the setting section 15 sets. A printer section 17 performs a process required for outputting the output image data expanded by the expansion section 12 to the external printer device 3.

All above elements are controlled by an unshown CPU according to a program stored in an unshown memory connected to the CPU via a bus.

The printer device 3 is a color laser beam printer in this embodiment. The image data output is a one-page bitmap data prepared for each of four CMYK colors. The printer section 17 sends the image data to the printer device 3, which in turn forms a corresponding image on a recording material using each of the four inks of C (cyan), M (magenta), Y (yellow), and K (black).

Figure 2:
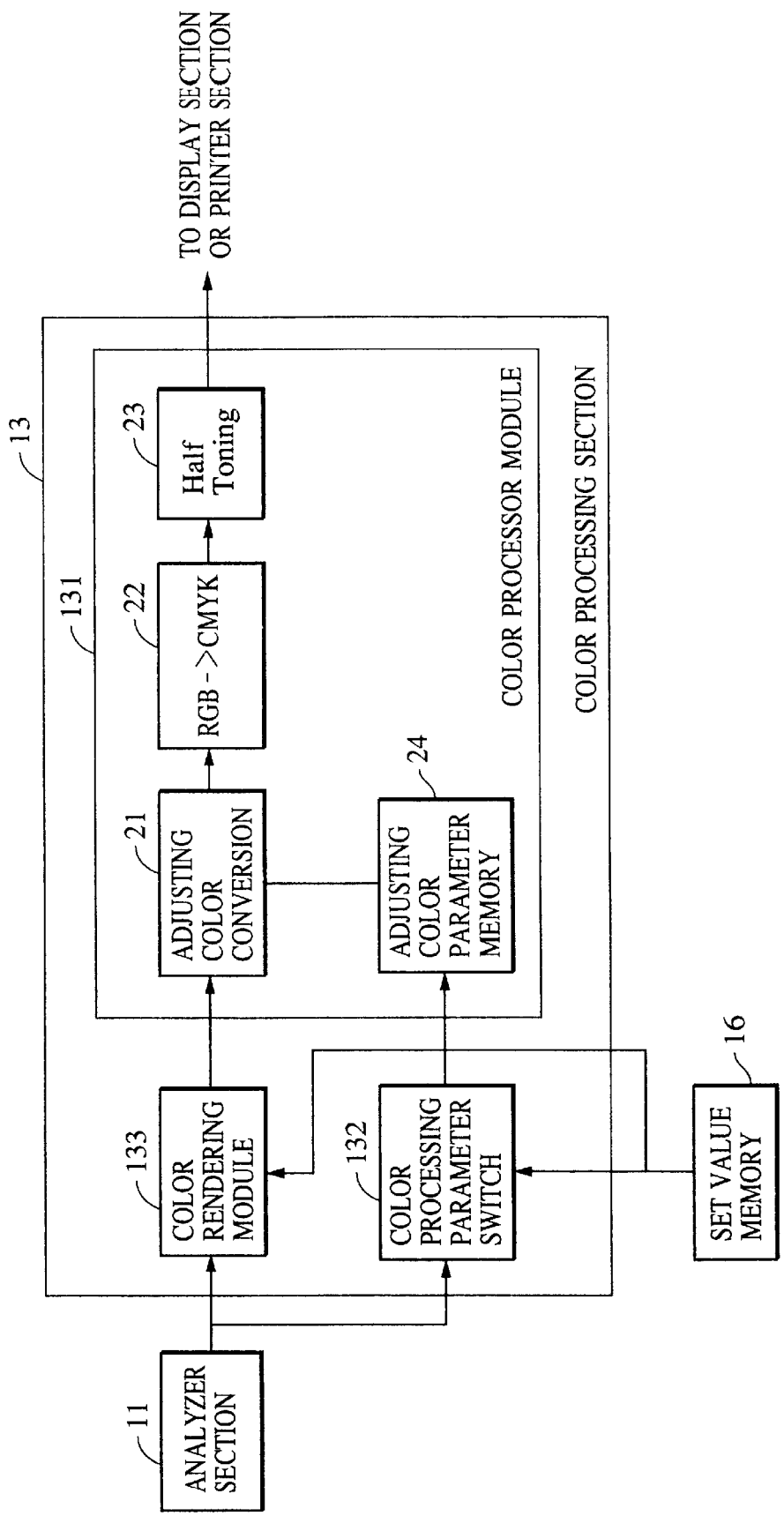
FIG. 2 is a block diagram showing the image processor of the image processing apparatus of the present invention.

FIG. 2 shows the process in which the image processor 13 receives an image color signal from the analyzer section 11 and produces a color signal output for the display section 14 or setting section 15.

The information stored in the set value memory 16 is first referenced. The information is now discussed.

The information stored in the set value memory 16 reflects the setting by the user.

Referring to FIG. 8, the adjustment screen graphically presented is discussed. As shown, the display section 14 displays the adjustment screen on the external display device 4. Reference numerals 910 and 911 are unused in this embodiment. Reference numeral 91 represents an adjustment area and is hereinafter referred to as a thumbnail sketch or simply thumbnail. The thumbnail 91 includes an array of 9 images, and an image 92 is a central one, which is hereinafter referred to as a current image 92. The current image 92 is the image resulting from the latest adjustment, and is always centered with the remaining eight images adjacent thereto. The eight images surrounding the current image 92 are images respectively enhanced in red, yellow, yellow green, green, light blue, blue, purple and pink, and the images themselves serve as a button for enhanced setting. Although the above eight colors are employed in this embodiment, chromatic colors other than these colors may be used. Compared with the current image 92, an image 93 is enhanced in green color. When the user wants an image enhanced in green, for example, the user enters a command through the input device 5, a pointing device such as a mouse, and the setting section 15 to press the image 93. Upon pressing the image 93, the image 93 becomes a current image, and is shifted to the center position designated reference numeral 92. When the current image 92 is updated in this way, the surrounding eight images are enhanced in eight colors with respect to the center current image 92. These steps are repeated until the current image 92 agrees with the desired color. An indicator 94 indicates an area of adjustment, within which the thumbnail 91 is adjustable, and is hereinafter referred to as a general map 94. A cursor 95 in the general map 94 indicates its corresponding position in the thumbnail 91. More particularly, nine points of the cursor 95 correspond to the nine images in the thumbnail 91. Each time adjustment is made in the thumbnail 91 as described above, the cursor 95 moves on the general map 94. When the cursor 95 reaches the edge of the general map 94, the thumbnail 91 cannot be adjusted further in that direction.

An address window 99 indicates current position information in the general map 94. In this embodiment, each of x and y ranges from −10 to 0 to +10, and central values 0, 0 mean an unadjusted state. An adjustment range setter 98 adjusts a range of adjustment, which defines the range between the current position and the edge of the general map 94.

Figure 9A:
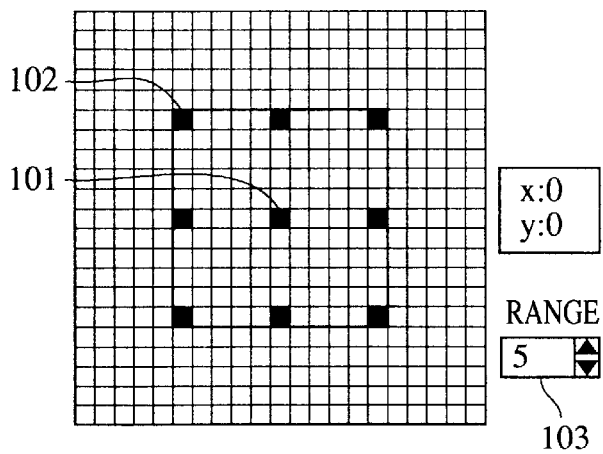
FIGS. 9A–9C show a general map and a cursor in the thumbnail image according to the present invention.
Figure 9B:
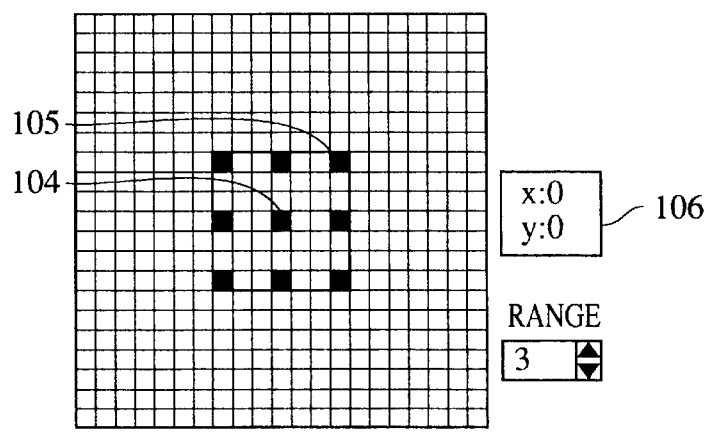
Figure 9C:
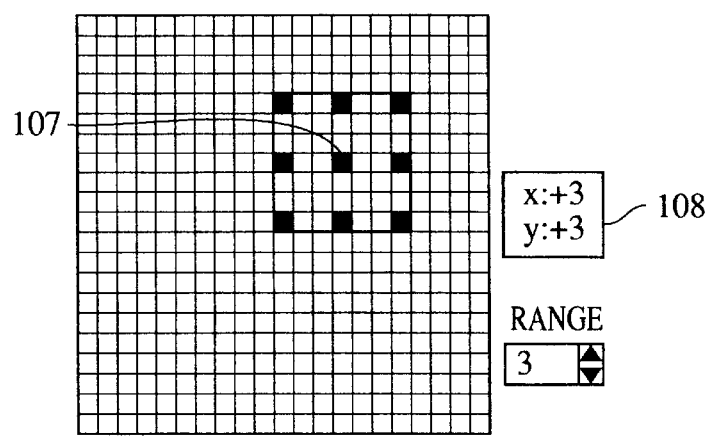

Referring to FIGS. 9A–9C, these elements are discussed in detail. FIGS. 9A–9C show only the general map of FIG. 8. Like FIG. 8, FIG. 9B shows the general map with x, y=0, 0 and an adjustment range of 3. In FIG. 9A, an adjustment range setter 103 sets the adjustment range to 5. More particularly, the spacing between the current image 101 that is the center of the cursor and the edge 102 is 5 on the general map. With the adjustment range increased from 3 to 5, the degree of adjustment in one action is increased when adjustment is made in the thumbnail. With the adjustment range deceased, the degree of adjustment in one action is decreased, and fine adjustment is allowed. In FIG. 9C, the cursor is moved as the thumbnail 91 is adjusted. As shown, the current image is at x, y=+3, +3. The range of adjustment in this case is 3.

The user distinctly learns the adjustment currently in progress referring to the general map 94 and cursor 95.

Shown further in FIG. 8, are an original image 96 prior to color adjustment and an image 97 that is processed using the color adjusting parameter that is also applied to the current image 92.

As already described, the thumbnail adjustment is performed by carrying out color adjustment using a color adjusting parameter having a one-to-one correspondence to a position in the general map.

Figure 11:
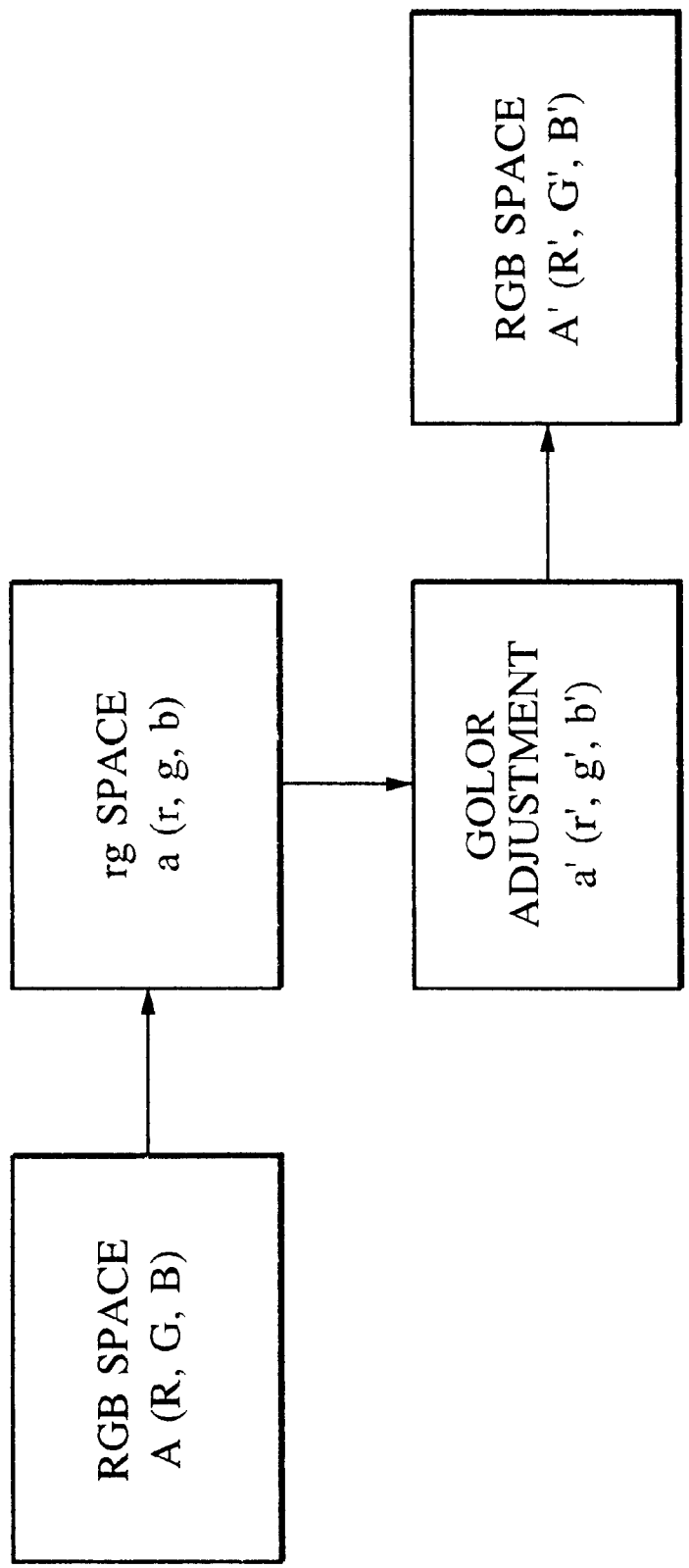
FIG. 11 is an explanatory view showing a change in color space in color adjustment according to the present invention.
Figure 12A:
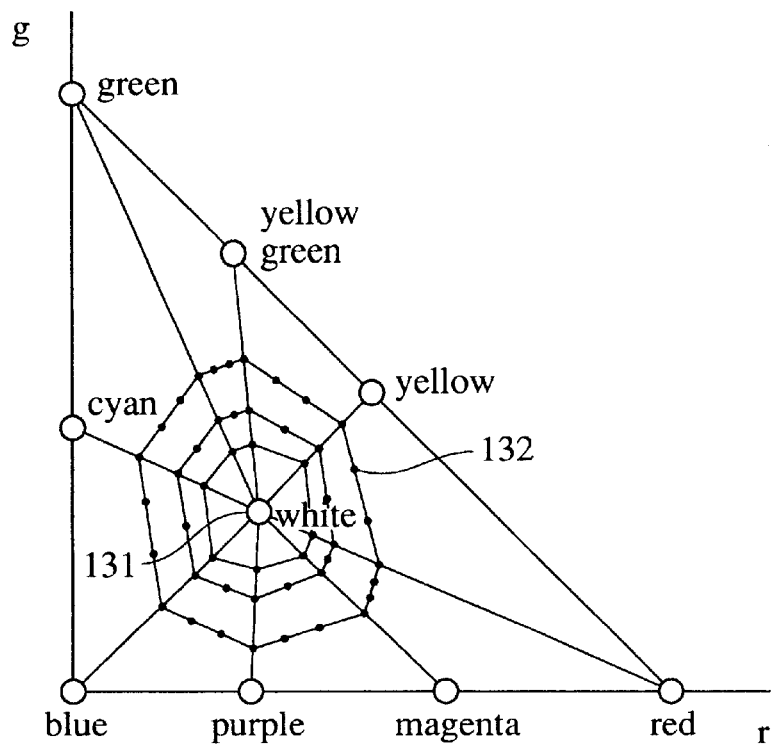
FIGS. 12A and 12B show the relationship between an rg space and the general map in color adjustment according to the present invention.
Figure 12B:
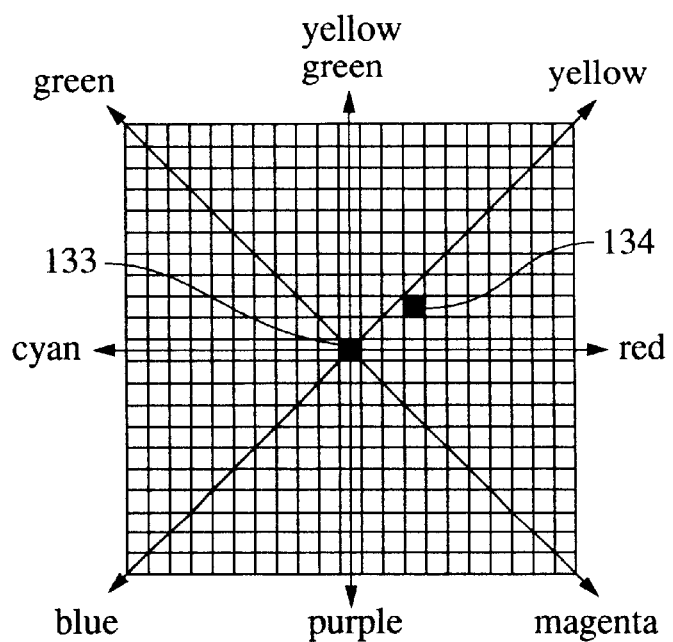

Referring to FIGS. 11 and 12, the correspondence between the general map and the color adjusting parameter is discussed. FIG. 11 shows a color space in color adjustment. In color adjustment, a color A (R, G, B) in RGB space is converted into a color a (r, g, b) in rg space. This conversion is expressed by the following equations.

$r=R/(R+G+B)$ $g=G/(R+G+B)$ $b=1-r-g$

Adjustment is performed in the rg space to get a' (r', g', b').
The adjustment in the rg space is shown in FIG. 12A.
Designated at 131 is white, which means unadjusted state as shown in FIG. 12A. As already described, the adjusting eight colors of red, yellow, yellow green, green, light blue, blue, purple and pink are used in this embodiment, and correspond to eight apexes shown in FIG. 12A. As already discussed, colors other than these colors may be employed. This means that other colors are used at the apexes. In this case, however, it is required that these colors be circularly consecutive in chromatics a point of view. As shown in FIG. 12A, basic adjustment points are placed on each line connecting each of the eight apexes to the white 131, and intermediate adjustment points are placed on lines connecting one equal-level basic adjustment point to another equal-level basic adjustment point. A plurality of adjustment points are placed in the rg space with equal spacings therebetween or with weighted spacings therebetween. For example, a color adjusting parameter at 132 is computed with equal spacing along a line connecting the basic adjustment points that enhances yellow and red by 3 levels as follows: 2/3 *yellow [3] +1/3 * red [3].

FIG. 12 associates the adjustment points with the general map. More particularly, the above adjustment points are simply re-organized in a square map, in which reference numeral 133 corresponds to white 131, and 132 to 134.

The adjustment in the rg space derives a'(r', g', b') using the color adjusting parameter that is precomputed in the general map.

Referring to FIG. 11, a'(r', g', b') is converted into A'(R', G', B') in the RGB space using known equations.

$Y=0.30R+0.59G+0.11B$ $y=0.30r'+0.59g'+0.11b'$ $R'=r'*Y/y'$ $G'=g'*Y/y'$ $B'=b'*Y/y'$

In the thumbnail adjustment, color conversion is performed using a color adjusting parameter having a one-to-one correspondence to a position in the general map. This embodiment uses the one-to-one correspondence, but the one-to-one correspondence is not a requirement on the display in the present invention. For example, a spacing of 1 on the display may be a spacing of 2 or more internally.

Figure 3:
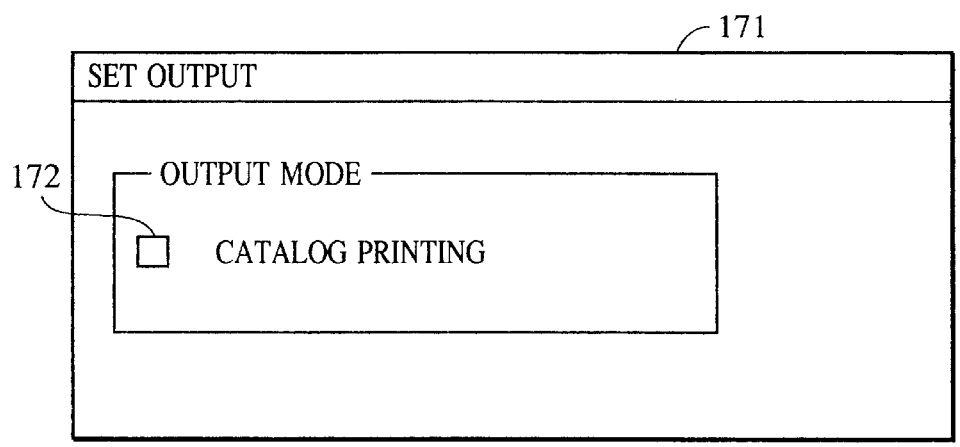
FIG. 3 shows a setting section of the present invention.

Referring to FIG. 3, an output setting screen in this embodiment is discussed. Like the screen shown in FIG. 8, the output setting screen 171 is provided on the external display device 4 from the display section 14, and constitutes the setting section 15 which selectively switches between a normal mode and a catalog print, for printing. More particularly, when the pointing device is manipulated to press an area 172, a catalog printing is selected. When the pointing device is pressed again, the catalog printing is toggled off to revert back to the normal mode.

Figure 4A:
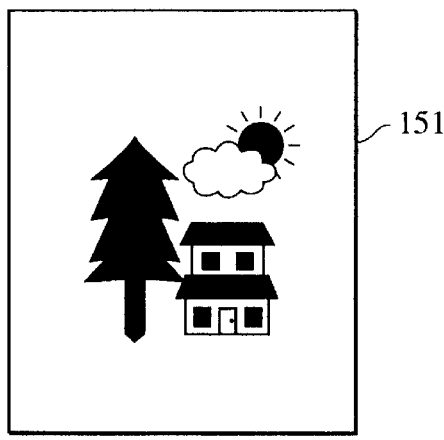
FIGS. 4A–4C are explanatory views showing catalog printing according to the present invention.
Figure 4B:
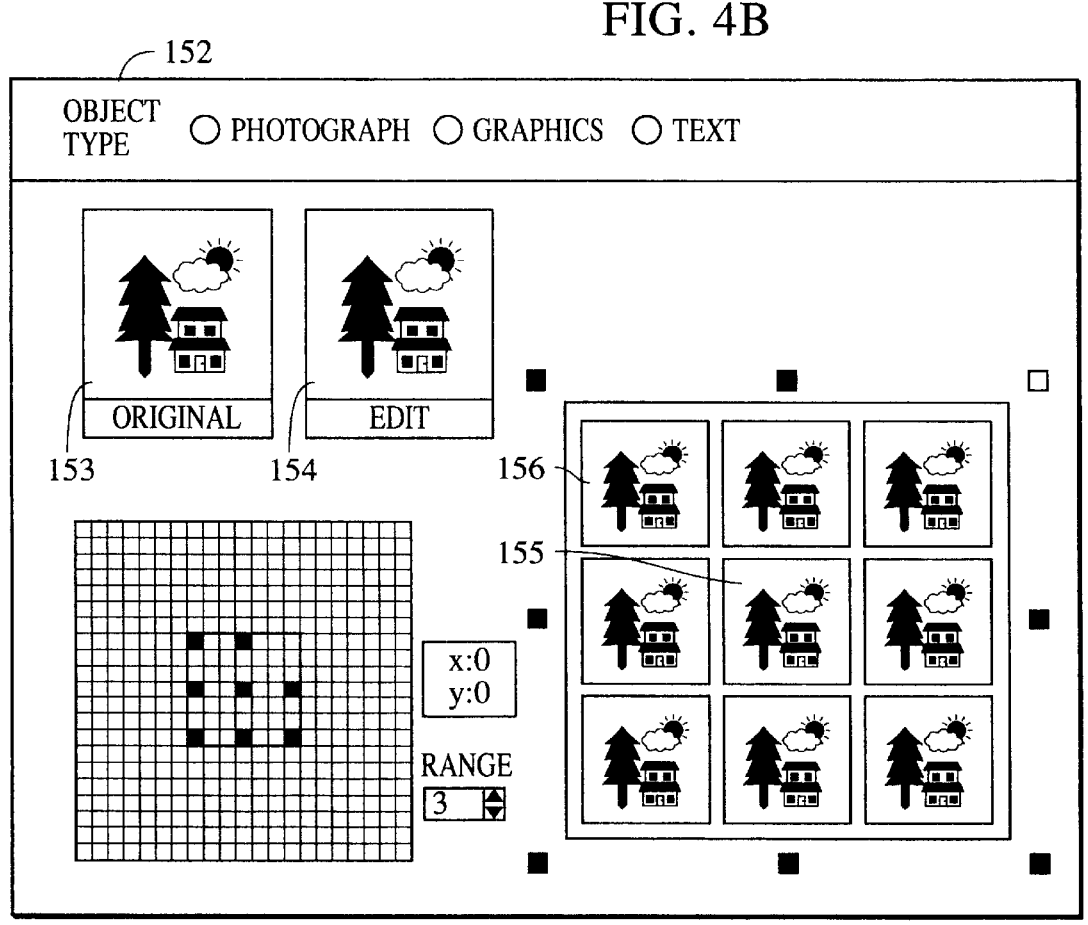
Figure 4C:
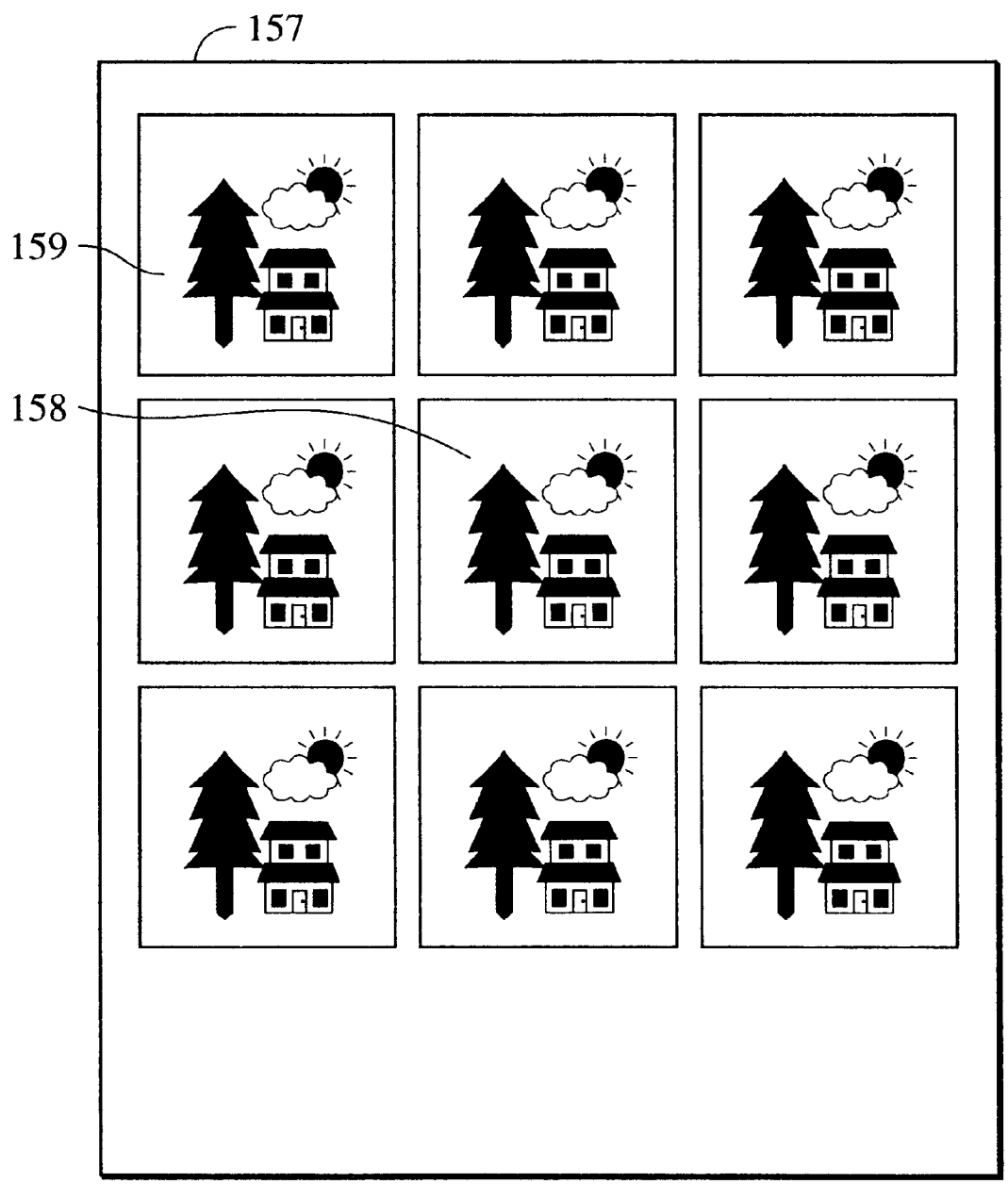

Referring to FIGS. 4A–4C, the catalog printing is now discussed. FIGS. 4A–4C show the catalog printing, thumbnail adjustment, and normal printing.

FIG. 4A shows an image 151 that is printed in normal printing. The user adjusts the printout of the image to its desired color using the thumbnail 156 in the above-described adjustment screen 152. More particularly, a desirable one out of the eight color images is pressed to set it as a current image 155. The user makes adjustment watching an unadjusted original image 153 and a current image 155 for comparison. The thumbnail adjustment is the one performed on the display screen and there are times when a slight difference is caused in an actual printout in tint. In the catalog printing, nine images that are color converted using parameters shown in the thumbnail 156 are printed as shown in FIG. 4C. The original image 151 is reduced and copied through the image rendering module 133, and a plurality of rendered images are arranged in the thumbnail and catalog print. In the catalog print, the original image is reduced to one-ninth or smaller so that the resulting images are printed on a printing paper for the normal mode printing. An image 158 is the one that is processed using the current parameter, and the normal mode printing is performed using the current parameter. An image 159 is the one that is processed using the parameter corresponding to the thumbnail 156.

Information stored in the set value memory 16 shown in FIG. 2 includes address information and adjustment range information of the current image 92 in FIG. 8, and information indicating whether or not the printing mode is the catalog printing in FIG. 3.

The color processing parameter switch 132 shown in FIG. 2 switches the address information of the current image and the eight surrounding images based on the current image address information and adjustment range in order to create the thumbnail image for display and the catalog printing image for catalog printing.

The image rendering module 133 reduces and copies the original image 151 to display a plurality of reduced versions of the original image 151. In the catalog printing, the original image is reduced to one-ninth or smaller so that the resulting images are printed on a printing paper that is used in the normal mode printing. No image rendering is performed in the normal mode. The information discriminating between the catalog printing mode and the normal mode is provided by the set value memory 16.

The color processor module 131 performs color processing in accordance with the address information, converting the RGB multi-level signal to the CMYK binary signal. The conversion by the color processor module 131 is called a plural number of times because image processing is performed for nine pages in the thumbnail adjustment or the catalog printing, and for one page in the normal mode.

An adjusting color-converter 21 converts the RGB multi-level signal into a signal in the rg space, performs adjusting color conversion in the rg space, and then conversion into the RGB multi-level signal. An adjusting color parameter memory 24 stores, according to the address in the general map, a color adjusting parameter which is pre-computed in compliance with the general map and which is to be used in the adjustment in the rg space. More particularly, the adjusting color parameter memory 24 gives, to the adjusting color converter 21, the color adjusting parameter corresponding to the address provided by the color processing parameter switch 132.

The RGB to CMYK converter 22 converts the RGB multi-level signal into the CMYK multi-level signal, and performs this process using known masking and LUT (Look-up Table) techniques. This process uses a pre-computed parameter that offers a chromatic match between a luminance signal and a density signal, and includes a matching step and luminance-density conversion step. No detailed discussion is provided about these steps here.

A halftone converter 23 converts the CMYK multi-level signal into a CMYK binary signal, and employs a known dithering or spread error process.

The processes by the RGB to CMYK converter 22 and halftone converter 23 are needed for printing only, and are not performed in principle when the thumbnail is displayed on the external display device 4 through the display section 14. To assure a match between the printout and the display, the CMYK signal is occasionally converted back into an RGB signal after the process in the RGB to CMYK converter 22 in order to be used as a video signal.

As described above, according to the above embodiment, the thumbnail sketch is formed, namely, the original image is reduced and copied to nine reduced images. The nine images are then color processed using nine different adjusting parameters respectively and arranged on the display screen. The general map indicating the absolute positions of the nine adjusting parameters is displayed on screen. The user selectively adjusts color on screen using the pointing device. The user prints the nine reduced on screen images using the nine different adjusting parameters. Based on the images on the display screen and the printout result, the user moves the current image to the center of the thumbnail to select one of the eight color adjusting parameters and makes the color adjustment process to the original image using the selected parameter. In this way, the user easily and intuitively learns color adjustment to obtain a desired color to the user's preference, and efficiently obtains optimum printouts that meet the purpose of printing.

Second embodiment

The first embodiment processes, as an object for color adjustment, the entire image to be printed. In a second embodiment, color adjustment is performed according to the type of object such as a photograph, graphics and a text, each forming an image. Precise and appropriate color adjustment is thus performed.

Since the entire image to be printed is subjected to color adjustment for the desired color in the first embodiment, the operation is easy and printing is efficiently performed. However, the following problem arises in this case. An original image may be a mixture of text and photograph. When color adjustment is performed, the text portion is also subjected to the color adjustment, which is unnecessary. Although the text is preferably printed in black, another color may be mixed with black against the intention of the user.

Preferably, the photograph, graphics and text as the objects of the image are separately processed in color adjustment. The second embodiment is devised in consideration of this feature.

The user cannot select the object to be adjusted through the setting section 15 in the first embodiment. According to the second embodiment, the user selects the object to be adjusted, such as a photograph, graphics, a text, stores an adjusting value in the set value memory 16 on an object basis, and switches color adjusting parameters through the color processing parameter switch 132 on an object basis. The user thus performs color adjustment on an object basis.

Although the basic construction of the image processing apparatus of the second embodiment remains unchanged from that of the first embodiment, color adjustment is carried out on an object basis. The second embodiment presents color adjustment means that suits more the user's purpose of printing and control method for the means.

The difference of the second embodiment from the first is now discussed.

FIG. 8 shows the adjustment screen presented on the external display device 4 through the display section 14. A field 911, not present in the first embodiment, is now included. The field 911 is used to set an object to be adjusted, and offers three options of photograph, graphics and text. One of the three options is selected at a time. When a photograph 910 is selected as shown, no further objects can be selected. When the object to be adjusted is switched, only the currently selected object is subjected to adjustment in the thumbnail 91 and images 96, 97.

Figure 5:
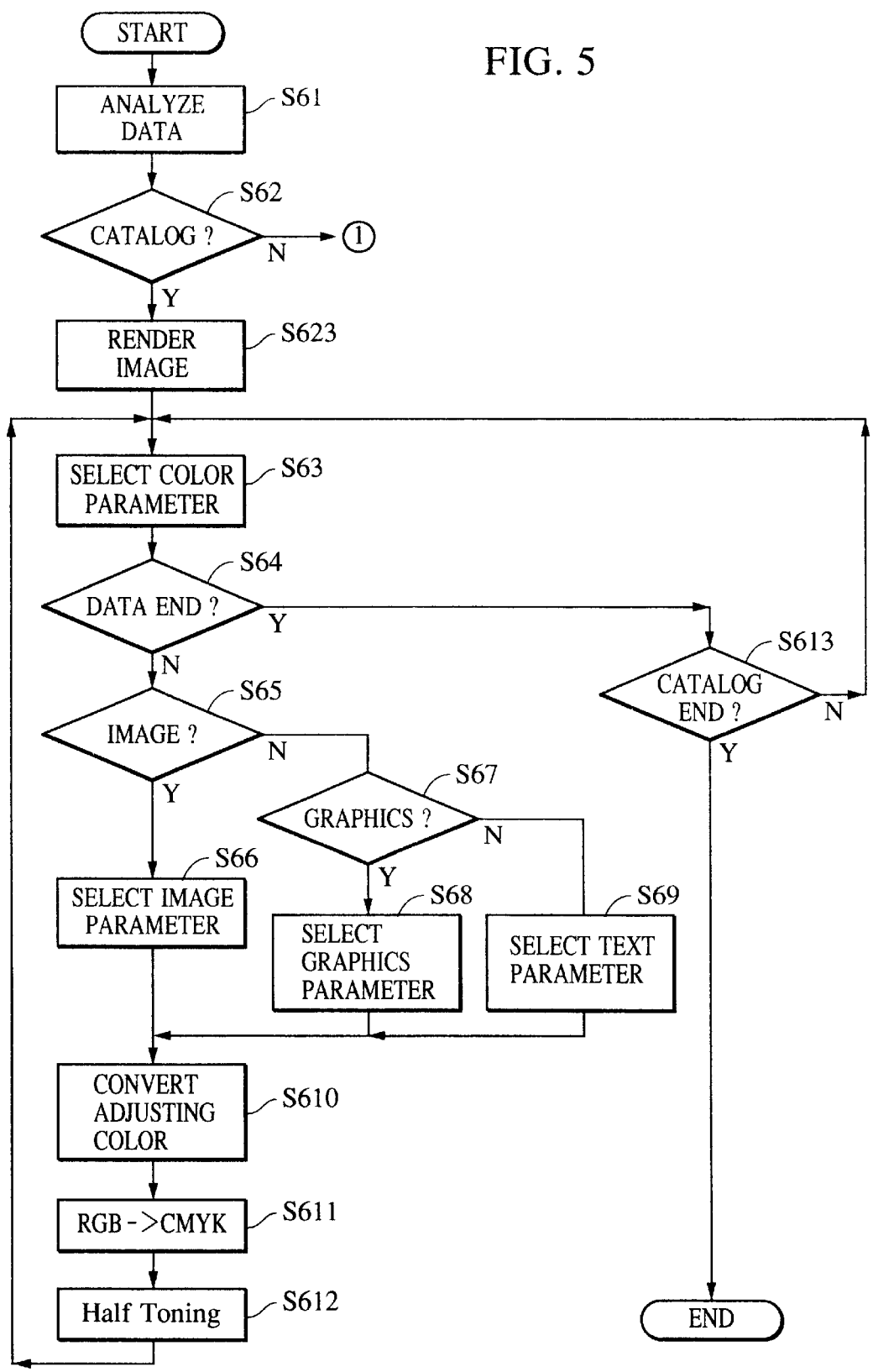
FIG. 5 is a flow diagram showing the flow of control in image processing according to the present invention.
Figure 6:
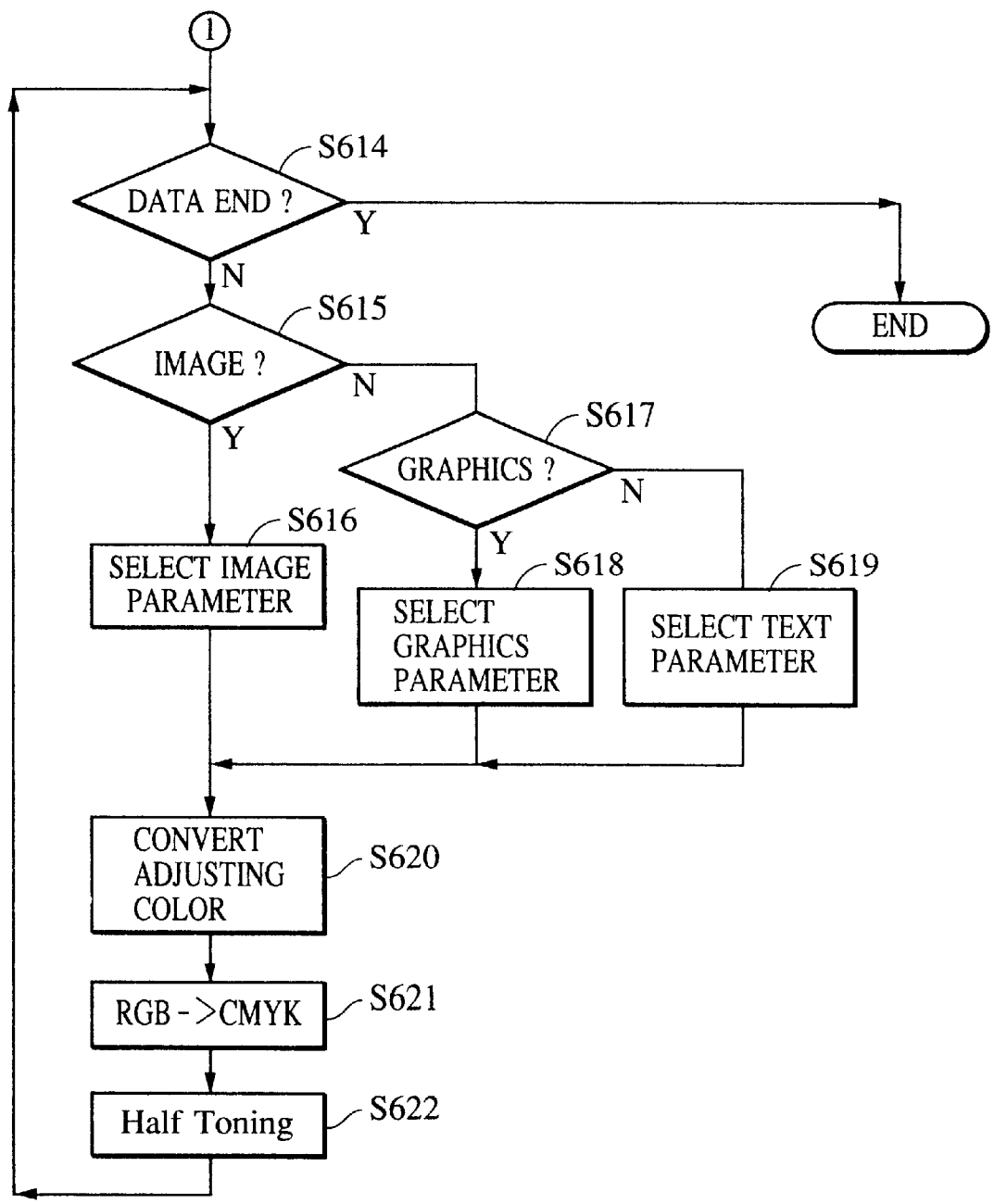
FIG. 6 is a flow diagram showing the flow of control in image processing according to the present invention.

The adjustment is discussed referring flow diagrams shown in FIGS. 5 and 6. Data analysis is performed in step S61 in FIG. 5. The analyzer section 11 in FIG. 2 performs this data analysis, including data sorting for color process in compliance with the object forming an image. In step S62, it is determined whether the process is catalog printing. In the same way as the first embodiment, this determination is made based on the information stored in the set value memory 16 shown in FIG. 2. When it is determined in step S62 that the process is for catalog printing, image rendering is performed in step S63. The image rendering module 133 in FIG. 2 performs this image rendering, and its content remains identical to that in the first embodiment.

Color parameter selection is performed in the steps that follow. As already described, the color processing parameter switch 132 selects color parameters based on the address information and adjustment range information of the current image 92 in FIG. 8 stored on an object basis in the set value memory 16 in FIG. 2. More particularly, the color processing parameter switch 132 switches the address information of the current image and the surrounding eight images based on the current image address information and adjustment range information on an object basis so that a thumbnail image is created for display and so that a catalog print image is created for catalog printing.

In step S64 in FIG. 5, a determination is made of whether the processing of the image data of one page is completed. When the processing of the image data is not completed, it is determined in step S65 whether the data analyzed is a photographic object. When the image is a photographic object, the color processing parameter switch 132 derives the address information that is a color adjusting parameter, based on the current address information and adjustment range information of the photographic object.

When the data is not a photographic object in step S65, it is determined in step S67 whether the data analyzed is a graphic object. When the data is a graphic object, the address information for graphics is derived in step S68. When the data is not a graphic object in step S67, the address information for text is derived in step S69. In step S610, the adjusting color converter 21 in FIG. 2 performs adjusting color conversion. This process is called on an object basis. Based on the address information that is the color processing parameter, the adjusting color converter 21 performs this process using the color adjusting parameter in the adjusting color parameter memory 24. Steps S611 and S612 are identical to those in the first embodiment.

When it is determined in step S64 that the processing of the image data for one page is completed, it is determined in step S613 whether catalog printing is completed. When it is determined that the catalog printing is completed, the process ends. When the catalog printing is not completed, the process returns to step S63.

When the process is not for catalog printing in step S62, the sequence goes to step S614 in FIG. 6. FIG. 6 is a flow diagram for normal printing, which is identical to one of the nine processes in catalog printing.

According to the second embodiment, the user sets color adjustment in accordance with the object in the setting section 15, stores the adjusting value of the respective object in the set value memory 16, and switches the color adjusting parameters on an object basis using the color processing parameter switch 132. The remaining processes in the second embodiment are identical to those in the first embodiment.

According to the second embodiment, as described above, the user selects the object to be adjusted, such as a photograph, graphics, and a text, stores the adjusting value on an object basis, and switches the color adjusting parameters. The color adjustment is thus possible on an object basis, and the user performs color adjustment more in detail and obtains an optimum output.

Third embodiment

A third embodiment of the present invention is now discussed.

In the second embodiment, the color adjustment is performed on an object basis. The third embodiment provides the same result.

In the second embodiment, the user adjusts color in accordance with the object through the setting section 15, by selecting as the object to be adjusted, one from the photograph, graphics and text, and by setting an adjusting value for the selected one. In the third embodiment, the user selects which object a single adjustment is applied to. Since the second embodiment allows the user to adjust color on an object basis, a more detailed color adjustment is made possible. The second embodiment, however, involves a more complicated operation needing the switching of the object to be adjusted. The third embodiment assures an object-conscious color adjustment on an object basis while presenting an easy operation.

Although the third embodiment has the same basic construction as the first and second embodiments, it presents setting means with which the user enjoys a higher operability in the image processing apparatus and also presents the control method of the setting means.

The difference between the third embodiment and the second embodiment is now discussed.

FIG. 10 shows the adjustment screen presented on the external display device 4 through the display section 14. A field 111 is used to set an object to be adjusted, and offers three options of photograph, graphics and text. A plurality of options may be selected at a time. This setting selects which object a current adjustment is applied to. Any object other than the selected objects is not subjected to color adjustment.

Figure 7:
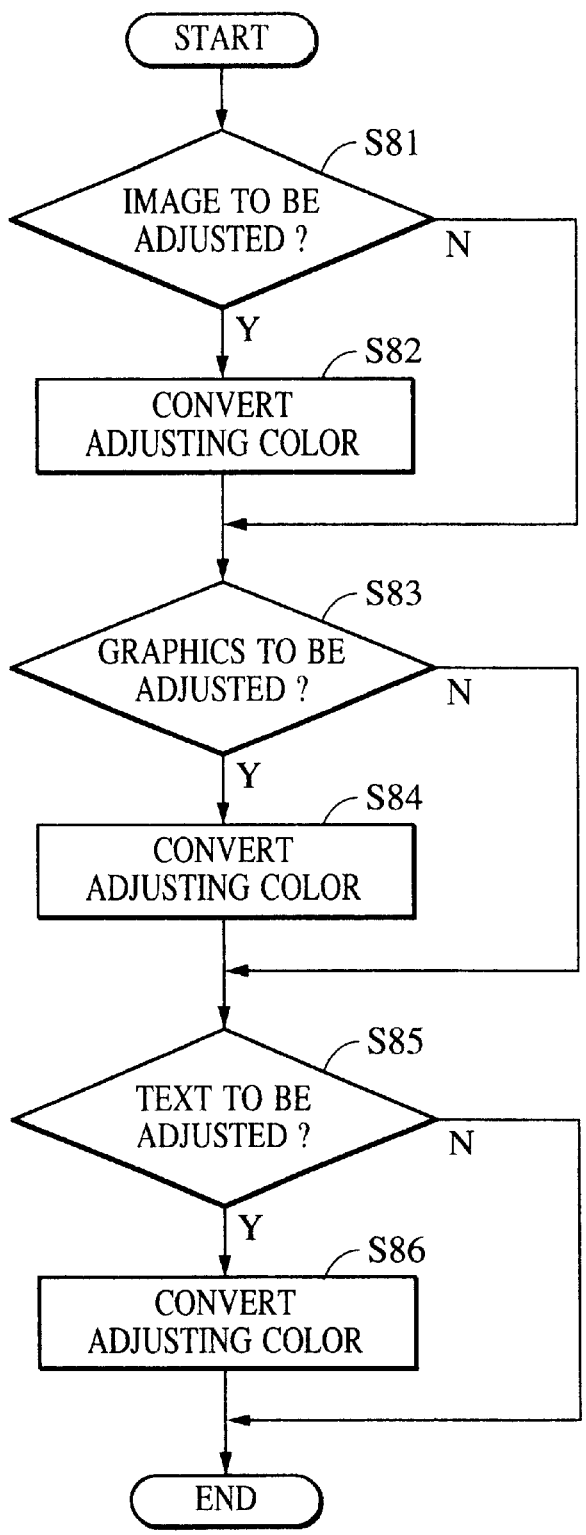
FIG. 7 is a flow diagram showing the flow of control in image processing according to the present invention.

The adjustment is discussed referring to a flow diagram shown in FIG. 7.

FIG. 7 shows the flow diagram of the image processing performed in the color processor module 131 in the image processor 13 shown in FIG. 2. It is determined in step S81 whether a photograph is included in the object to be adjusted is in FIG. 10. This determination is based on the information stored in the set value memory 16. When the object to be adjusted is a photograph, an adjusting color conversion of photograph is performed in step S82. The color adjusting parameters are switched by the color processing parameter switch 132. The color adjusting parameters are stored on an object basis in the second embodiment while they are stored for a single object only in the third embodiment. The color processing parameter switch 132 switches between the nine sets of parameters for thumbnail and catalog printing. When a photograph is not included in the objects to be adjusted in step S83, no color adjustment is performed to the photograph. The sequence goes to step S83. Through steps S83–S86, graphics and text are processed in the same manner as photograph.

Since a plurality of objects to which a single adjustment is applied are selected from a photograph, graphics and text in the third embodiment as described above, the user is allowed to perform the object-conscious color adjustment in an easy-to-set manner. The user efficiently obtains optimum output results.

Fourth embodiment

In the embodiments that follow, two types of color adjusting parameters, "tint" and "value/contrast", are used. It will be perfectly acceptable if other color adjusting parameters including "chroma" and "density" are used.

The image processing apparatus of the fourth embodiment of the present invention includes an analyzer section for analyzing image data such as data in an output control command format and image data transmitted from an application, an expansion section for expanding the image data into data for output based on the analysis result by the analyzer section, an image processor for image-processing the image data when the image data is expanded by the expansion section, a color processor module constituting the image processor, for color-processing the image data, a color processing parameter switch for switching color processing parameters the color processor module uses according to the setting in a setting section, a image rendering module constituting the image processor, for expanding, reducing and copying an image according to the setting in the setting section, the setting section for receiving the instruction of image processing a user of the image processing apparatus enters using an external device depending on the purpose of use of the image processing apparatus and for making settings for image processing, a color processing parameter selector constituting the image processor, for selecting between two types of image processing parameters of "tint" and "value/contrast", a set value memory for storing a value set through the setting section, a display section for outputting the image data expanded by the expansion section to an external display device, and a printer section for outputting the image data expanded by the expansion section to an external printer device.

When the expansion section expands the image data into data for display based on the analysis result provided by the analyzer section which analyzes the image data fed by the application, the image rendering module reduces the image data and reproduces an image of the reduced data while the color processing parameter switch means switches one of the color processing parameters of "tint" and "value/contrast" selected by the color processing parameter selector constituting the setting section. The display means causes the external display device to display the images in an array. The current value is selected from a plurality of parameters.

The current value is used for parameters not selected by the color processing parameter selector. More particularly, when the color processing parameter selector switches from tint to value/contrast, a current value for tint is used while a value/contrast parameter is switched by the color processing parameter switch.

When the color adjustment is performed watching the display screen, the setting section selects a single image on the display screen, and the color processing parameter switch switches the color adjusting parameter in response to an operation while expansion is performed. The display section causes an external display to present the resulting images. The color adjusting parameters now set are stored in connection with each of tint and value/contrast.

When the plurality of images displayed are printed, the image data is expanded by the expansion section using the color processing parameter after the images are rendered as image data for printing through the image rendering module, and the printer section outputs the expanded data to the external printer device. The color adjusting parameters correspond to those presented in an array on the display device. More particularly, the color adjusting parameters for display or the corresponding color adjusting parameters for printing are used. In the same way as in the display, the color processing parameter switch switches the color adjusting parameters the color processing parameter selector selects from those for tint or those for value/contrast, and the current value is used for the parameters not selected.

To obtain a final printout, the original image data is expanded by the expansion section according to the color processing parameter the setting section finally sets, and the printer section outputs the expanded data to the external printer device.

In this embodiment, one of two types of color adjusting parameters of tint and value/contrast is selected. A plural number of copies of a reduced version of the original image are created. Using the selected color adjusting parameter of tint or value/contrast, color adjustment is performed to the copies of the reduced images. The color adjusted images are arranged on the display screen to selectively perform color adjustment. The differently color-adjusted reduced images presented on the display screen are printed. Based on the images on the display screen and the images on the printout result, one is selected out of the plurality of adjusting color parameters to perform color adjustment to the original image.

The user intuitively learns color adjustment to obtain a desired color to the user's own preference. The user can easily select the desired color and efficiently makes image processing setting that serves the purpose of use.

The fourth embodiment is discussed in detail

Figure 13:
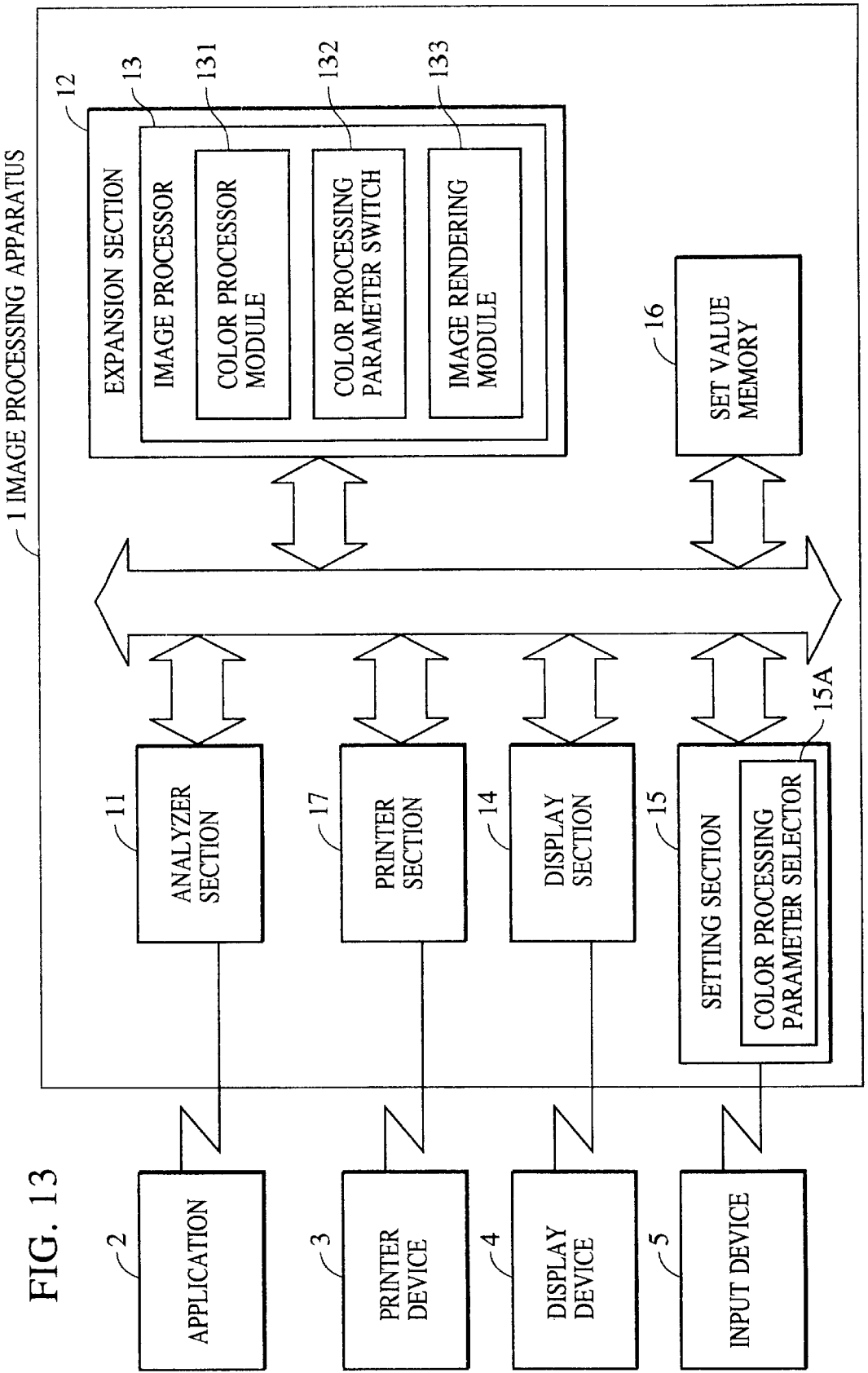
FIG. 13 is a block diagram of the image processing apparatus of a fourth embodiment of the present invention.

FIG. 13 is a block diagram of the fourth embodiment of the image processing apparatus of the present invention.

The process performed by each of the sections shown in FIG. 13 may be constructed of a program module, and may be stored as a printer driver in a hard disk. An unshown CPU running under an operating system executes each module using an unshown RAM as a working memory. This arrangement performs the same function as the following embodiment. Image data may be received from an application under the operation system, and each module may be executed as shown in FIG. 13.

Referring to FIG. 13, there are shown an image processing apparatus 1, an application 2 for allowing the user to draw and edit image data, a printer device 3 for forming a print image based on the output data from the image processing apparatus 1, a display device 4 for forming a display image based on the output data from the image processing apparatus 1, and an input device 5 to which a variety of settings are made from outside.

An analyzer section 11 analyzes the image data transmitted from the application 2. The analysis by the analyzer section 11 includes a process for converting data in the image description format unique to the application into image data to be processed in the image processing apparatus 1. An expansion section 12 performs a variety of processes in accordance with the analysis by the analyzer section 11 for conversion to the output data an output section to be described later outputs. In the expansion section 12, an image processor 13 in particular processes the image data. In the image processor 13, a color processor module 131 performs color processing. In the image processor 13, color processing parameter switch 132 switches color processing parameters when the color processor module 131 processes color. In the image processor 13, an image rendering module 133 makes renderings to the image data coming in from the analyzer section 11, including scale contraction, scale expansion, and copying.

A display section 14 performs a process required for causing an external display device to display image data rendered and a diversity of setting screens. A setting section 15 performs a process which allows the user of the image processing apparatus to make settings using an input device such as a mouse or keyboard to the user's intention.

In the setting section 15, the color processing parameter selector 15A allows the user to select the type of color adjusting parameter when the color processor module 131 performs color processing.

In this embodiment, the display section 14 and setting section 15 help the user make settings by presenting graphically an adjustment screen and output mode setting screen on a monitor. The setting operation will be detailed later.

A set value memory 16 stores values the setting section 15 sets. A printer section 17 performs process required for outputting the output image data expanded by the expansion section 12 to the external printer device 3.

All the above elements are controlled by an unshown CPU according to a program stored in an unshown memory connected to the CPU via a bus.

The printer device 3 is a color laser beam printer in this embodiment. The image data output is a one-page bitmap data prepared for each of four CMYK colors. The printer section 17 sends the image data to the printer device 3, which in turn forms a corresponding image on a recording material using each of the four inks of C (cyan), M (magenta), Y (yellow), and K (black).

Figure 14:
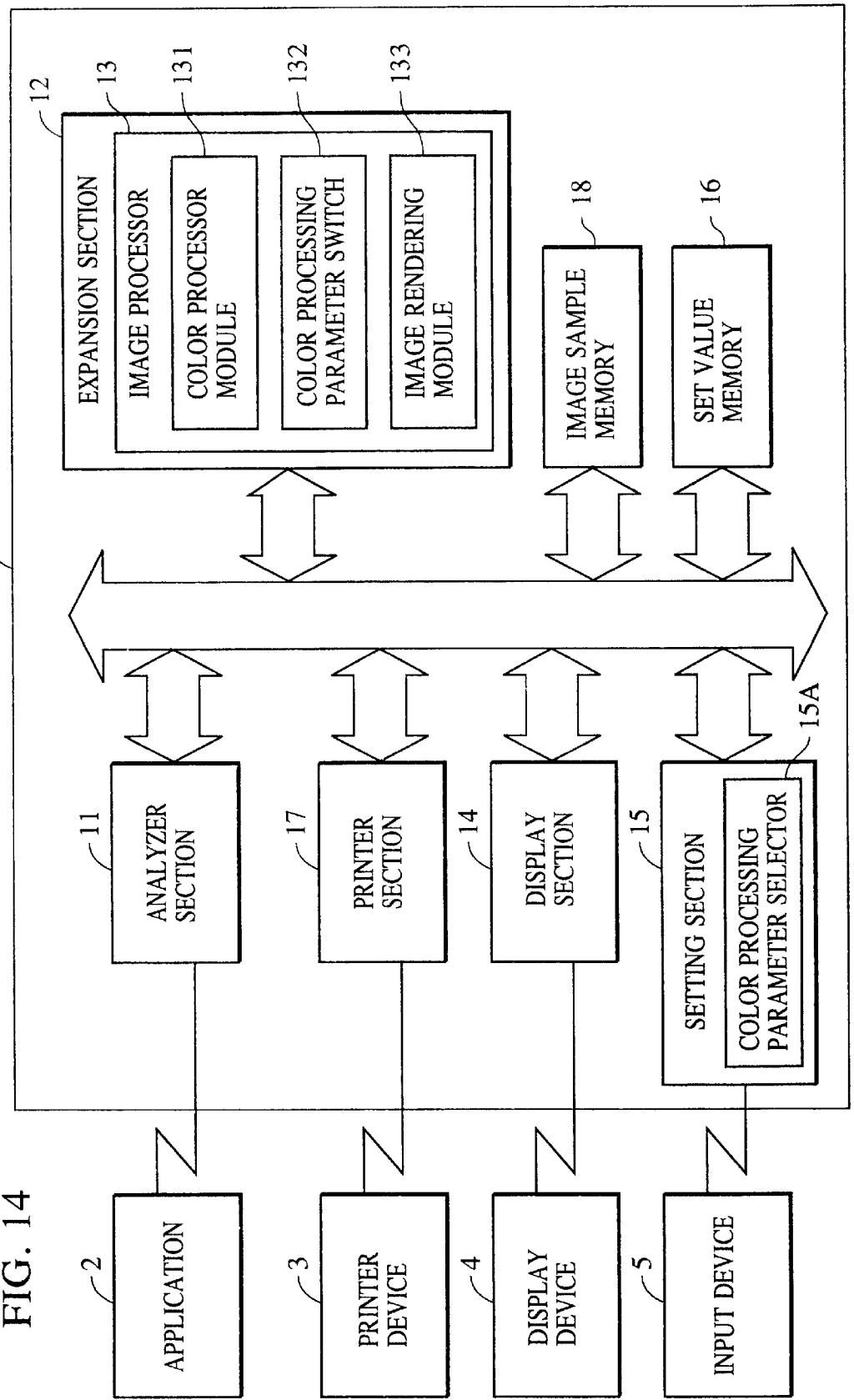
FIG. 14 is a block diagram of the image processing apparatus of a fifth embodiment of the present invention.

FIG. 14 shows the process in which the image processor 13 receives an image color signal from the analyzer section 11 and produces a color signal output for the display section 14 or setting section 15.

The information stored in the set value memory 16 is first referenced. The information is now discussed.

The information stored in the set value memory 16 reflects the setting by the user.

Figure 20:
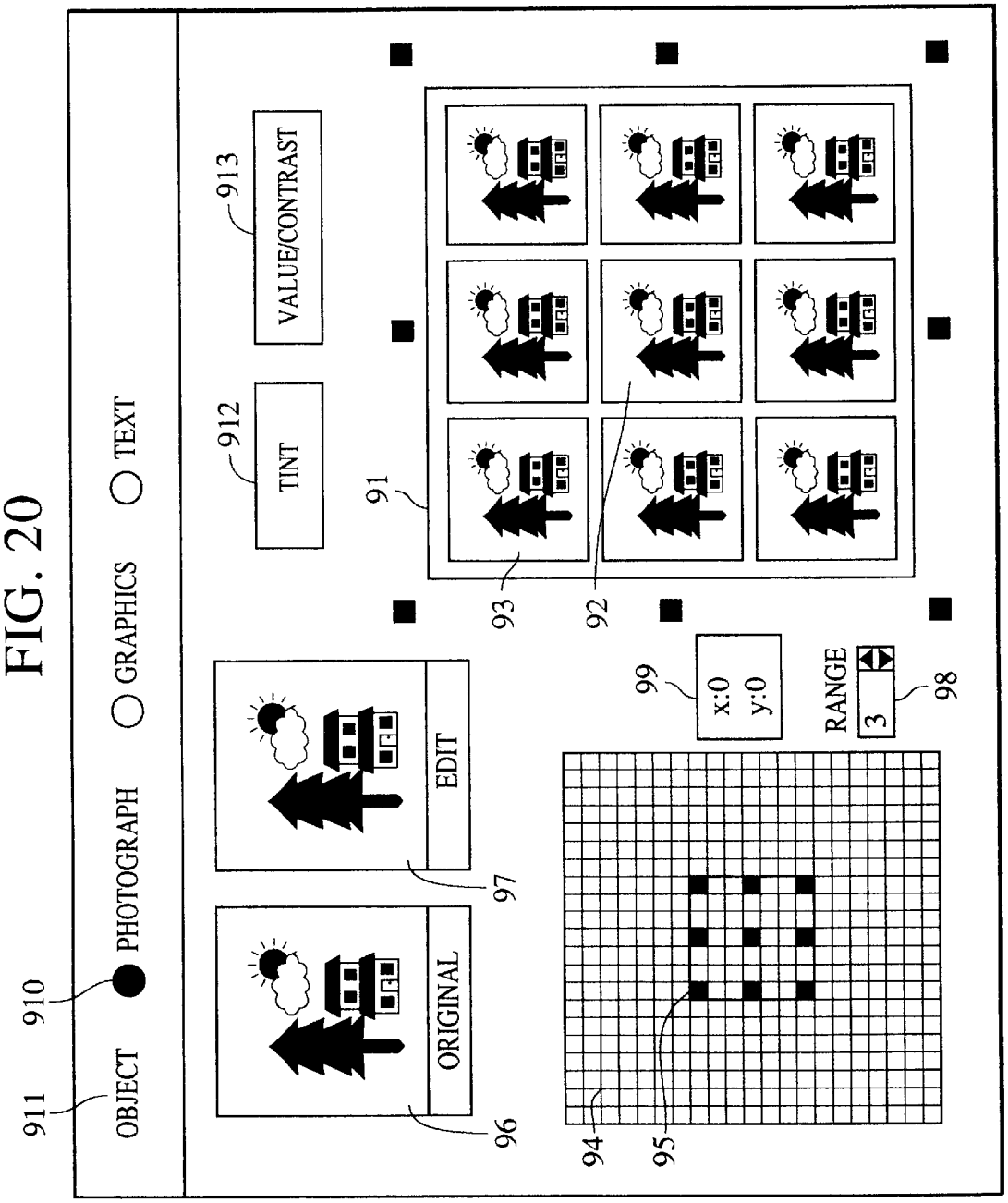
FIG. 20 shows an example of a thumbnail image in the setting section.

Referring to FIG. 20, the adjustment screen graphically presented is discussed. As shown, the display section 14 displays the adjustment screen on the external display device 4. Reference numeral 91 represents an adjustment area and is hereinafter referred to as a thumbnail sketch or simply thumbnail. The thumbnail 91 includes an array of 9 images, and an image 92 is a central one, which is hereinafter referred to as a current image 92. The current image 92 is the image resulting from the latest adjustment, and is always centered with the remaining eight images being adjacent thereto. The eight images surrounding the current image 92 are images respectively enhanced in red, yellow, yellow green, green, light blue, blue, purple and pink, and the images themselves serve as a button for enhanced setting. The markings about the images surrounding the central image have red, yellow, yellow green, green, light blue, blue, purple and pink, and help the user intuitively recognize which image is enhanced in what color with respect to the current image.

Although the above eight colors are employed in this embodiment, chromatic colors other than these colors may be used. Compared with the current image 92, an image 93 is enhanced in green color.

When the user wants an image enhanced in green, for example, the user enters a command through the input device 5, a pointing device such as a mouse, and the setting section 15 to press the image 93. Upon pressing the image 93, the image 93 becomes a current image, and is shifted to the center position designated reference numeral 92. When the current image 92 is updated in this way, eight surrounding images are enhanced in eight colors with respect to the center current image 92. These steps are repeated until the current image 92 agrees with the desired color.

An indicator 94 indicates an area of adjustment, within which the thumbnail 91 is adjustable, and is wherein after referred to as a general map 94. A cursor 95 in the general map 94 indicates its corresponding position in the thumbnail 91. More particularly, nine points of the cursor 95 correspond to the nine images in the thumbnail 91. Each time adjustment is made in the thumbnail 91 as described above, the cursor 95 moves on the general map 94. When the cursor 95 reaches the edge of the general map 94, the thumbnail 91 can not be adjusted further in that direction.

Buttons 912, 913 toggle between the color adjusting parameters for tint and for value/contrast. The tint is selected in above discussion of the thumbnail 91, and the eight images surrounding the current image 92 are images respectively enhanced in red, yellow, yellow green, green, light blue, blue, purple and pink with respect to the image 92.

FIG. 21 shows the case in which value/contrast is selected.

Designated 114 in FIG. 21 is a thumbnail for value/contrast adjustment. The thumbnail 114 shows nine images arranged in the same way as in FIG. 20. A current image 115 is placed in the center of the thumb nail. The current image 115 is the image resulting from the latest adjustment, and is always centered with the remaining eight images around. The eight images surrounding the current image 115 are varied horizontally in contrast and vertical in value and the images themselves serve as a button for setting.

An image 120 is lower in contrast and higher in value than the current image 115. When the user wants the image of such setting, he or she presses the image 120 using the input device 5 and setting section 15. Upon pressing it, the image 120 becomes a current one, and shifts to the position of the image 115. With the image 115 updated, eight surrounding images having value/contrast modified with respect to the new image 115 are shown. Such steps are repeated until the current image 115 becomes a desired one.

Markings 116 indicate that value varies in a vertical direction and markings 117 indicate that contrast varies in a horizontal direction. With these markings, the user visually intuitively recognizes the adjustment method to the peripheral images with respect to the current image.

An indicator 94 indicates an area of adjustment, within which the thumbnail 114 is adjustable, and is a general map. A cursor 95 in the general map indicates its corresponding position in the thumbnail 114. More particularly, nine points of the cursor 95 correspond to the nine images in the thumbnail 114. Each time adjustment is made in the thumbnail 114 as described above, the cursor 95 moves on the general map 94. When the cursor 95 reaches the edge of the general map 94, the thumbnail 114 cannot be adjusted further in that direction.

When the color adjusting parameters are switched back and forth between tint and value/contrast, the display screen is switched back and forth between the one shown in FIG. 20 and the one shown in FIG. 21. Regardless of the switching, the current values are taken over. For example, when the tint parameter is switched to the value/contrast parameter, the current value in tint is used as a fixed value to form images having respectively a plurality of value/contrast parameters. The opposite is true.

An address window 99 in FIG. 20 indicates current position information in the general map 94. In this embodiment, each of x and y ranges from −10 to 0 to +10, and central values 0, 0 mean an unadjusted state. An adjustment range setter 98 adjusts a range of adjustment, which defines the range between the current position and the edge of the general map.

The values set in the address window 99 and the adjustment range setter 98 for each of tint and value/contrast parameters are stored and in response to the switching therebetween, the respective set values are indicated.

Referring to FIG. 20, designated 96 is an original image prior to adjustment. An image 97 is the one that is processed using the same adjusting parameter as that of the current image 92.

A field 911 is used to set an object to be adjusted, and offers three options of photograph, graphics and text. One of the three options is selected at a time. When a photograph 910 is selected as shown, no further objects can be selected. When the object to be adjusted is switched, only the currently selected object is subjected to adjustment in the thumbnail 91 and images 96, 97. The user performs color adjustment on an object basis, such as a photograph, graphics and text. Color adjusting values on an object basis are stored for each of the tint and value/contrast color adjusting parameters, and set values in accordance with the selected option are displayed.

As described above, color adjustment of the thumbnail in terms of tint and value/contrast is performed using the color adjusting parameter having one-to-one correspondence to a position in the general map.

The relationship between the general map in connection with tint and value/contrast and the color adjusting parameter is now discussed.

The process for tint adjustment remains identical to that in the first embodiment.

Figure 22A:
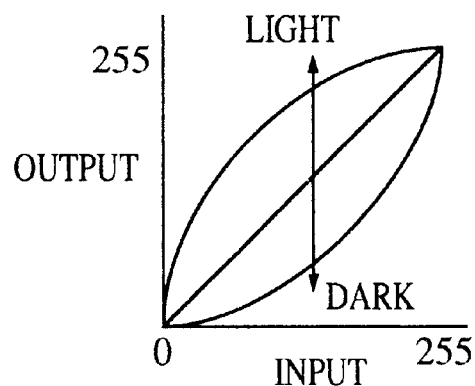
FIGS. 22A–22C shows a conversion process of value/contrast.
Figure 22B:
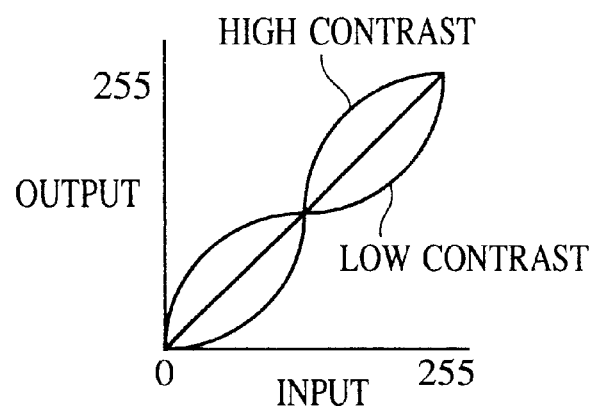
Figure 22C:
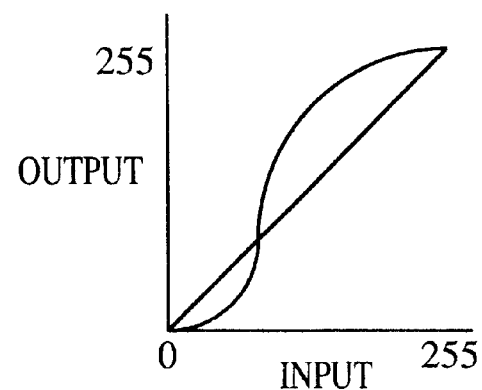

FIGS. 22A–22C show the process of value/contrast adjustment. The value/contrast adjustment is performed respectively to the R, G and B signals.

FIG. 22A shows the relationship between an input signal and an output signal when value is adjusted. To increase value, signal conversion corresponding to a curve denoted "light" is performed. To decrease value, signal conversion corresponding to a curve denoted "dark" is performed.

FIG. 22B shows the relationship between an input signal and an output signal when contrast is adjusted. To increase contrast, signal conversion corresponding to a curve denoted "high contrast" is performed. To decrease contrast, signal conversion corresponding to a curve denoted "low contrast" is performed.

The process for value/contrast may be performed on a real-time basis using equations expressing the above-described curves or using a table prepared beforehand.

As shown in FIG. 22C, a table for value/contrast that is created may be used.

Referring to FIG. 3, an output setting screen in this embodiment is discussed. Like the screen shown in FIG. 20, the output setting screen 171 is provided on the external display device 4 from the display section 14, and constitutes the setting section 15 which selectively switches between a normal mode and a catalog print, for printing. More particularly, when the pointing device is manipulated to press an area 172, a catalog printing is selected. When the pointing device is pressed again, the catalog printing is toggled off to revert back to the normal mode.

Figure 23A:
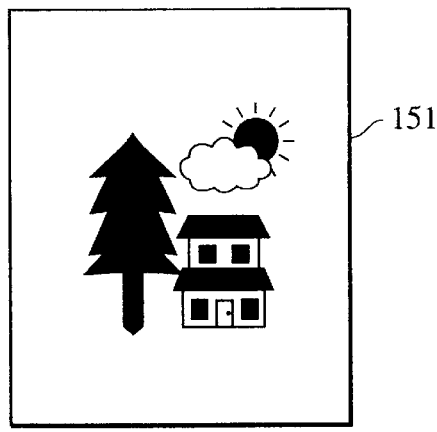
FIGS. 23A–23C shows the relationship between the thumbnail image and catalog printing.
Figure 23B:
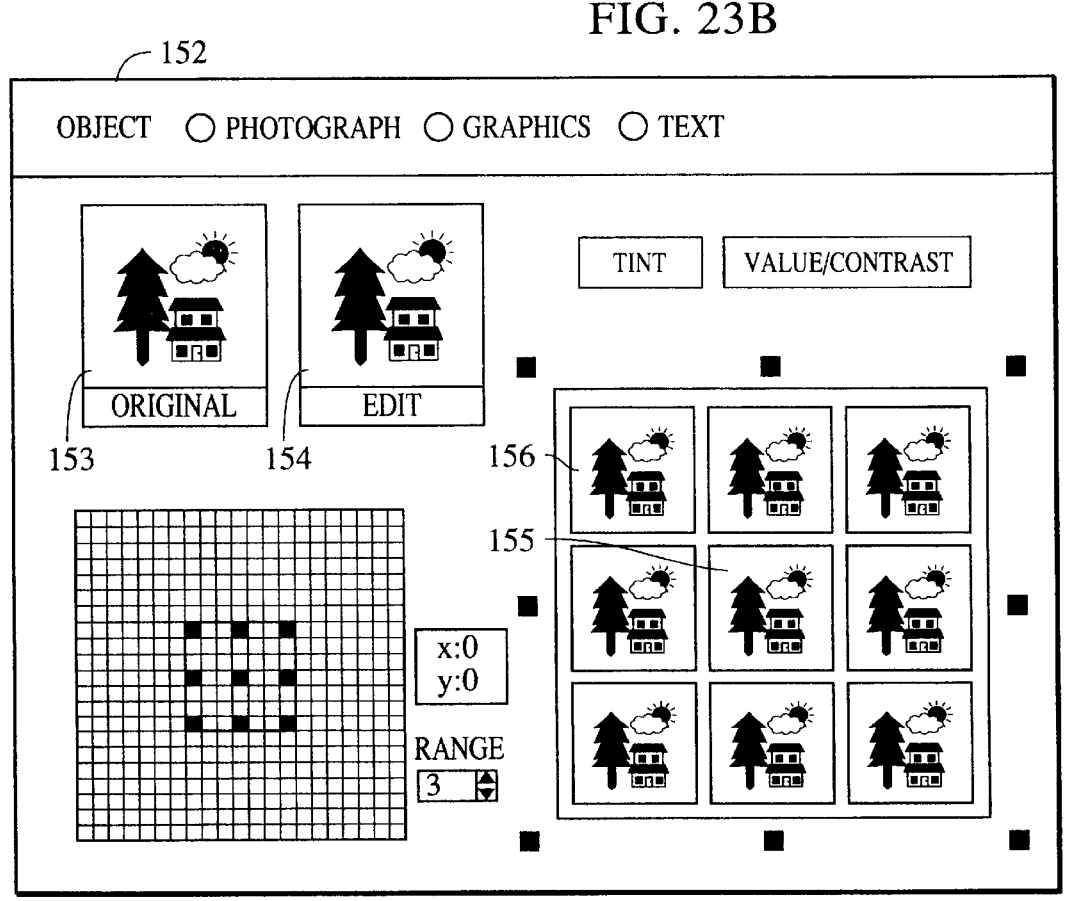
Figure 23C:
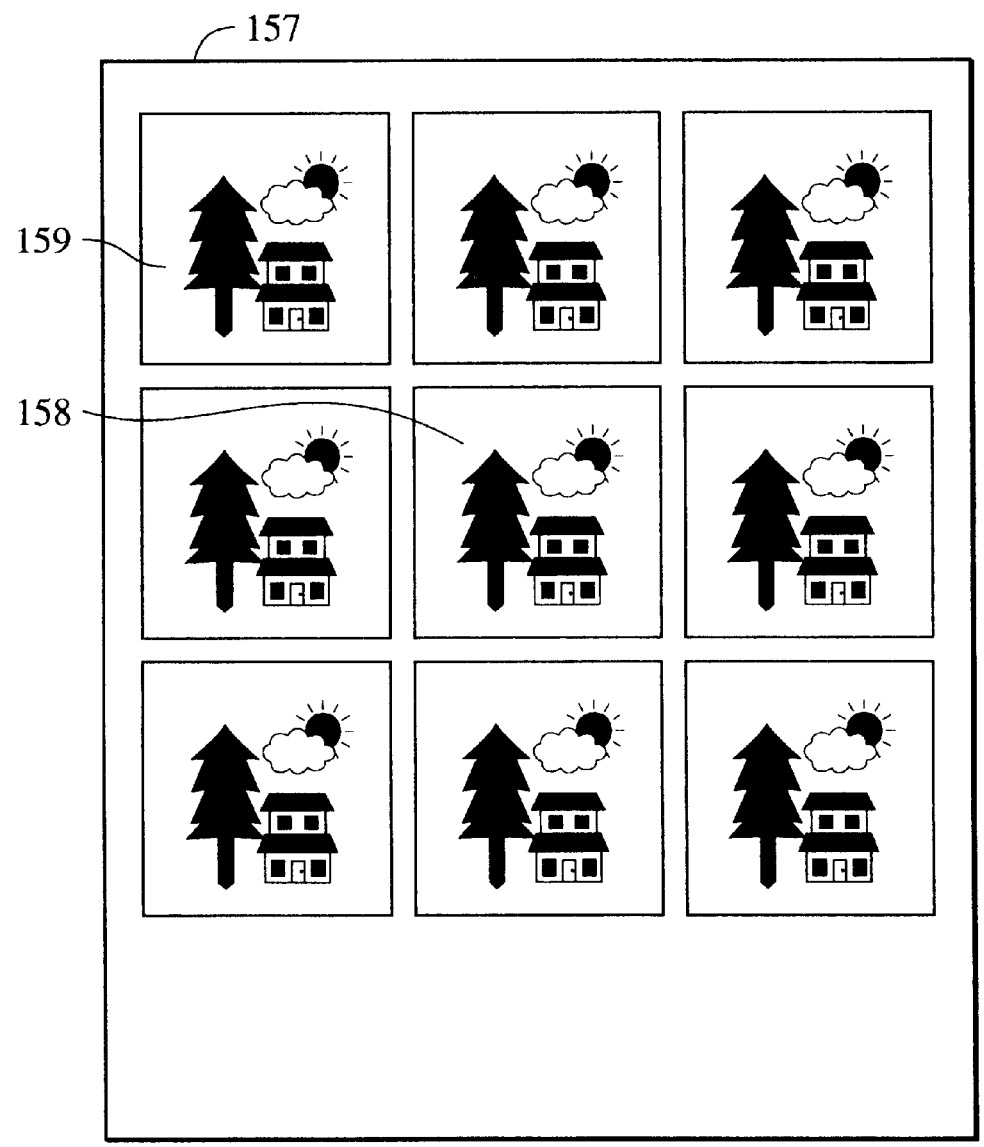

Referring to FIGS. 23A–23C, the catalog printing is now discussed. FIGS. 23A–23C show the catalog printing, thumbnail adjustment, and normal printing.

FIG. 23A shows an image 151 that is printed in normal printing. The user adjusts the printout of the image to its desired color using the thumbnail 156 in the above-described adjustment screen 152. More particularly, a desirable one out of the eight color images is pressed to set it as a current image 155. The user switches between the tint parameter and value/contrast parameters. The user makes adjustment watching an unadjusted original image 153 and a current image 154 for comparison. The thumbnail adjustment is the one performed on the display screen and there are times when a slight difference is caused in an actual printout in tint. In the catalog printing, nine images that are color converted using parameters shown in the thumbnail 156 are printed as shown in FIG. 23C. The original image 151 is reduced and copied through the image rendering module 133, and a plurality of rendered images are arranged in the thumbnail and catalog print. In the catalog print, the original image is reduced to one-ninth or smaller so that the resulting images are printed on a printing paper for the normal mode printing. An image 158 is the one that is processed using the current parameter, and the normal mode printing is performed using the current parameter. An image 159 is the one that is processed using the parameter corresponding to the thumbnail 156.

In the catalog printing in this embodiment, the color processing parameter in the tint thumbnail is used when the tint parameter is selected in FIG. 23B, and the color processing parameters in the value/contrast thumbnail are used when the value/contrast parameter is selected in FIG. 23B.

Stored in the set value memory 16 in FIG. 2 are information about the address and adjustment range of the current image 92, the object to be adjusted, and information about which one of the tint parameter and value/contrast parameter is selected, and information about whether the printing mode is catalog printing in FIG. 14.

The color processing parameter switch 132 in FIG. 2 switches between the current image and one of the eight surrounding images based on the information about the address and adjustment range of the current image, the object to be adjusted, and information about the tint parameter and value/contrast parameters in order to create the thumbnail image for display and the catalog printing image for catalog printing.

The image rendering module 133 reduces and copies the original image 151 to display a plurality of reduced versions of the original image 151. In the catalog printing, the original image is reduced to one-ninth or smaller so that the resulting images are printed on a printing paper that is used in the normal mode printing. No image rendering is performed in the normal mode. The information discriminating between the catalog printing mode and the normal mode is provided by the set value memory 16.

The color processor module 131 performs color processing in accordance with the address information, converting the RGB multi-level signal to the CMYK binary signal. The conversion by the color processor module 131 is called a plural number of times because image processing is performed for nine pages in the thumbnail adjustment or the catalog printing, and for one page in the normal mode.

An adjusting color converter 21 converts the RGB multi-level signal into a signal in the rg space, performs adjusting color conversion in the rg space, and then conversion into the RGB multi-level signal. In the value/contrast adjustment, the adjusting color converter 21 converts an RGB multi-level signal to an RGB multi-level signal in accordance with the set value.

Figure 18:
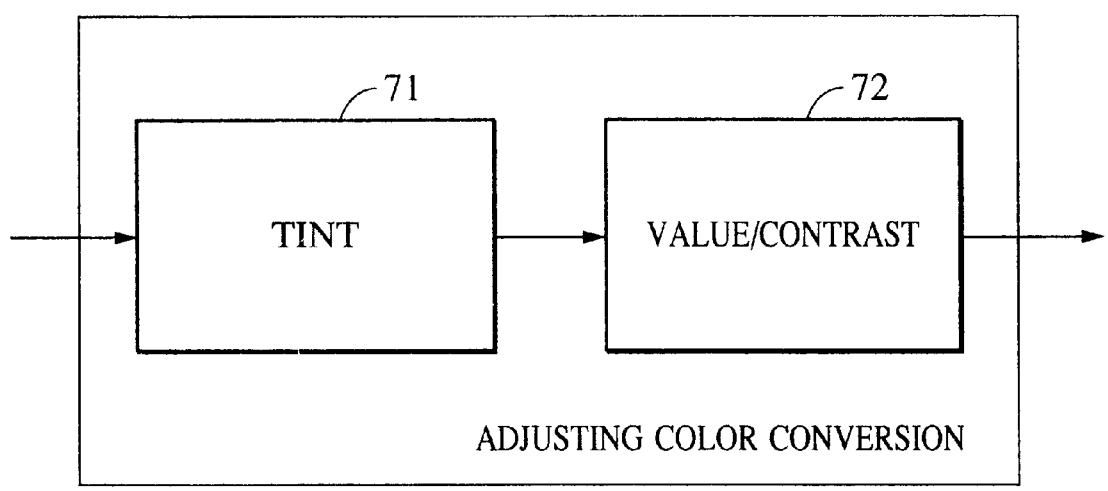
FIG. 18 is a flow diagram showing the flow of control in adjusting color conversion according the present invention.

As shown in FIG. 18, the adjusting color converter 21 serially performs the above processes in this embodiment using the above-described table based on the color adjusting parameter. Also, a table synthesized from these tables may be used.

An adjusting color parameter memory 24 stores a color adjusting parameter which is pre-computed in compliance with the general map according to the address in the general map, and gives, to the adjusting color converter 21, the color adjusting parameter corresponding to the address provided by the color processing parameter switch 132. The color adjusting parameter is stored according to the type of the object to be adjusted on the basis of tint parameter and value/contrast parameter.

The RGB to CMYK converter 22 converts the RGB multi-level signal into the CMYK multi-level signal, and performs this process using known masking and LUT (Lookup Table) techniques. This process uses a pre-computed parameter that offers a chromatic match between a luminance signal and a density signal, and includes a matching step and luminance-density conversion step. No detailed discussion is provided here about these steps.

A halftone converter 23 converts the CMYK multi-level signal into a CMYK binary signal, and employs known dithering or spread error process.

The processes by the RGB to CMYK converter 22 and halftone converter 23 are needed for printing only, and are not performed in principle when the thumbnail is displayed on the external display device 4 through the display section 14.

To assure a match between the printout and the display, the CMYK signal is occasionally converted back into an RGB signal after the process in the RGB to CMYK converter 22 in order to be used as a video signal.

As described above, according to the above embodiment, the thumbnail sketch is formed, namely, the original image is reduced and copied to nine reduced images. The nine images are then color processed using nine different adjusting parameters in terms of tint and value/contrast respectively and arranged on the display screen. The general map indicating the absolute positions of the nine adjusting parameters is displayed on screen. The user selectively adjusts color on screen using the pointing device. The user prints the nine reduced on screen images using the nine different adjusting parameters. Based on the images on the display screen and the printout result, the user moves the current image to the center of the thumbnail to select one of the eight color adjusting parameters and makes the color adjustment process to the original image using the selected parameter. In this way, the user easily and intuitively learns color adjustment to obtain a desired color to the user's preference, and efficiently obtains optimum printouts that meet the purpose of printing.

According to this embodiment, the user of the image processing apparatus efficiently achieves printout results suited to the purpose of printing by implementing a simple and easy-to-understand color adjustment.

Fifth embodiment

A fifth embodiment of the present invention is now discussed in detail. In the fourth embodiment, the image input by the user is subjected to a color adjustment process. The fifth embodiment assures a reliable color adjustment by using an arbitrary number of prepared image data having typical features. According to the fourth embodiment, a highly efficient printing process is performed because the image input by the user is processed as the object to be adjusted, in color adjustment for a desired color. The fourth embodiment, however, has the following problem. Since the image input by the user is processed as the object to be adjusted, the application has to select a page as the object to be adjusted when the user has a plurality of pages of input images. When the image is adjusted on screen, an image area relative to the entire page is smaller in the input image, and the image area on the monitor screen becomes even smaller depending on the resolution of the monitor. Color adjustment is thus difficult to perform.

Preferably, an arbitrary number of prepared image data having typical features are selectively used besides the image input by the user during the color adjustment of images. When the image is subjected to adjustment for printing, the image input by the user is used for printing. The fifth embodiment is developed to permit such a mode of operation.

The user cannot select the image to be adjusted in the setting section 15 in the fourth embodiment. In the fifth embodiment, the user selects the image to be adjusted through the setting section 15, stores a plurality of images to be adjusted, and uses the image which is prepared beforehand as the object to be adjusted in the image processor. The user easily performs color adjustment on screen.

Although the fifth embodiment has the same basic construction as the fourth embodiment, image processing apparatus selects one from the image input by the user and the plurality of beforehand prepared images, during color adjustment on screen. In the fifth embodiment, the image processing apparatus has the image processor more suited to the user's purpose and the control method of the image processor.

In the same manner as in the fourth embodiment, each of the sections of the image processing apparatus may be constituted by a program module.

The difference between the fifth embodiment and the fourth embodiment is now discussed.

FIG. 14 is a block diagram showing the image processing apparatus of the fifth embodiment of the present invention. As shown, the fifth embodiment has an image sample memory 18, which is different from the fourth embodiment.

Figure 24A:
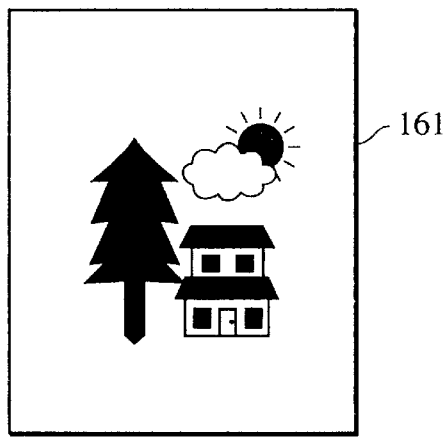
FIGS. 24A–24C shows the relationship between the thumbnail image and catalog printing in the fifth embodiment.
Figure 24B:
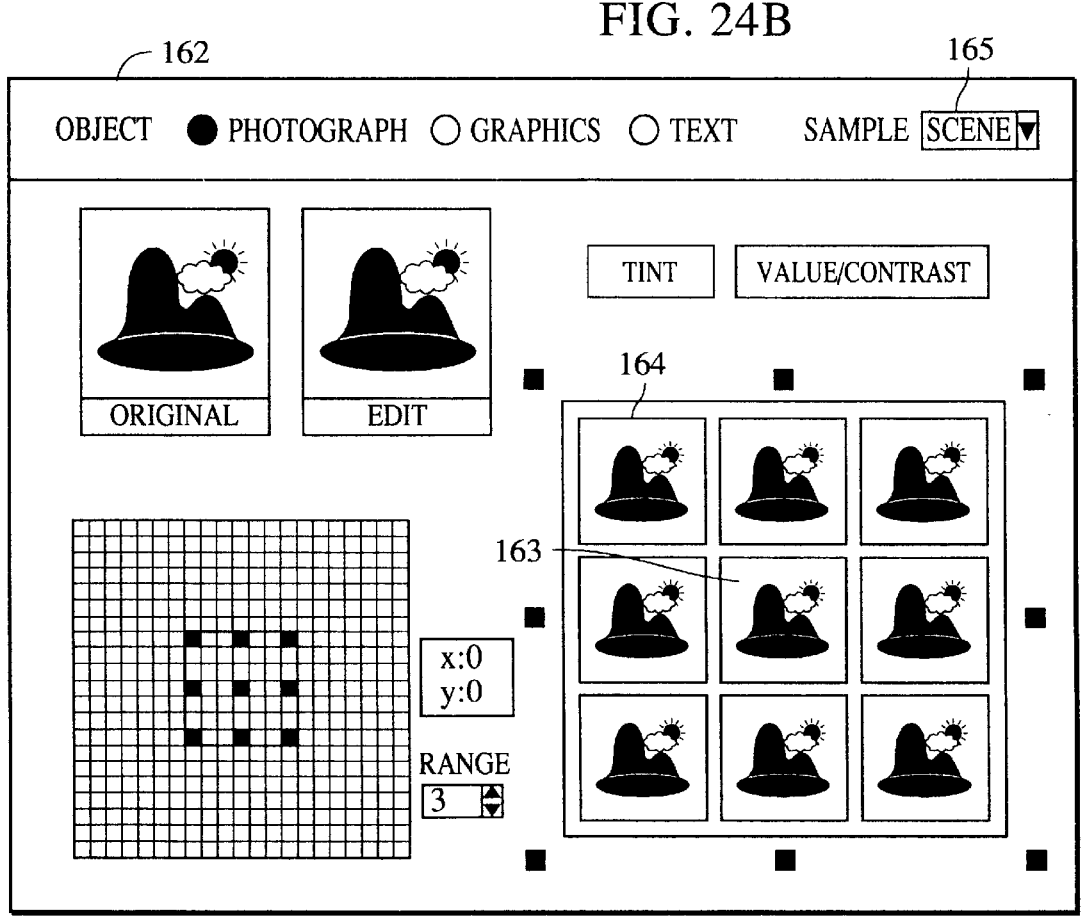
Figure 24C:
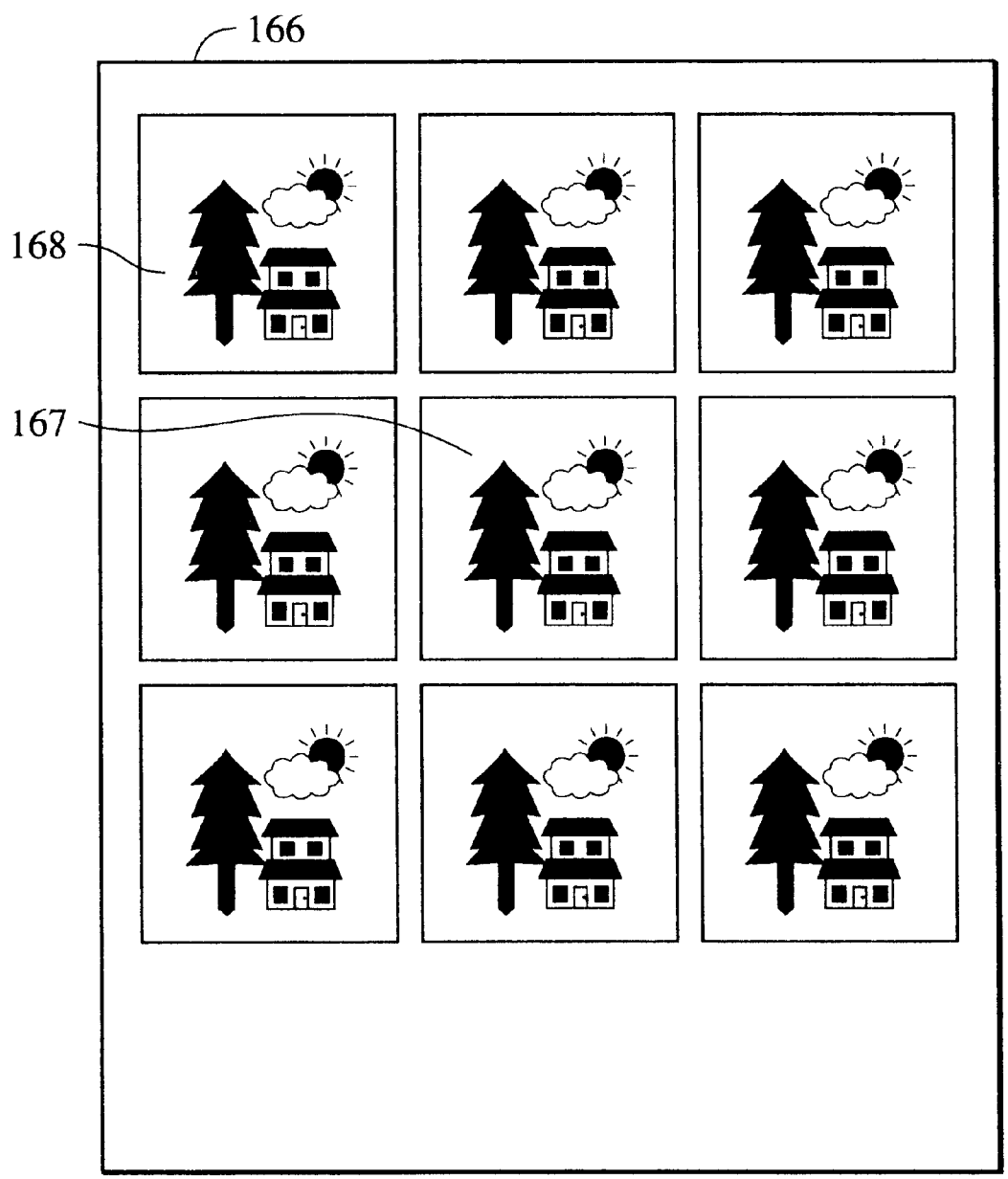

Referring to FIGS. 24A–24C, an adjustment screen is now discussed.

An image 161 shown in FIG. 24A is input by the user. The adjustment screen 162 is provided on the external display device 4 by the display section 14. A field 165, not present in the fourth embodiment, is provided on screen. The field 165 selects the adjustment image, and a pull-down menu indicating options appears when the arrow to the right of the field 165 is pressed using the pointing device. Listed in the options are a user image for the image input by the user, and particular images featuring a landscape, food, glass, skin color, and other things. By switching the options, the adjustment image 162 is also switched. In the thumbnail 164, color processing is performed to the adjustment image in accordance with the current setting.

The apparatus may be designed so that the user may add an arbitrary image in the options. In this case, the image sample memory 18 is arranged such that an additional image is stored therein.

The option listings may be changed according to the type of the object to be adjusted. In the graphics as the object to be adjusted, for example, "gradation" and "basic eight colors" may be used as the options.

In this way the user performs adjustment on screen by selecting an easy-to-adjust image. The operation for the adjustment remains identical to that in the fourth embodiment.

Figure 15:
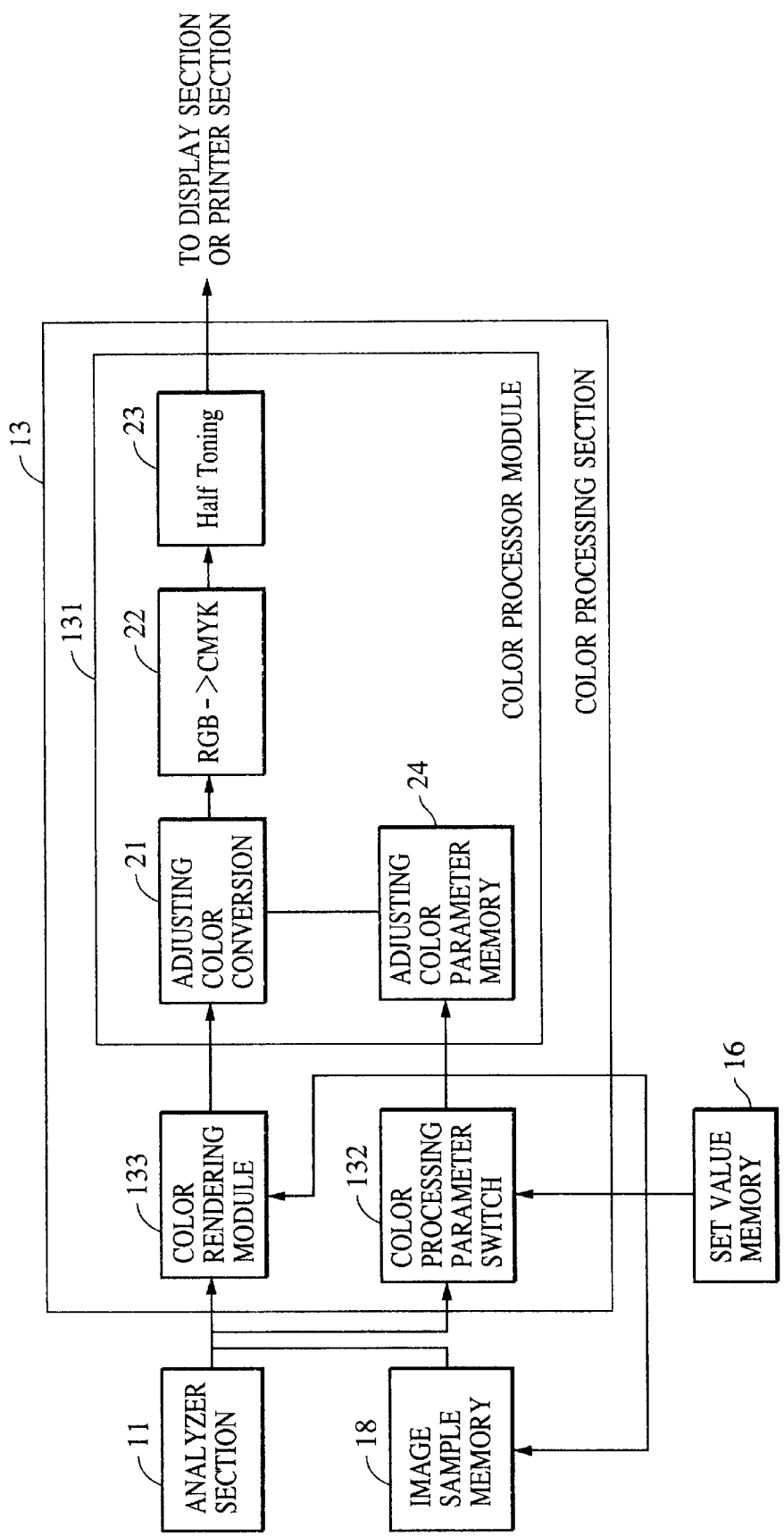
FIG. 15 is a block diagram showing the image processor of the image processing apparatus of the fifth embodiment of the present invention.

Referring to FIG. 15, the process of the image processing apparatus of this embodiment is discussed. The set value memory 16 stores the information for the adjustment image besides the information described in connection with the fourth embodiment.

As shown in FIG. 15, the fifth embodiment has the image sample memory 18. The image rendering module 133 reduces the original image, makes a plurality of the reduced images, and arrays them on screen. The color adjustment on screen in this embodiment is performed to the image retrieved from the image sample memory 18 rather than to the image input by the user, based on the above-described adjustment image stored in the set value memory 16. In the catalog printing mode, however, the image input by the user is used.

The tonality of the output image is correctly verified by using the user input image in the catalog printing.

In the fifth embodiment, the user selects the image to be adjusted through the setting section 15, stores a plurality of images to be adjusted in the set value memory 16, and switches the images to be processed through the image rendering module 133. The remaining process steps are identical to those in the fourth embodiment.

According to the fifth embodiment, as described above, an arbitrary number of prepared image data having typical features are selectively used besides the image input by the user during the color adjustment of images. The images prepared beforehand are stored. With the easy-to-use color adjustment arrangement, the user performs color adjustment in more detail, and achieves optimum output results.

Sixth embodiment

A sixth embodiment of the present invention is now discussed in detail.

The fourth embodiment permits color adjustment according to the type of tint and value/contrast parameters. In the sixth embodiment, the apparatus determines whether the printer device is the color one or monochrome one, and whether printing is in a color mode or a monochrome mode. When the device is the monochrome one or when the printing is in the monochrome mode, the image processing is reliably performed using only the value/contrast parameters out of the two types of parameters.

Since the fourth embodiment permits color adjustment according to the type of tint and value/contrast parameters, an efficient printing is assured. Although the fourth embodiment works in the image processing apparatus capable of color printing, the tint parameter adjustment becomes insignificant in achromatic color printing using a monochrome printer or using a color printer but in a monochrome mode. The user is forced to take unnecessary operational steps.

The image processing-apparatus preferably determines whether the printer device is a color or monochrome machine and whether the printer device is in a color mode or monochrome mode, and performs image processing using the value/contrast parameters only out of the two types of parameters when the printer device is a monochrome machine or when the printer device is in a monochrome mode.

The sixth embodiment is organized to satisfy the above-described need. More specifically, the image processing apparatus sets the printing mode in the setting section 15 depending on whether the user selects between the color printing mode and the monochrome printing mode, acquires from the printer section 17 information indicating whether the printer device is a color printer or a monochrome printer, stores the printer type information in the set value memory, and switches the display screen in the setting section 15 depending on the printer type information. Image processing is thus simplified in the monochrome printing.

The sixth embodiment is identical to the fourth embodiment in its basic construction, but is different in that the image processing apparatus is provided with an easy-to-operate setting section to simplify the image processing in the monochrome printing and in the control method of the apparatus. The difference between the sixth embodiment and the fourth embodiment is now discussed.

Figure 19:
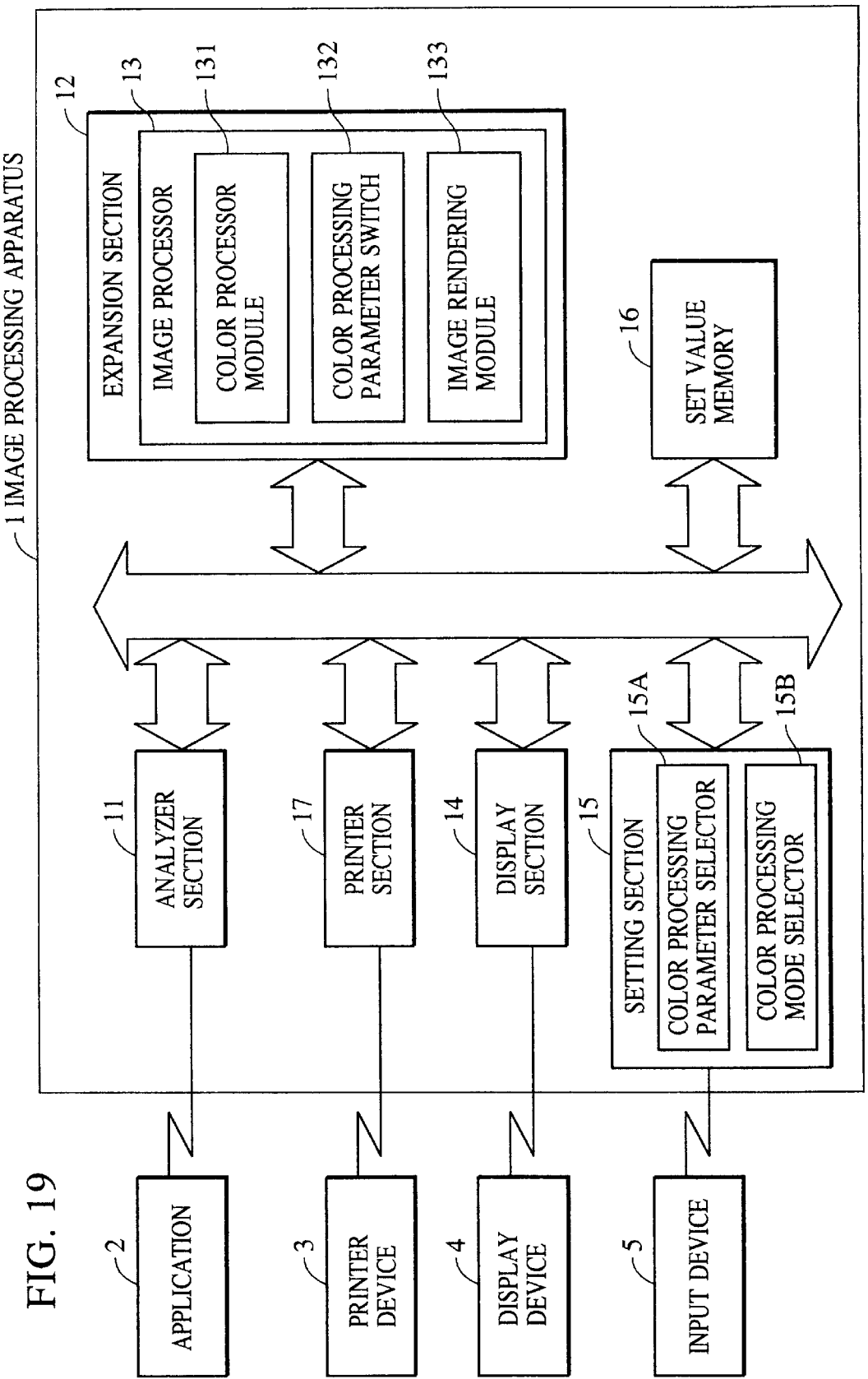
FIG. 19 is a block diagram showing the construction of the image processing apparatus of the sixth embodiment of the present invention.

FIG. 19 is a block diagram showing the image processing apparatus of the sixth embodiment. As shown, a color processing mode selector 15B is added to the apparatus of the fourth embodiment.

Figure 17:
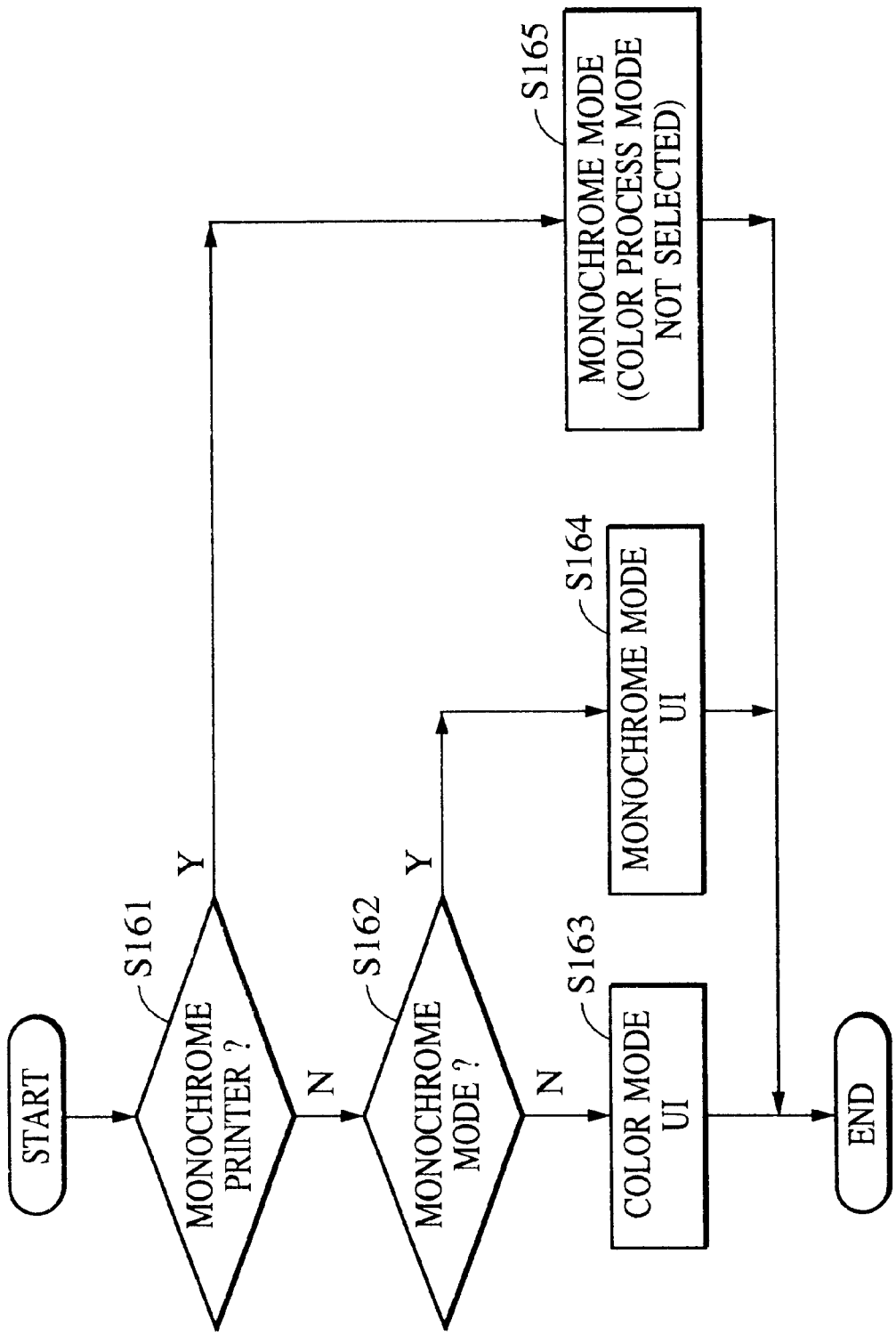
FIG. 17 is a flow diagram showing the flow of control in image processing according to the sixth embodiment of the present invention.

Referring to a flow diagram shown in FIG. 17 and an adjustment screen, the image processing in the sixth embodiment is now discussed.

Figure 16A:
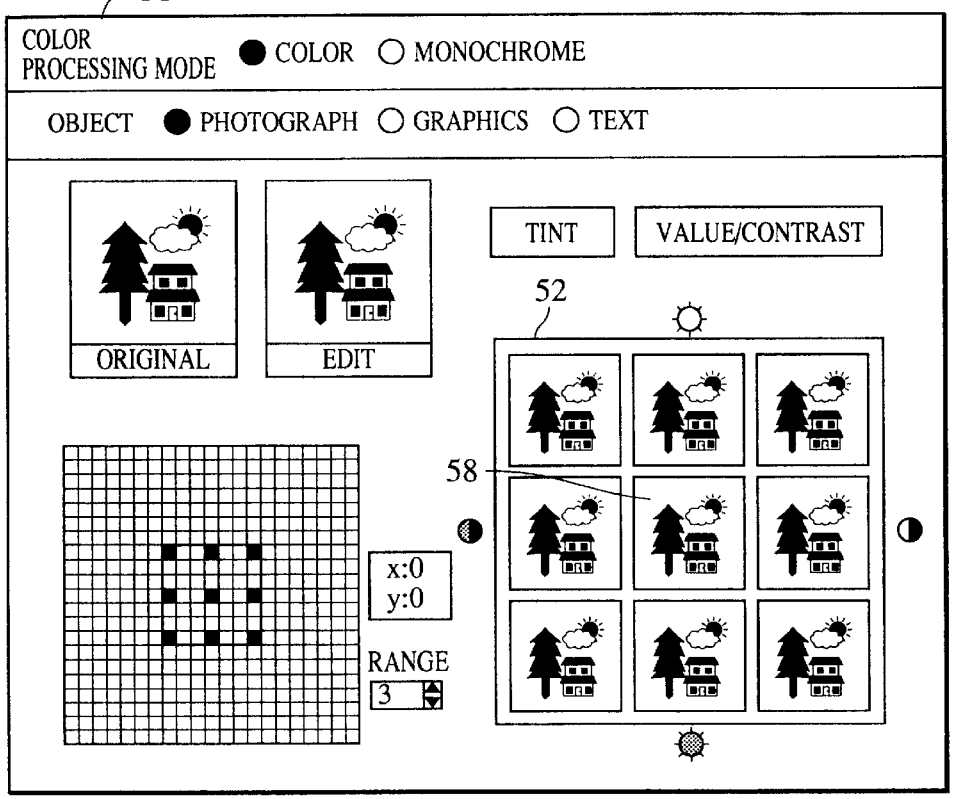
FIGS. 16A and 16B are explanatory views showing catalog printing according to a sixth embodiment of the present invention.

It is determined in step S161 whether the printer device 3 is a color printer or a monochrome printer. This determination is performed by referencing the printer type information which is beforehand acquired by the printer section 17 from the printer device 3 and is stored in the set value memory 16. Alternatively, the printer type information is beforehand stored in the set value memory 16 in accordance with the system without acquiring the information from the printer device 3. When it is a color printer in step S161, it is determined in step S162 whether the printer device 3 is in a color printing mode or in a monochrome printing mode. This determination is performed by referencing the information stored in the set value memory 16 in accordance with the value stored in the color processing mode selector 15B. A field 51 shown in FIG. 16A is one example of the color processing mode selector 16B. In the field 51, the color printing mode and monochrome printing mode work in a toggle fashion in which either of both modes is selected at a time.

When the printer device 3 is in a color printing mode in step S162, the display section 14 presents the setting screen as shown in FIG. 16A. As shown, the color mode setting field 51 is added to the fourth embodiment. The rest of the setting screen is identical to that of the fourth embodiment.

Figure 16B:
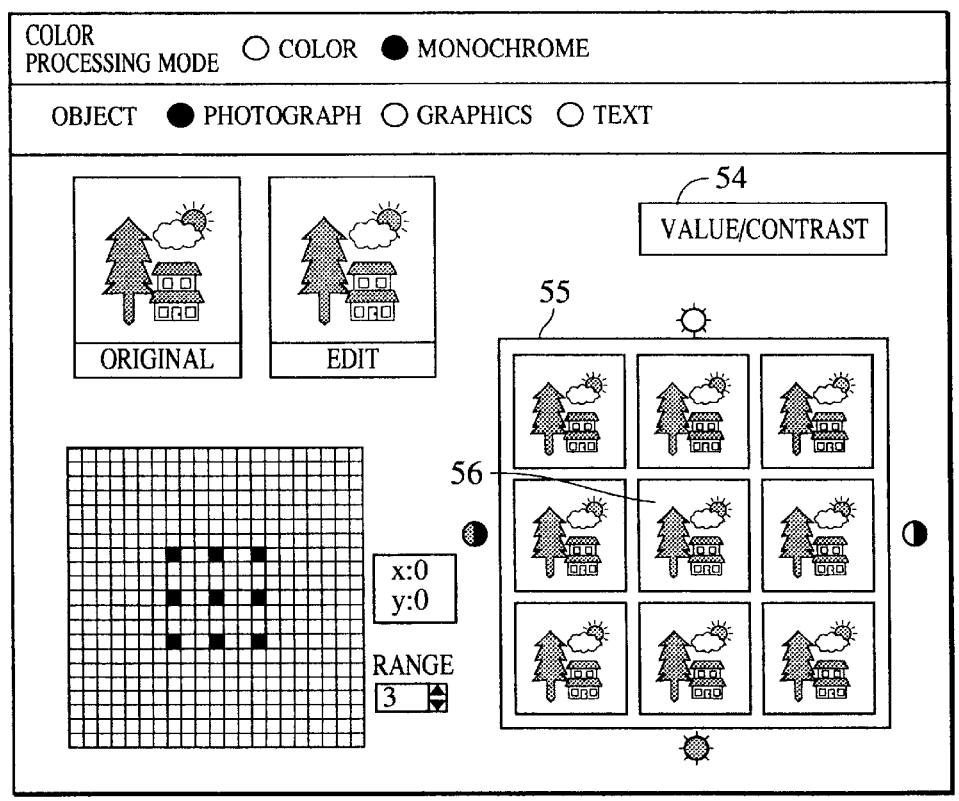

When the printer device 3 is not in a color printing mode, the display section 14 presents the setting screen shown in FIG. 16B, in which a monochrome mode is selected. As shown a button for tint is not presented, and a label "value/contrast" at 54, which is not a button, is indicated on screen.

In the monochrome printing mode in this embodiment, the adjustment screen is also monochrome.

As shown in FIG. 16B, the tint adjustment, which is not effective in monochrome operation, is hidden from the user to provide the user with an easy-to-operate environment.

When the printer device 3 is a monochrome printer, the display section 14 presents the monochrome setting screen in step S165. The color processing mode selector 15B is not displayed because no switching is made between the monochrome printing mode and color printing mode. The setting screen is as shown in FIG. 16B but without the color processing mode selector 15B.

Hiding the tint related area on screen is sufficient enough, because color adjustment is performed using two types of parameters of tint and value/contrast in the embodiments of the present invention. For the same reason, the switching of the setting screen between color and monochrome is relatively easily performed.

As described above, the image processing apparatus sets the printing mode in the setting section 15 depending on whether the user selects between the color printing mode and the monochrome printing mode, acquires from the printer section 17 information indicating whether the printer device is a color printer or a monochrome printer, stores the printer type information in the set value memory, and switches the display screen in the setting section 15 depending on the printer type information. The remaining processes of the sixth embodiment remains identical to those in the fourth embodiment.

According to the sixth embodiment, a determination is made of whether the printer device is a color printer or a monochrome printer and whether the printer device is in a color printing mode or in a monochrome printing mode, and image processing is performed using the value/contrast parameters only out of the two types of parameters when the printer device is a monochrome machine or when the printer device is in a monochrome mode. With this easy-to-operate arrangement, the user achieves efficiently optimum output results.

Seventh embodiment

The image processing apparatus of the present invention includes analyzing means for analyzing image data such as data in an output control command format and image data transmitted from an application, expanding means for expanding the image data into data for output based on the analysis result by the analyzing means, image processing means for image-processing the image data when the image data is expanded by the expanding means, color processing means constituting the image processing means, for color-processing the image data, color processing parameter switch means for switching color processing parameters the color processing means uses according to the setting in setting means, image rendering means constituting the image processing means, for expanding, reducing and copying an image according to the setting in the setting means, color adjusting parameter converter means constituting the image processing means, for converting the color processing parameter into a color processing parameter for printing according to the setting in the setting means, the setting means for allowing a user of the image processing apparatus to make a setting for image processing through an external device depending on the purpose of use of the image processing apparatus, set value memory means for storing a value set through the setting means, display means for outputting the image data expanded by the expanding means to an external display device, in response to the parameter switch means, and printer means for outputting the image data expanded by the expanding means to an external printer device.

When the expanding means expands the image data into data for display (thumbnail) based on the analysis result provided by the analyzing means which analyzes the image data provided by the application, the image rendering means reduces the image data for a display device, reproduces an image of the reduced data, and expands the reproduced images using varied color processing parameters, and the display means causes the external display device to display the images.

When the user makes color adjustment through the setting means while monitoring a display screen, the user selects one image on the display screen. In response to an operation by the user, the image data is expanded while the color processing parameter switch means switches the color processing parameters. The display means causes the external display to display the resulting image.

When the plurality of images displayed are printed (in a catalog printing mode), the image data is expanded by the expanding means using the color processing parameter after the images are rendered as image data for printing through the image rendering means, and the printer means outputs the expanded data to the external printer device. In the course of this process, the parameter converter means converts the color processing parameter for printing to correspond to the color processing parameter which is used by the display device for parallel presentation. More particularly, the color adjusting parameter means corrects the color processing parameter so that the difference between a plurality of images in the thumbnail becomes equal to the difference in a catalog print.

The conversion process is required because the RGB color space for a color signal for display is different from a CMYK color space for a printing color signal. For example, there are times when no visual difference results on a catalog printout even if there is a visual difference between a plurality of images in the thumbnail on the display screen. In such a case, a correction to the thumbnail may not be reflected in the printout in appearance. The color adjusting parameter converter means corrects such a problem. The color adjusting parameter converter means corrects the color processing parameter so that the difference between a plurality of images in the thumbnail and the difference in a catalog print are equalized.

To obtain a final printout, the color processing parameter for display finally set by the setting means is converted to the printing color processing parameter, the original image data is expanded by the expanding means according to the printing color processing parameter, and the printer means outputs the expanded data to the external printer device.

In this embodiment, the images are displayed in the thumbnail, and printed in the catalog printing mode, the color adjusting parameter for the thumbnail display is converted to the printing color processing parameter, and color adjustment is then performed to the original image using the printing color adjusting parameter finally selected.

The user visually easily learns color adjustment for a desired color, easily selects the desired color, and efficiently makes settings for image processing in compliance with the purpose of use of the apparatus.

Referring to the drawings, the seventh embodiment of the present invention is now discussed.

Figure 25:
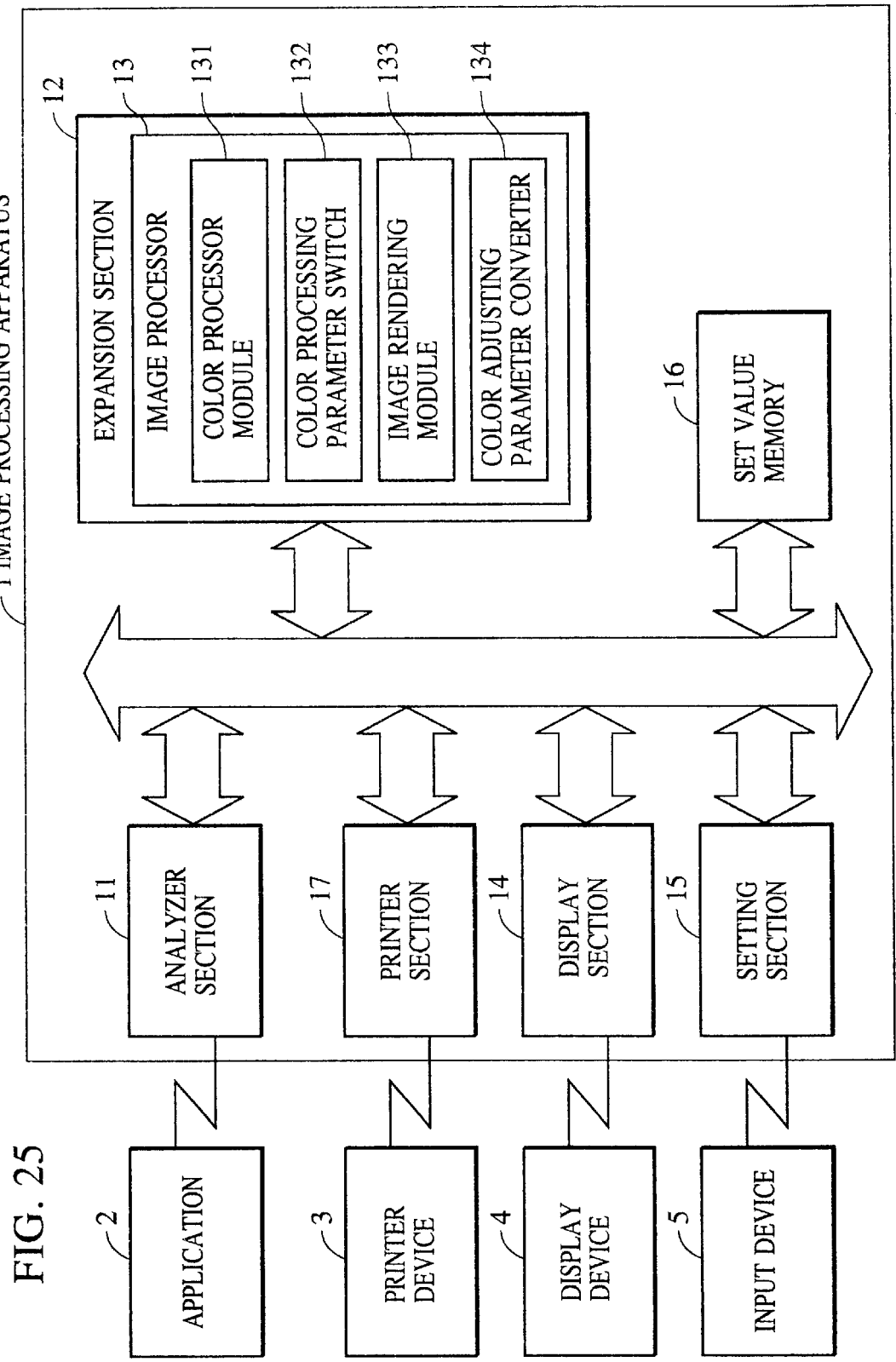
FIG. 25 is a block diagram showing the construction of image processing apparatus of a seventh embodiment of the present invention.

FIG. 25 is a block diagram showing the seventh embodiment of the present invention.

Referring to FIG. 25, there are shown the image processing apparatus 1, an application 2 for allowing the user to draw and edit image data, a printer device 3 for forming a print image based on the output data from the image processing apparatus 1, a display device 4 for forming a display image based on the output data from the image processing apparatus 1, and an input device 5 to which a variety of settings are made from outside.

An analyzer section 11 analyzes the image data transmitted from the application 2. The analysis by the analyzer section 11 includes a process for converting data in the image description format unique to the application into image data to be processed in the image processing apparatus 1. An expansion section 12 constitutes expanding means which performs a variety of processes in accordance with the analysis by the analyzer section 11 for conversion to the output data an output section to be described later outputs. In the expansion section 12, an image processor 13 processes the image data. In the image processor 13, a color processor module 131 constitutes color processing means which performs color processing. In the image processor 13, a color processing parameter switch 132 switches color processing parameters when the color processor module 131 processes color. In the image processor 13, an image rendering module 133 makes renderings to the image data coming in from the analyzer section 11, including scale contraction, scale expansion, and copying. A color adjusting parameter converter 134 in the image processor 13 converts the color processing parameter used in the color processor module 131 into the parameter for printing.

A display section 14 performs a process required for causing an external display device to display image data rendered and a diversity of setting screens. A setting section 15 performs a process which allows the user of the image processing apparatus to make settings using an input device such as a mouse or keyboard to the user's intention. In this embodiment, the display section 14 and setting section 15 help the user make settings by presenting graphically an adjustment screen and output mode setting screen on a monitor. A set value memory 16 stores values the setting section 15 sets. A printer section 17 performs a process required-for outputting the output image data expanded by the expansion section 12 to the external printer device 3.

All above elements are controlled by an unshown CPU according to a program stored in an unshown memory connected to the CPU via a bus.

The printer device 3 is a color laser beam printer in this embodiment. The image data output is a one-page bitmap data prepared for each of four CMYK colors. The printer section 17 sends the image data to the printer device 3, which in turn forms a corresponding image on a recording material using each of the four inks of C (cyan), M (magenta), Y (yellow), and K (black).

Figure 26:
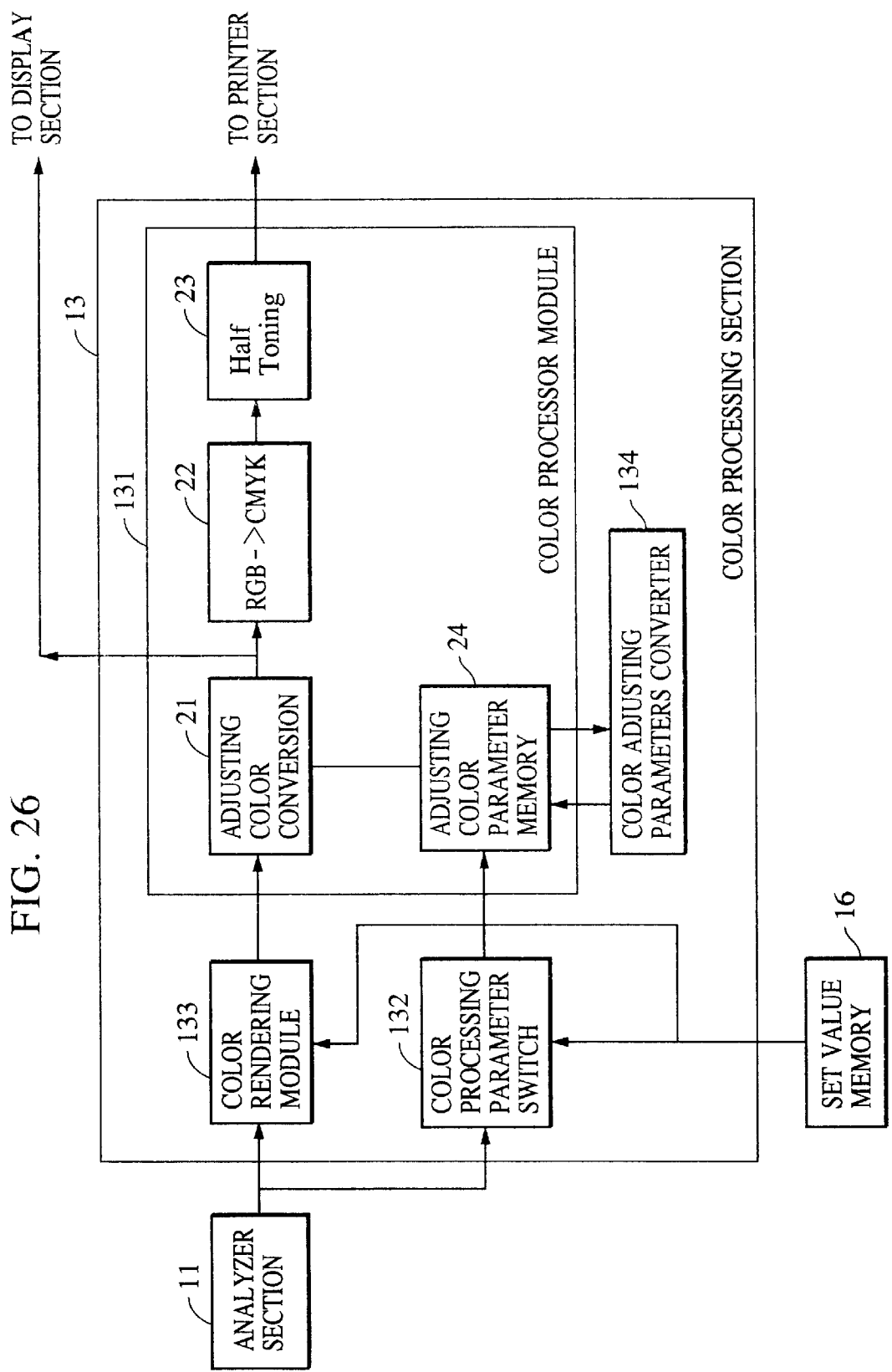
FIG. 26 is a block diagram showing the image processor of the image processing apparatus of the present invention.

FIG. 26 shows the process in which the image processor 13 receives an image color signal from the analyzer section 11 and produces a color signal output for the display section 14 or setting section 15.

The information stored in the set value memory 16 is first referenced. The information stored in the set value memory 16 reflects the setting by the user.

The adjustment screen graphically presented is identical to fourth embodiment (shown in FIGS. 20 and 21).

The adjustment of tint and value/contrast performed according to the setting on the setting screen remains identical to that in the fourth embodiment.

The output setting screen in this embodiment is identical to the first embodiment (FIG. 3).

Referring to FIGS. 23A–23C, the catalog printing is now discussed. FIGS. 23A–23C show the catalog printing, thumbnail adjustment, and normal printing.

FIG. 23A shows an image 151 that is printed in normal printing. The user adjusts the printout of the image to its desired color using the thumbnail 156 in the above-described adjustment screen 152 in FIG. 23B. More particularly, a desirable one out of the eight color images is pressed to set it as a current image 155. The user switches between the tint parameter and value/contrast parameters. The user makes adjustment watching an unadjusted original image 153 and a current image 154 for comparison. The thumbnail adjustment is the one performed on the display screen and there are times when a slight difference is caused in an actual printout in tint. In the catalog printing, nine images that are color converted using parameters shown in the thumbnail 156 are printed as shown in FIG. 23C.

The color processing parameter of the thumbnail image presented on the external display device 4 is converted by the color adjusting parameter converter 134 shown in FIG. 26 to correspond to the printing color processing parameter. As already described, there are times when no visual difference results on a catalog printout even if there is a visual difference between a plurality of images in the thumbnail on the display screen. In such a case, a correction to the thumbnail may not be reflected in the printout in appearance. The color adjusting parameter converter means corrects such a problem. The color adjusting parameter converter 134 corrects the color processing parameter so that the difference between a plurality of images in the thumbnail and the difference in a catalog print are equalized.

The conversion by the color adjusting parameter converter 134 is now discussed. The tint adjustment is performed as described with reference to FIG. 11. A color A(R, G, B) in the RGB space is converted to a color a(r, g, b) in the rg space, adjustment is performed to obtain a'(r', g', b'), and a'(r', g', b') is converted into A'(R', G', B') in the RGB space.

Several examples in the conversion by the color adjusting parameter converter 134 are considered. Two examples are quoted here.

In a first example, the conversion is performed with a'(r', g', b') converted into a''(r'', g'', b'') according to the following equations.

$$r''=\alpha 1 * r'$$

$$g''=\alpha 2 * g'$$

$$b''=\alpha 3 * b'$$

where α1, α2 and α3 are arbitrary coefficients.

In a second example, the conversion is performed with A'(R', G', B') converted into A''(R'', G'', B'') according to the following equations.

$$R''=\beta 1 * R'$$

$$G''=\beta 2 * G'$$

$$B''=\beta 3 * B'$$

where β1, β2 and β3 are arbitrary coefficients.

Multiplication by coefficients is employed in this embodiment. Alternatively, power computation may be used.

The color adjusting parameter converter 134 converts the color processing parameter into the printing color processing parameter.

In the catalog print, the original image is reduced to one-ninth or smaller so that the resulting images are printed on a printing paper for the normal mode printing. An image 158 is the one that is processed using the current parameter, and the normal mode printing is performed using the current parameter. An image 159 is the one that is processed using the printing color processing parameter into which the color adjusting parameter converter 134 converts the parameter for display corresponding to the image 156 in the thumbnail.

In the catalog printing in this embodiment, the color processing parameter in the tint thumbnail is used when the tint parameter is selected in the user interface, and the color processing parameters in the value/contrast thumbnail are used when the value/contrast parameter is selected in FIG. 23B.

Stored in the set value memory 16 in FIG. 26 are information about the address and adjustment range of the current image 92, the object to be adjusted, and information about which one of the tint parameter and value/contrast parameter is selected, and information about whether the printing mode is catalog printing in FIG. 3.

The color processing parameter switch 132 in FIG. 26 switches between the current image and one of the eight surrounding images based on the information about the address and adjustment range of the current image, the object to be adjusted, and information about the tint parameter and value/contrast parameters in order to create the thumbnail image for display and the catalog printing image for catalog printing.

The image rendering module 133 reduces and copies the original image 151 to display a plurality of reduced versions of the original image 151. In the catalog printing, the original image is reduced to one-ninth or smaller so that the resulting images are printed on a printing paper that is used in the normal mode printing.

No image rendering is performed in the normal mode. The information discriminating between the catalog printing mode and the normal mode is provided by the set value memory 16.

The color processor module 131 performs color processing in accordance with the address information, converting the RGB multi-level signal to the CMYK binary signal. The conversion by the color processor module 131 is called a plural number of times because image processing is performed for nine pages in the thumbnail adjustment or the catalog printing, and for one page in the normal mode.

An adjusting color converter 21 converts the RGB multi-level signal into a signal in the rg space, performs adjusting color conversion in the rg space, and then conversion into the RGB multi-level signal. In the value/contrast adjustment, the adjusting color converter 21 converts an RGB multi-level signal to an RGB multi-level signal in accordance with the set value.

An adjusting color parameter memory 24 stores a color adjusting parameter which is pre-computed in compliance with the general map according to the address in the general map, and gives, to the adjusting color converter 21, the color adjusting parameter corresponding to the address provided by the color processing parameter switch 132. The color adjusting parameter is stored according to the type of the object to be adjusted on the basis of tint parameter and value/contrast parameter.

The RGB to CMYK converter 22 for converting the RGB multi-level signal into the CMYK multi-level signal performs a process including color matching, luminance-density conversion, and masking using a LUT (Lookup Table). This process uses a pre-computed parameter that offers a chromatic match between a luminance signal and a density signal.

A halftone converter 23 for converting the CMYK multi-level signal into a CMYK binary signal employs known dithering or a spread error process.

The processes by the RGB to CMYK converter 22 and halftone converter 23 are needed for printing only, and are not performed in principle when the thumbnail is displayed on the external display device 4 through the display section 14. To assure a match between the printout and the display, the CMYK signal is occasionally converted back into an RGB signal after the process in the RGB to CMYK converter 22 in order to be used as a video signal.

As described above, according to the above embodiment, the thumbnail sketch is formed, namely, the original image is reduced and copied to nine reduced images. The nine images are then color processed using nine different adjusting parameters in terms of tint and value/contrast respectively and arranged on the display screen. The general map indicating the absolute positions of the nine adjusting parameters is displayed on screen. The user selectively adjusts color on screen using the pointing device. The user prints the nine reduced on screen images using the nine different adjusting parameters. In the catalog printing, the parameter for display in the thumbnail image displayed on the display screen is converted into the printing color processing parameter so that the printing is performed using nine converted parameters. Based on the images on the display screen and the printout result, the user moves the current image to the center of the thumbnail to select one of the eight color adjusting parameters and makes the color adjustment process to the original image using the selected parameter. In this way, the user easily and intuitively learns color adjustment to obtain a desired color to the user's preference, and efficiently obtains optimum printouts that meet the purpose of printing.

Eighth embodiment

In the seventh embodiment, the color adjusting parameter converter means corrects the color processing parameter for display so that the difference between a plurality of images in the thumbnail and the difference in a catalog print are equalized. In an eighth embodiment, the color processing parameter for the display device and the corresponding color processing parameter for the printer device are tabled beforehand.

According to the seventh embodiment, the color adjusting parameter converter equalizes the visual difference on screen with the visual difference in the printout, and the user intuitively recognizes and easily selects the desired color in color adjustment, and thus enjoys an efficient printing. In the seventh embodiment, however, catalog print time is lengthened because, in each process, the color adjusting parameter for display needs to be converted into the printing color adjusting parameter. Preferably, the times required color adjustment processes in both thumbnail and catalog printing are equally short. The eighth embodiment is organized to satisfy such a demand.

The seventh embodiment has, in the color processor module 131, the color adjusting parameter converter for converting the color adjusting parameter for display into the printing color adjusting parameter. In contrast, in the eighth embodiment, the color processor module 131 stores, in the form of a table, the color processing parameter for the display device and the corresponding color processing parameter for the printer device. The eighth embodiment has a short process time needed for color adjustment.

The eighth embodiment is identical to the seventh embodiment in its basic construction, but is different in that the color processor module 131 stores, in the form of a table, the color processing parameter for the display device and the corresponding color processing' parameter for the printer device. The eighth embodiment presents high-speed color adjustment means suited to the user's purpose of use and the control method of the apparatus.

The difference between the seventh embodiment and the eighth embodiment is now discussed.

Figure 27:
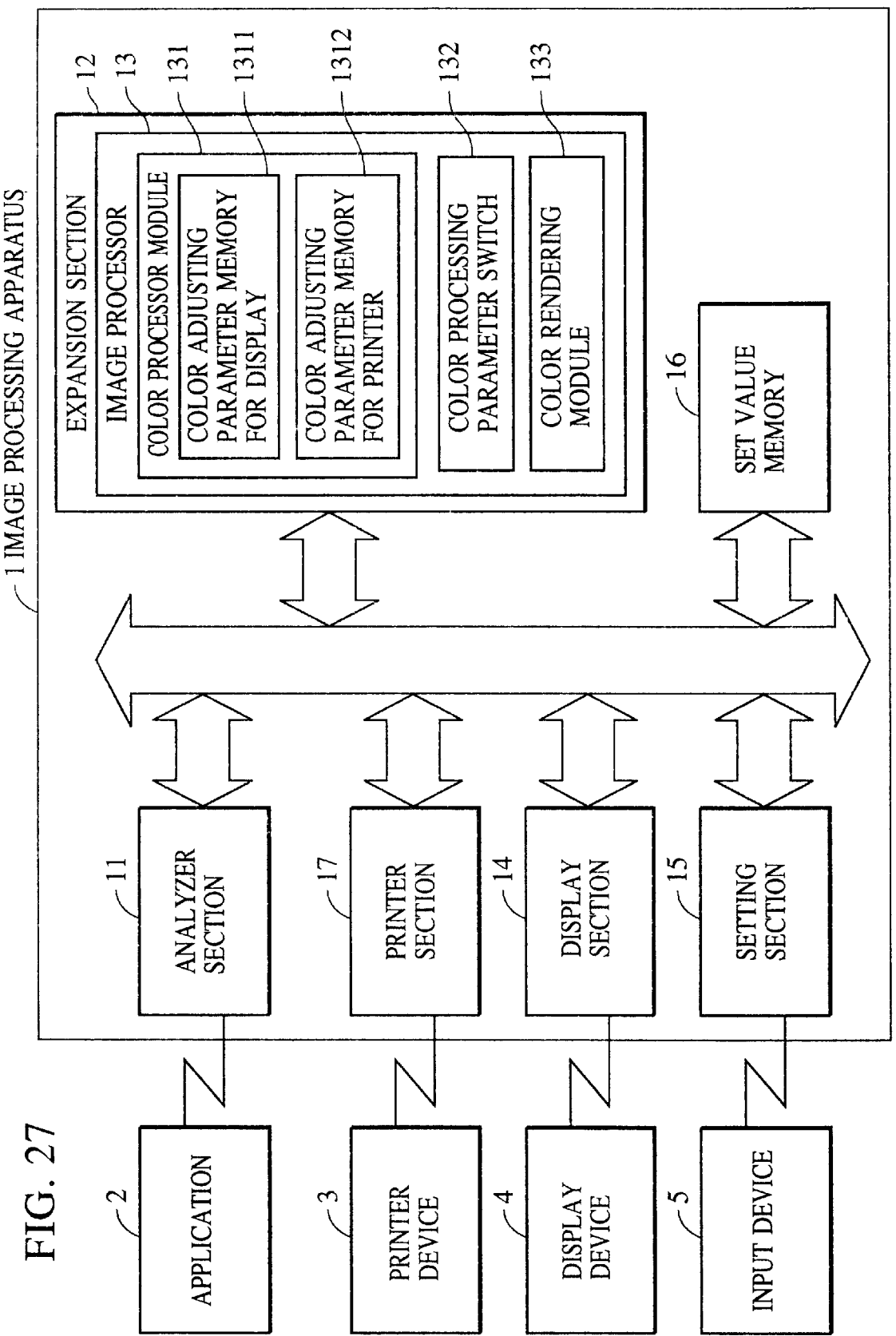
FIG. 27 is a block diagram showing the construction of image processing apparatus of an eighth embodiment of the present invention.

FIG. 27 is a block diagram showing the image processing apparatus of the eighth embodiment of the present invention. As shown, a color adjusting parameter memory for display 1311 and a color adjusting parameter memory for printer 1312 are added in the color processor module 131, which is different from the seventh embodiment.

Figure 28:
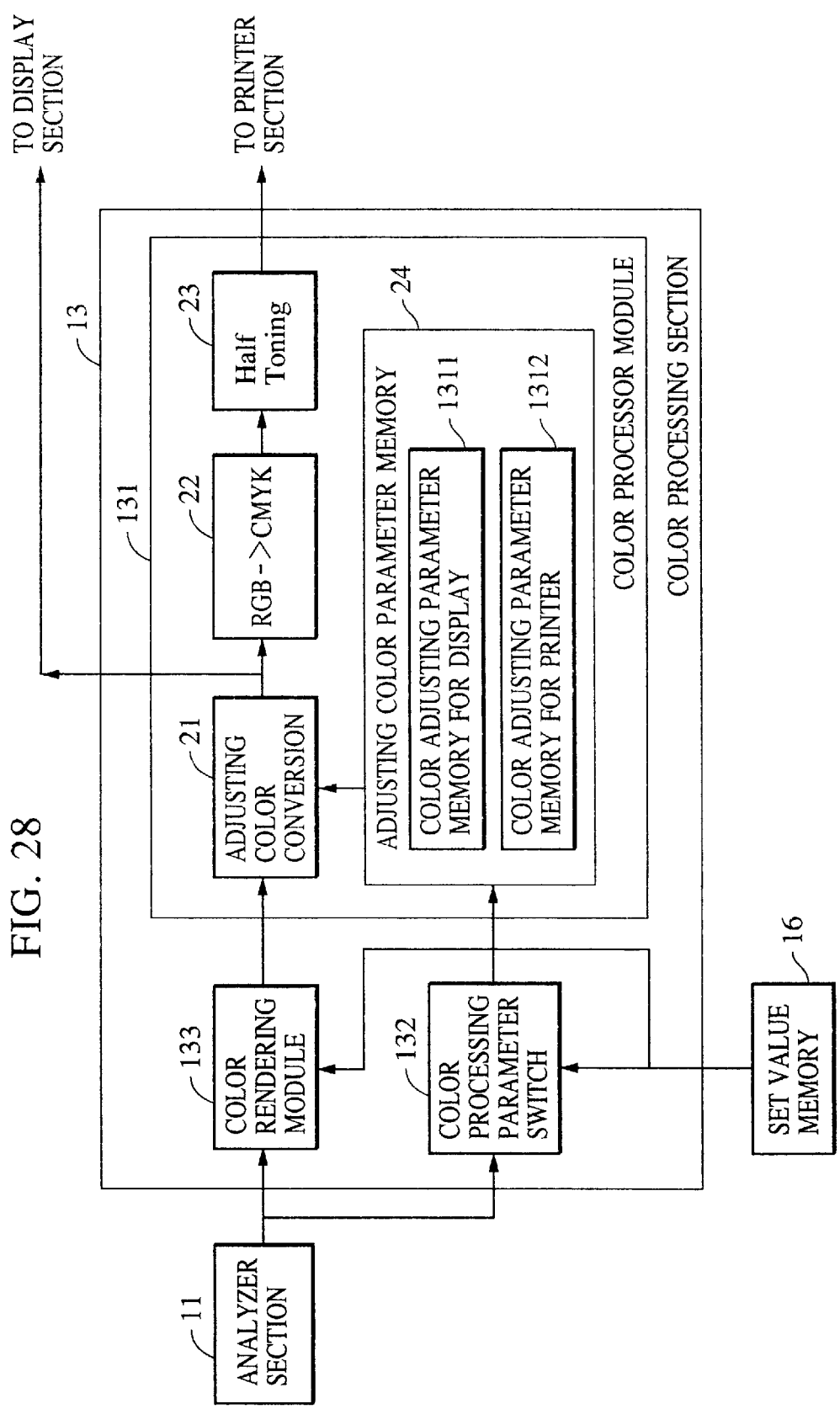
FIG. 28 is a block diagram showing the image processor of the image processing apparatus of the eighth embodiment of the present invention.

The image processing in this embodiment is now discussed referring to FIG. 28.

As shown in FIG. 28, the difference between the eighth embodiment and the seventh embodiment is that the eighth embodiment includes the color adjusting parameter memory for display 1311 and color adjusting parameter memory for printer 1312.

Figure 30:
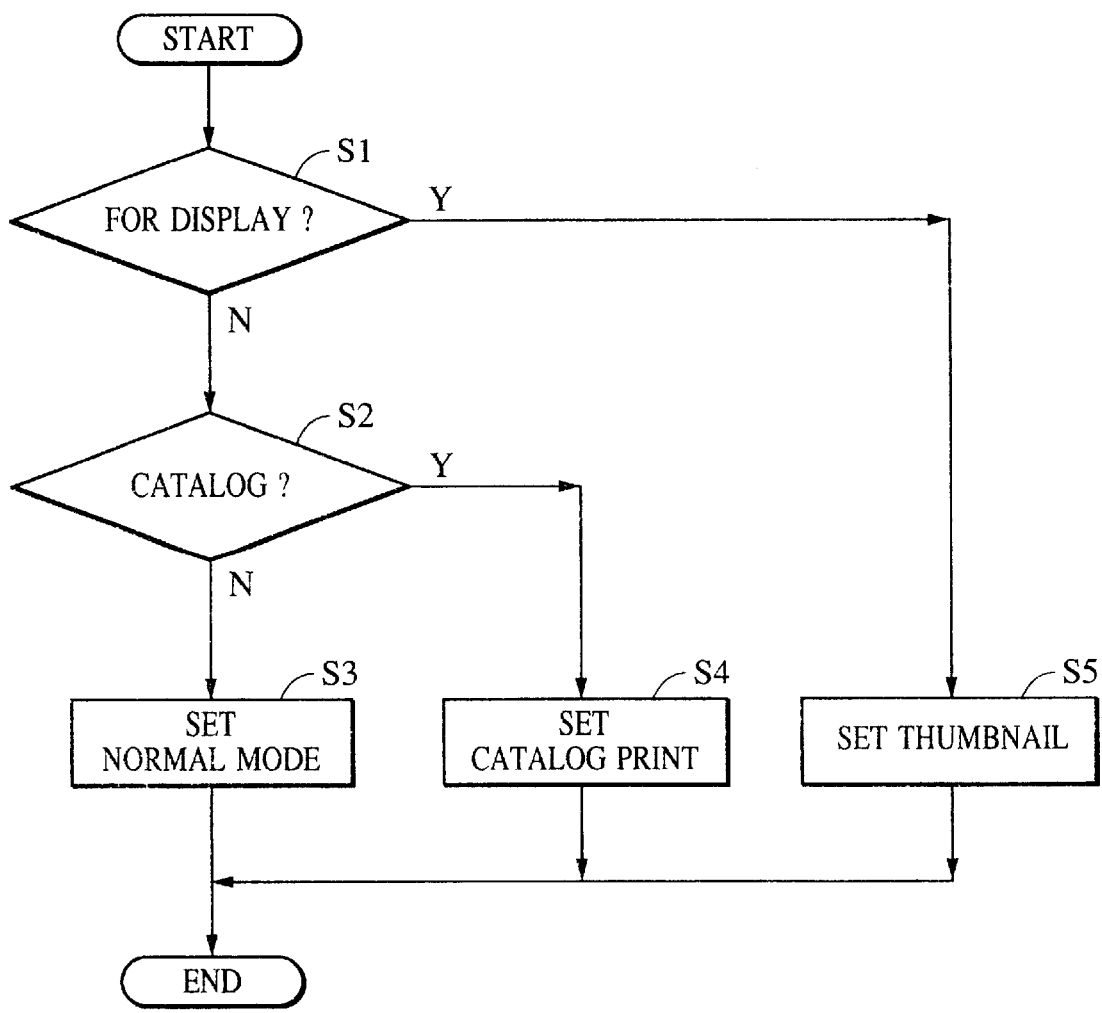
FIG. 30 is a flow diagram showing the flow of control in image processing according to the eighth embodiment of the present invention.

The adjusting color converter 21 receives the color adjusting parameter from the color adjusting parameter memory for display 1311 when the adjustment is for thumbnail, and receives the color adjusting parameter from the color adjusting parameter memory for printer 1312 when the adjustment is for catalog printing or normal printing. The color processing parameter switch 132 performs this switching based on the information stored in the set value memory 16. Referring to FIG. 30, the process is now discussed. In step S1, a determination is made of whether the adjustment is for display, namely the thumbnail. When it is determined that the adjustment is for the thumbnail, nine parameters are selected from the color adjusting parameter memory for display 1311 in step S5. When it is determined in step S1 that the adjustment is not for display, it is then determined in step S2 whether the apparatus is in a catalog printing mode. This determination is made based on the setting of catalog printing. When it is determined that the apparatus is the catalog printing mode, nine parameters are selected from the color adjusting parameter memory for printer 1312 in step S4. When it is determined in step S2 that the apparatus is the normal printing mode, a single parameter is selected from the color adjusting parameter memory for printer 1312 based on the current value in step S3.

In the eighth embodiment, the color adjusting parameter for display is stored in the color processor module 131 and the color adjusting parameter for printing is stored in the color processor module 131. The rest of the processes in the eighth embodiment remains identical to those in the seventh embodiment.

The eighth embodiment as described above reduces the time required for color adjustment process both in the thumbnail and catalog printing with the color processor module 131 provided with both the color adjusting parameter memory for display 1311 and the color adjusting parameter memory for printer 1312. The user obtains fast output results.

Ninth embodiment

In the eighth embodiment, the color processing parameter for the display device and the color processing parameter for printing are tabled beforehand, and the tabled parameters are switched. In a ninth embodiment, tables in compliance with the types of the display device and the printer device are prepared.

Since color adjustment is performed with the color adjusting parameters for display and printing prepared according to the seventh embodiment and eighth embodiments, the user enjoys an efficient printing. In the seventh and eighth embodiments, however, the image processing apparatus holds one type of parameter for each of the display and printing purposes. When the display device 4 and printer device 3, as the external devices, connected to the image processing apparatus are changed, a desired color adjustment is difficult to make because of a difference in color characteristics between the devices.

The image processing apparatus preferably holds the tables for the display and printing color adjusting parameters in compliance with the type of the external devices such as the external display device 4 and printer device 3, and switches the tables according to the type of the external devices. The ninth embodiment is organized to satisfy such a demand. In the ninth embodiment, the color processor module 131 holds the tables for the display and printing color adjusting parameters in compliance with the types of the external devices and the tables are switchably selected to be compatible with a plurality of external devices.

The ninth embodiment is identical to the eighth embodiment in its basic construction. The difference between both embodiments is that the ninth embodiment is provided with setting means in which the tables for the color processing parameters for display device and printing are prepared to provide the user the ease of use, and the control method of the apparatus is also different from that of the eighth embodiment.

The difference of between the ninth embodiment and eighth embodiment is now discussed.

Figure 32:
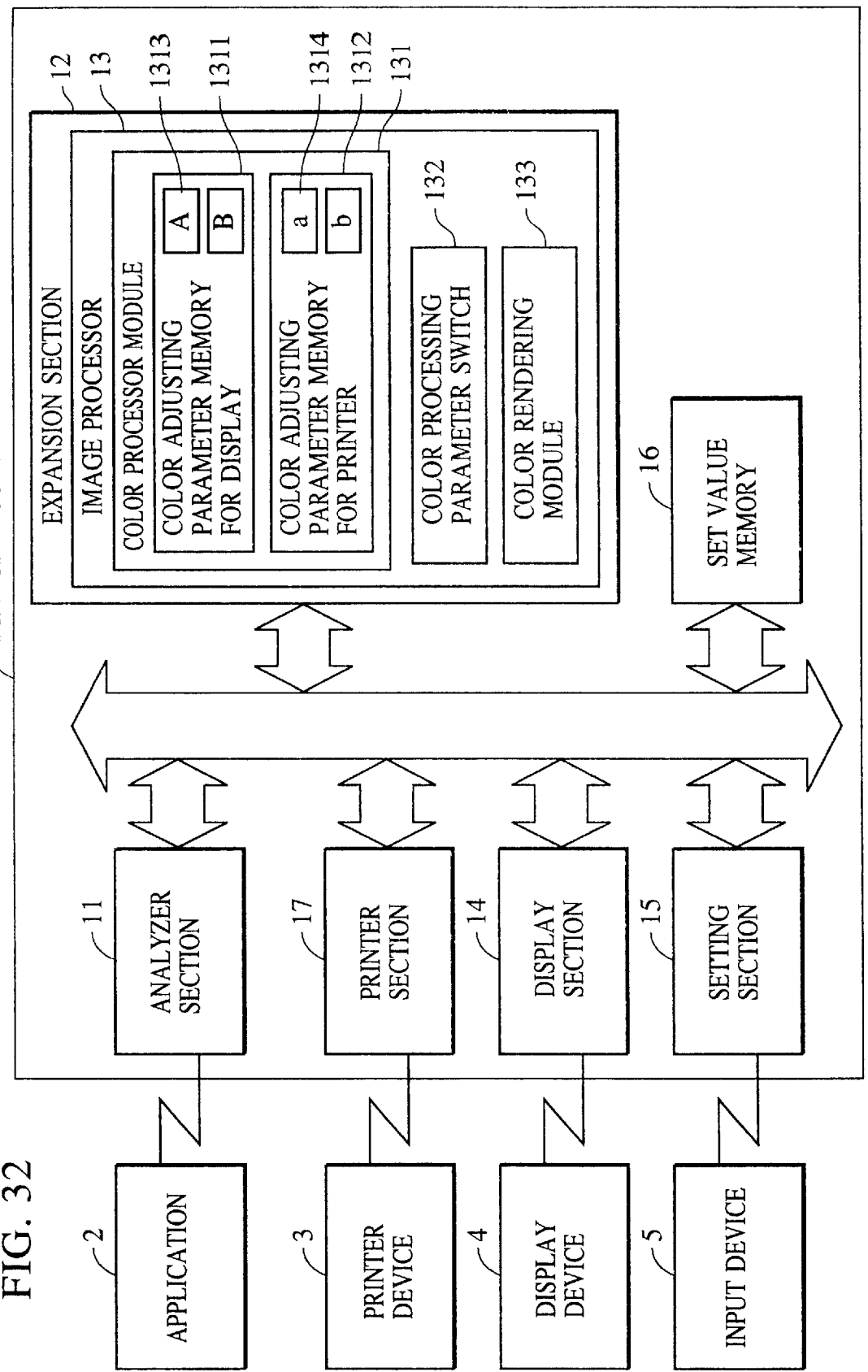
FIG. 32 is a block diagram showing the construction of the image processing apparatus of the ninth embodiment.

FIG. 32 is a block diagram showing the image processing apparatus of the ninth embodiment of the present invention. As shown, the color adjusting parameter memory for display 1311 and color adjusting parameter memory for printer 1312 in the color processor module 131 contain respectively tables 1313 and 1314. This is the difference between the two embodiments.

Figure 29:
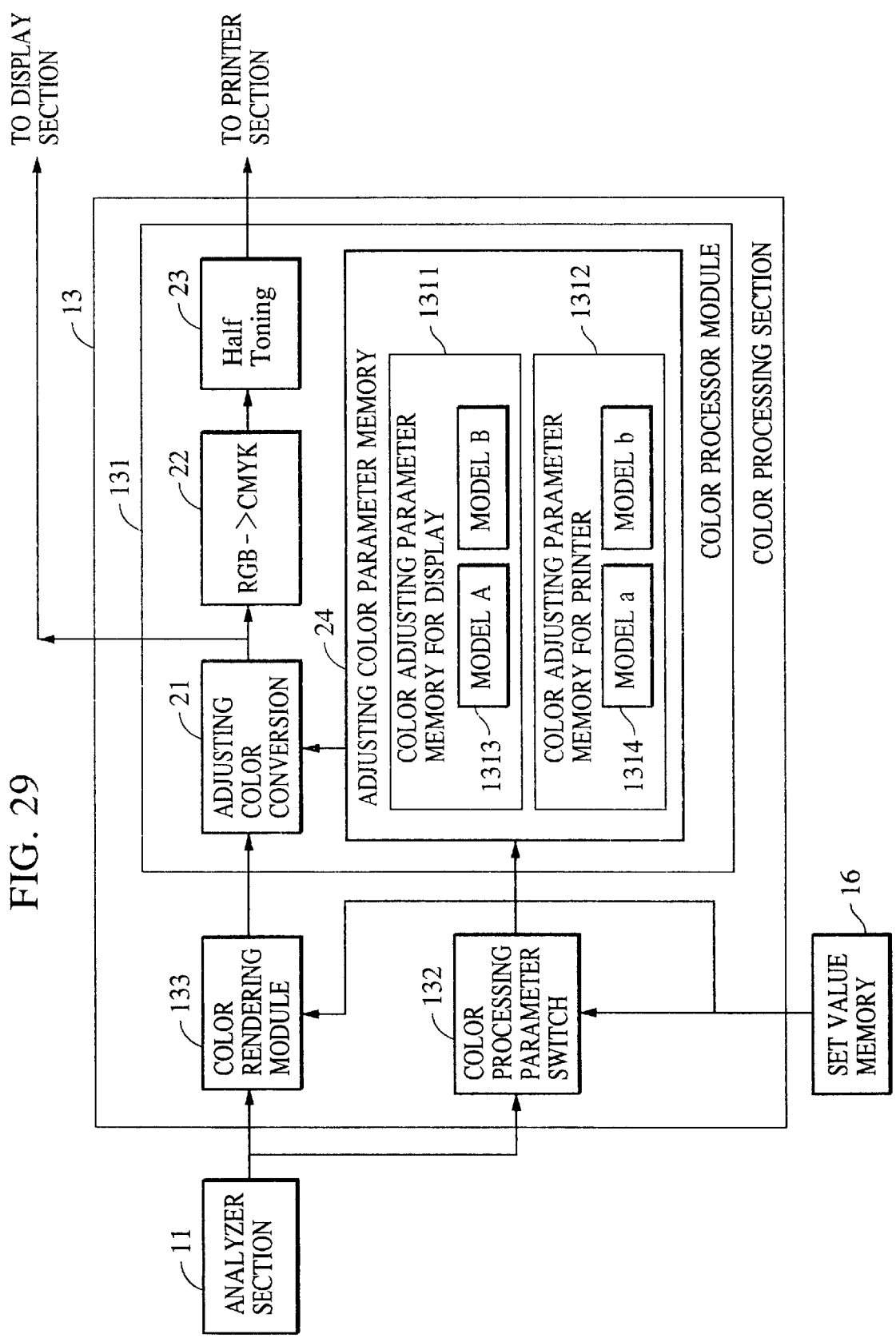
FIG. 29 is a block diagram showing the image processor of the image processing apparatus of a ninth embodiment of the present invention.

Referring to FIG. 29, the process of the image processing in the ninth embodiment is discussed.

As shown, the color adjusting parameter memory for display 1311 contains the display-type table 1313 and the color adjusting parameter memory for printer 1312 contains the printer-type table 1314.

The adjusting color converter 21 receives the color adjusting parameter from the color adjusting parameter memory for display 1311 when the adjustment is for thumbnail, and receives the color adjusting parameter from the color adjusting parameter memory for printer 1312 when the adjustment is for catalog printing or normal printing. The color adjusting parameters received correspond to the types of the currently connected display and printer devices. The color processing parameter switch 132 performs this switching based on the information stored in the set value memory 16.

Figure 31:
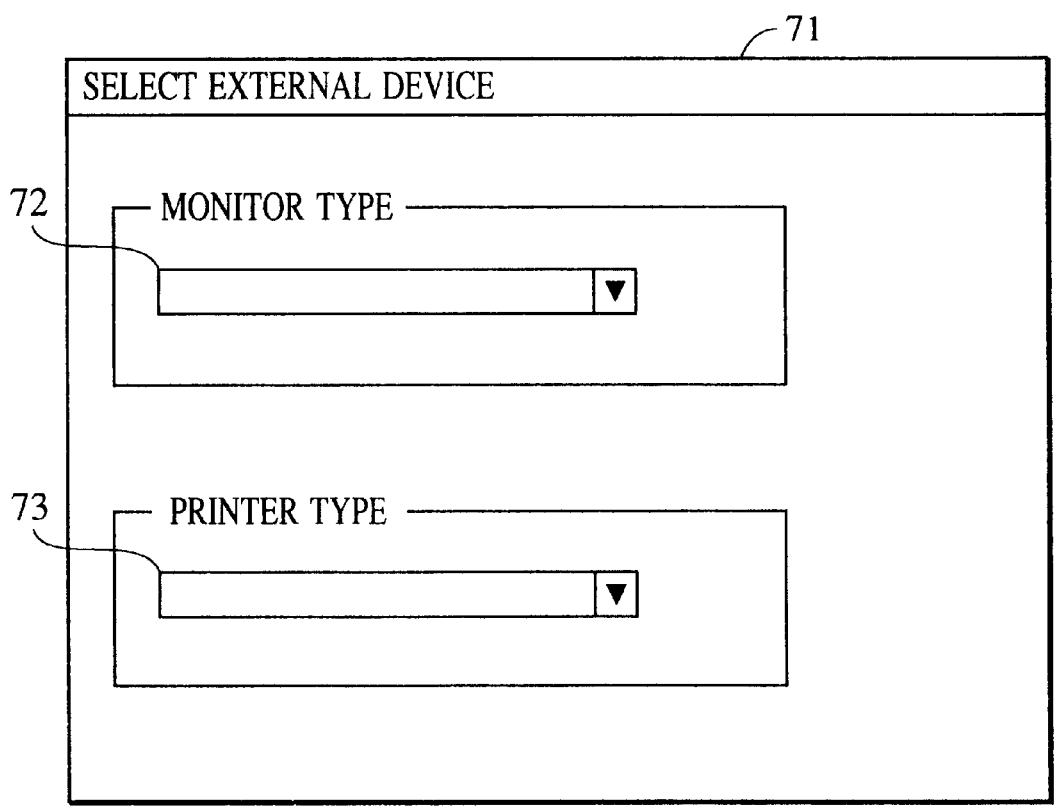
FIG. 31 shows display example of the selection of external devices in the ninth embodiment.
Figure 33:
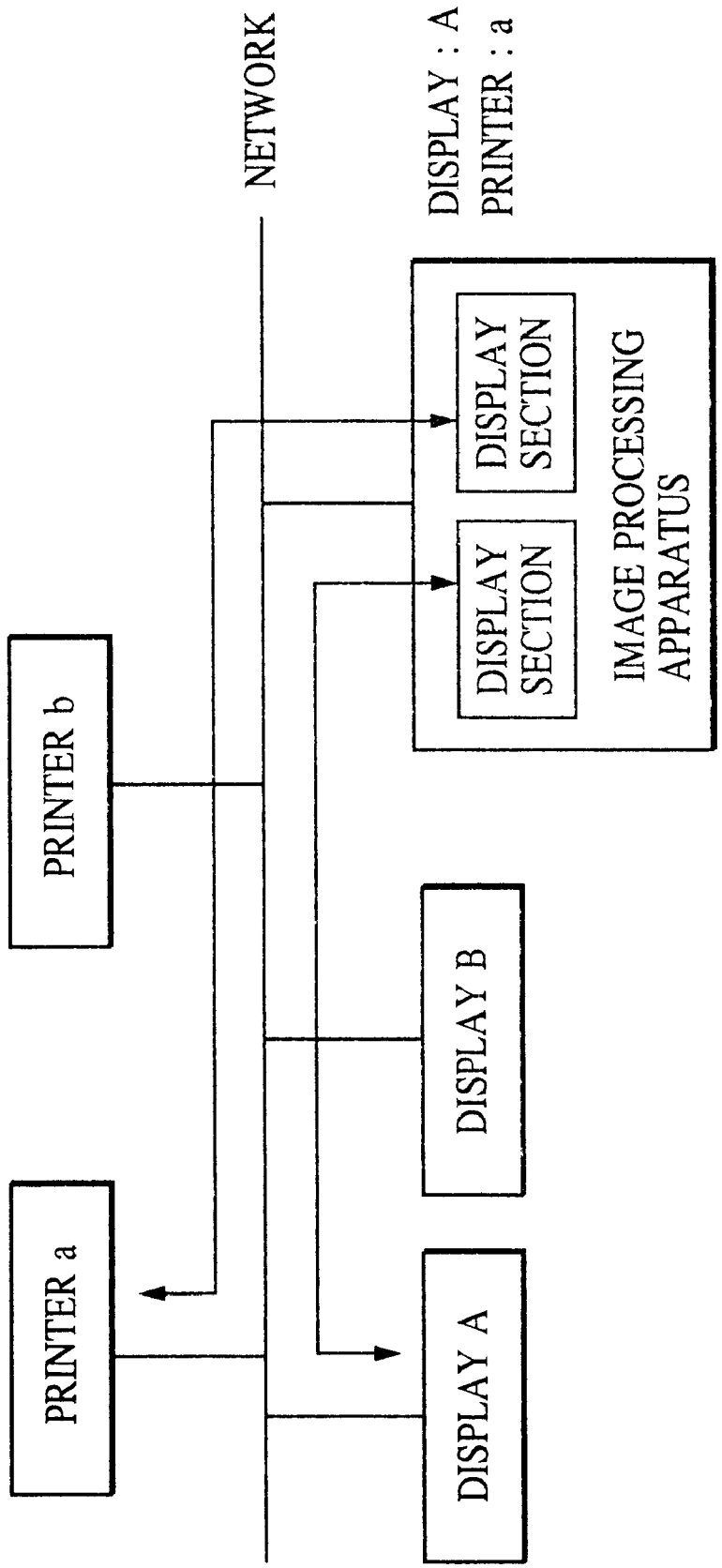
FIG. 33 shows the selection of external devices in a network according to the ninth embodiment of the present invention.
Figure 34:
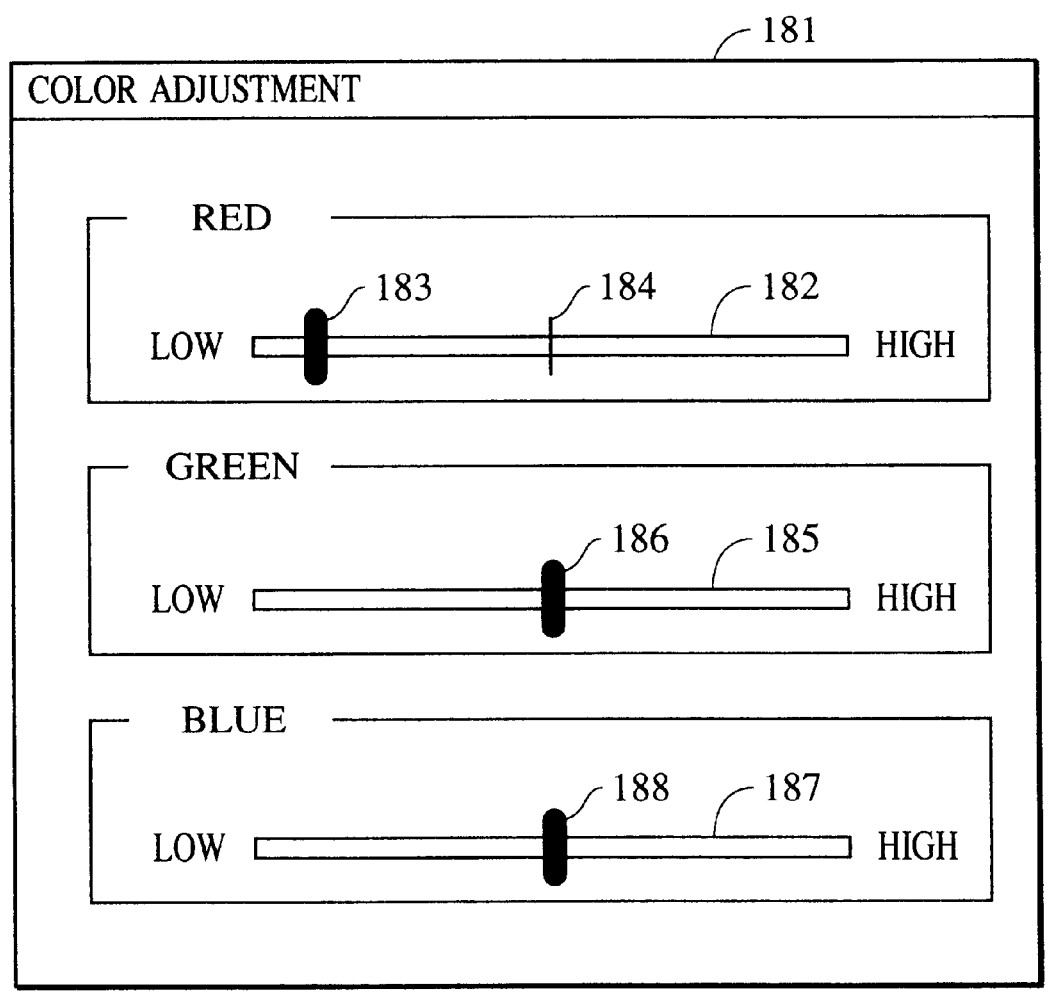
FIG. 34 shows a color adjustment in the conventional art.

FIG. 31 shows the setting of a field for the external devices. The external device selection field 71 is displayed on the display device by the display section 14. The type of the monitor currently connected is selected at 72. Options are listed at 72 in a pull-down menu, from which the user is allowed to select. The type of the printer currently connected is selected at 73. Options are listed at 73 in a pull-down menu, from which the user is allowed to select. In this embodiment, the user is allowed to select the types on the selection screen through the setting section and the display section. Alternatively, in a network environment, an identifying mechanism may be provided between the external device and the image processing apparatus so that the external device may be automatically identified. FIG. 33 shows such an arrangement. More particularly, the image processing apparatus and a plurality of external devices are connected to a network. First, information is exchanged between external devices and the image processing apparatus to identify a candidate device. In this embodiment, this process may be performed in the display section in connection with a display device, and may be performed in the printer section in connection with a printer device. As shown, a display device A and a printer device a are current external devices. A dedicated processing section may be provided to perform the above process. No further detail is provided in connection with information exchange needed for the process.

The information set by the selection means for the external devices is stored in the set value memory 16. Based on the information, the color processing parameter switch 132 selects the color adjusting parameters for display and printing in the color adjusting parameter memories for display and printing, and sends them to the adjusting color converter 21.

In the ninth embodiment, the color processor module 131 stores the color adjusting parameter for display and the color adjusting parameter for printing in accordance with the types of the external devices. The rest of the processes in the ninth embodiment remain identical to those in the eighth embodiment.

According to the ninth embodiment as described above, the external devices are easily changed. The time required for color adjustment is shortened in both the thumbnail and catalog printing. The user thus enjoys efficient output results.

Each of the above embodiments may be incorporated in a system constructed of a plurality of apparatuses or in a single apparatus. The present invention may be implemented by loading a program of the present invention onto an apparatus or system. Such an modification also falls within the scope of the present invention. In this case, a storage medium for storing the program of the present invention constitutes an embodiment of the present invention. The system or the apparatus operates according to the predetermined method when the program is read from the storage medium into the system or the apparatus.

The present invention is not limited to the foregoing embodiments but is subject to various modifications within which the scope and spirit of the appended claims.

What is claimed is:

1. An image processing method of setting an image processing parameter in response to a user instruction to perform image processing in accordance with the image processing parameter, comprising the steps of:

performing image processing on the image by using a plurality of different image processing parameters;

displaying a relationship of said plurality of different image processing parameters visually on an operation display by using a map which indicates degrees of color adjustment; and inputting a user instruction which indicates a desired image from the image processed by said plurality of different image processing parameters.

2. An image processing method according to claim 1, wherein the relationship of said plurality of different image processing parameters is represented by using a two-dimensional diagram.

3. An image processing method according to claim 1, wherein the image processing includes the step of correcting color balance.

4. An image processing method according to claim 1, wherein, with the image processing parameter responsive to the user instruction and a plurality of image processing parameters for enhancing respectively a plurality of representative colors with respect to the image processing parameter responsive to the user instruction processed as the plurality of different image processing parameters, a series of processes are repeated to set an image processing parameter for obtaining a desired image.

5. An image processing method according to claim 4, wherein an image is processed using the plurality of image processing parameters for enhancing respectively the plurality of representative colors and the resulting images are displayed in an array according to a hue circle.

6. An image processing method according to claim 4, wherein image data that is processed based on the image processing parameter for obtaining the desired image is output to an image forming device.

7. An image processing method according to claim 1, wherein the image processing parameter is set according to a type of an image, and wherein the image processing further comprises determining the type of an input image and performing image processing according to the image processing parameter corresponding to the determination result about the type of the input image.

8. An image processing method having a first mode in which a display device displays on a display screen a plurality of images that are processed according to a plurality of image processing parameters and a second mode in which an image forming device forms on a recording material a plurality of images that are processed according to the plurality of image processing parameters, the method comprising the steps of:

selecting one mode out of a plurality of modes including said first mode and said second mode based on a user instruction;

outputting said plurality of images based on the selected mode;

setting an image processing parameter corresponding to one output image, designated by a user instruction, out of the plurality of output images, said output images being displayed in the first mode or formed in the second mode; and processing an input image using the set image processing parameter.

9. An image processing method according to claim 8, wherein the step of setting is repeated until the image processing parameter for a desired image is obtained.

10. An image processing method according to claim 8, wherein the relationship between the plurality of image processing parameters is graphically displayed.

11. An image processing method according to claim 8, wherein the relationship between the plurality of image processing parameters is adjusted according to a user instruction.

12. An image processing method according to claim 8, wherein the image that is image-processed is displayed on the image forming device.

13. An image processing method of setting a color processing condition corresponding to a kind of image, comprising the steps of:

selecting the kind of image for which the color processing condition is set;

using a plurality of color processing conditions to a sample image corresponding to said selected kind of image, and displaying the color processed sample image which is obtained by performing color processing in parallel;

displaying a relationship of said plurality of different image processing parameters visually on an operation display by using a map which indicates degrees of color adjustment;

inputting a user instruction to display the desired color processed sample image from said displayed color processed sample images; and setting a color processing condition corresponding to said displayed color processed image as the color processing condition corresponding to said selected kind of image.

14. An image processing method according to claim 13, wherein the kind of image includes a photograph, graphics and text.

15. An image processing method according to claim 13, wherein said map is in a two-dimensional plane.

16. An image processing method according to claim 13, wherein the color processing conditions include a first color processing condition for modifying tint and a second color processing condition for modifying value.

17. An image processing method, which uses a user interface for performing a plurality of color processes to a same image to set color processing conditions, the method having a display mode and printing mode comprising the steps of:

performing a plurality of color processes to an image sample different from an original image to display resulting images in the display mode; and performing a plurality of color processes to the original image, to print resulting images in the printing mode.

18. An image processing method according to claim 17, wherein the color processing condition is set in accordance with a type of an image.

19. An image processing method according to claim 18, wherein the type of image includes a photograph, graphics and text.

20. An image processing method according to claim 17, wherein the user interface displays a state of the plurality of color processes in a two-dimensional plane.

21. An image processing method according to claim 17, wherein an image sample is set in accordance with a user instruction.

22. An image processing method according to claim 17, wherein the color processing conditions include a first color processing condition for modifying tint and a second color processing condition for modifying value.

23. An image processing method according to claim 22 further including a monochrome mode, wherein the second color processing condition, rather than the first color processing condition, is set during the monochrome mode.

24. An image processing method according to claim 17, wherein the user interface displays a current image and an image sample prior to performing the color processes, separately from the plurality of images subjected to the plurality of color processes.

25. An image processing method according to claim 17 further comprising the steps of:

storing a plurality of correction parameters corresponding to types of image forming devices;

identifying a type of an image forming device;

selecting a correction parameter, out of the stored plurality of correction parameters, corresponding to the identified type of the image forming section; and correcting, in the printing mode, the plurality of image processing conditions for display as image processing conditions for printing using the select correction parameter.

26. An image processing method according to claim 17, wherein the user interface visually displays the relationship between the plurality of image processing conditions for display in response to a user instruction.

27. An image processing apparatus comprising:

setting means for setting an image processing parameter in accordance with a user instruction and image processing means for processing an image in accordance with the image processing parameter:

means for performing processing on the image by using a plurality of different image processing parameters;

means for displaying a relationship of said plurality of different image processing parameters visually on an operation display by using a map which indicates degrees of color adjustment; and means for inputting a user instruction which indicates a desired image from the image processed by a plurality of different image processing parameters.

28. An image processing apparatus having a first mode in which a display device displays on a display screen a plurality of images that are processed according to a plurality of image processing parameters and a second mode in which an image forming device forms on a recording material a plurality of images that are processed according to the plurality of image processing parameters, the apparatus comprising:

selecting means for selecting one mode out of a plurality of modes including said first mode and said second mode based on a user instruction;

outputting means for outputting said plurality of images based on the selected mode;

setting means for setting an image processing parameter corresponding to one output image, designated by a user instruction, out of the plurality of output images, said output images being displayed in the first mode or formed in the second mode; and image processing means for processing an input image using the set image processing parameter.

29. An image processing apparatus for setting a color processing condition corresponding to a kind of image, comprising:

means for selecting the kind of image for which the color processing condition is set;

means for using a plurality of color processing conditions to a sample image corresponding to said selected kind of image, and displaying the color processed sample image which is obtained by performing color processing in parallel;

means for displaying a relationship of said plurality of different image processing parameters visually on an operation display by using a map which indicates degrees of color adjustment;

inputting a user instruction to display the desired color processed sample image from said displayed color processed sample images; and means for setting a color processing condition corresponding to said displayed color processed image as the color processing condition corresponding to said selected kind of image.

30. An image processing apparatus for performing a plurality of color processes on a same image to set color processing conditions, the apparatus comprising setting means for setting a display mode or a printing mode in response to a user instruction, wherein a plurality of color processes are performed to an image sample different from an original image to display resulting images in the display mode; and wherein a plurality of color processes are performed to the original image, to print resulting images in the printing mode.

31. A storage medium that stores in a computer-readable manner a program that provides an image processing method of setting a color processing condition corresponding to a kind of image, comprising the steps of:

selecting the kind of image for which the color processing condition is set;

using a plurality of color processing conditions to a sample image corresponding to said selected kind of image, and displaying the color processed sample image which is obtained by performing color processing in parallel;

displaying a relationship of said plurality of different image processing parameters visually on an operation display by using a map which indicates degrees of color adjustment;

inputting the user instruction to display the desired color processed sample image from said displayed color processed sample images; and setting a color processing condition corresponding to said displayed color processed image as the color processing condition corresponding to said selected kind of image.

32. A storage medium that stores in a computer-readable manner a program that provides a user interface for displaying a same image with a plurality of color processes performed thereto to set color processing conditions, the program comprising the steps of:

performing a plurality of color processes to an image sample different from an original image to display resulting images in the display mode; and performing a plurality of color processes to the original image, to print resulting images in the printing mode.

33. A storage medium that stores in a computer-readable manner a program for an image processing method of setting an image processing parameter in response to a user instruction to perform image processing in accordance with the image processing parameter, comprising the steps of:

performing image processing on the image by using a plurality of different image processing parameters;

displaying a relationship of said plurality of different image processing parameters visually on an operation display by using a map which indicates degrees of color adjustment; and inputting a user instruction which indicates a desired image from the image processed by said plurality of different image processing parameters.

34. A storage medium that stores in a computer-readable manner a program for an image processing method having a first mode in which a display device displays a plurality of images that are processed according to a plurality of image processing parameters on a display screen and a second mode in which an image forming device forms a plurality of images that are processed according to a plurality of image processing parameters on a recording material, the method comprising the steps of;

selecting one mode out of a plurality of modes including said first mode and said second mode based on a user instruction;

outputting said plurality of images based on the selected mode;

setting an image processing parameter corresponding to one output image, designated by a user instruction, out of the plurality of output images, said output images being displayed in the first mode or formed in the second mode; and processing an input image using the set image processing parameter.

* * * * *

UNITED STATES PATENT AND TRADEMARK OFFICE
CERTIFICATE OF CORRECTION

PATENT NO. : 6,701,011 B1
DATED : March 2, 2004
INVENTOR(S) : Nobuyuki Nakajima

It is certified that error appears in the above-identified patent and that said Letters Patent is hereby corrected as shown below:

Drawings,
Sheet 12, Figure 11, "GOLOR" should read -- COLOR --.

Column 1,
Line 22, "data as" should be deleted;
Line 23, "CMYK" should read -- CMYK data as --; and
Line 42, "si" should be deleted.

Column 3,
Line 59, "according" should read -- according to --.

Column 4,
Lines 1, 3 and 5, "shows" should read -- show --;
Line 26, "shows" should read -- shows a --; and
Line 67, "settings" should read -- setting --.

Column 5,
Line 2, "setting" should read -- settings --.

Column 6,
Line 10, "color processing" should read -- a color processing --.

Column 7,
Line 7, "surronding" should read -- surrounding --.

Column 8,
Line 8, "chromatics a" should read -- a chromatics --.

Column 9,
Line 40, "color-converter 21" should read -- color converter 21 --.

Column 12,
Line 20, "Since" should read -- ¶ Since --; and
Line 61, "as" should read -- as a --.

Column 13,
Line 18, "a image" should read -- an image --.

UNITED STATES PATENT AND TRADEMARK OFFICE
CERTIFICATE OF CORRECTION

PATENT NO.     : 6,701,011 B1
DATED          : March 2, 2004
INVENTOR(S)    : Nobuyuki Nakajima It is certified that error appears in the above-identified patent and that said Letters Patent is hereby corrected as shown below:

<u>Column 14,</u>
Line 29, "detail" should read -- detail. --; and
Line 61, "processor 13," should read -- processor 13, a --.

<u>Column 16,</u>
Line 6, "and is" should read -- and is wherein after --;
Line 7, "wherein after" should read -- hereinafter --;
Lines 7-15, should not have a block indent; full margin; and
Line 27, "thumb nail." should read -- thumbnail. --.

<u>Column 21,</u>
Line 52, "processing-apparatus" should read -- processing apparatus --.

<u>Column 25,</u>
Line 23, "required-for" should read -- required for --; and
Line 44, "to" should read -- to the --.

<u>Column 27,</u>
Line 17, "printing." should read -- printing. No --; and
Line 18, "¶ No" should read -- No --.

<u>Column 28,</u>
Line 54, "processing'" should read -- processing --.

<u>Column 29,</u>
Line 34, "remains" should read -- remain --; and
Line 54, "embodiments," should read -- embodiment, --.

<u>Column 30,</u>
Line 15, "of" should be deleted.

UNITED STATES PATENT AND TRADEMARK OFFICE
CERTIFICATE OF CORRECTION

PATENT NO. : 6,701,011 B1
DATED : March 2, 2004
INVENTOR(S) : Nobuyuki Nakajima

It is certified that error appears in the above-identified patent and that said Letters Patent is hereby corrected as shown below:

Column 31,
Line 22, "an" should read -- a --; and
Line 31, "which" should be deleted.

Signed and Sealed this

Thirteenth Day of July, 2004

JON W. DUDAS
*Acting Director of the United States Patent and Trademark Office*